(12) United States Patent
Bonissone et al.

(10) Patent No.: US 7,801,748 B2
(45) Date of Patent: Sep. 21, 2010

(54) SYSTEM AND PROCESS FOR DETECTING OUTLIERS FOR INSURANCE UNDERWRITING SUITABLE FOR USE BY AN AUTOMATED SYSTEM

(75) Inventors: Piero Patrone Bonissone, Schenectady, NY (US); Naresh Sundaram Iyer, Clifton Park, NY (US)

(73) Assignee: Genworth Financial, Inc., Richmond, VA (US)

( * ) Notice: Subject to any disclaimer, the term of this patent is extended or adjusted under 35 U.S.C. 154(b) by 1343 days.

(21) Appl. No.: 10/425,722

(22) Filed: Apr. 30, 2003

(65) Prior Publication Data

US 2004/0220838 A1 Nov. 4, 2004

(51) Int. Cl.
*G06Q 40/00* (2006.01)

(52) U.S. Cl. .................. 705/4; 706/6; 706/46; 706/47; 705/2; 705/3

(58) Field of Classification Search ....................... 705/4
See application file for complete search history.

(56) References Cited

U.S. PATENT DOCUMENTS

| | | | |
|---|---|---|---|
| 4,642,768 A | 2/1987 | Roberts | |
| 4,722,055 A | 1/1988 | Roberts | |
| 4,766,539 A | 8/1988 | Fox | |
| 4,831,526 A * | 5/1989 | Luchs et al. | 705/4 |
| 4,837,693 A | 6/1989 | Schotz | |
| 4,839,804 A | 6/1989 | Roberts | |
| 4,949,278 A | 8/1990 | Davies | |
| 4,975,840 A * | 12/1990 | DeTore et al. | 705/4 |
| 5,191,522 A | 3/1993 | Bosco et al. | |
| 5,202,827 A | 4/1993 | Sober | |
| 5,208,898 A | 5/1993 | Funabashi et al. | |
| 5,218,539 A | 6/1993 | Elphick et al. | |
| 5,218,646 A | 6/1993 | Sirat et al. | |
| 5,235,654 A | 8/1993 | Anderson et al. | |

(Continued)

FOREIGN PATENT DOCUMENTS

EP  0 621 556 A2  10/1994

(Continued)

OTHER PUBLICATIONS

Borglin et al., "Stochastic Dominance and Conditional Expectation—An Insurance Theoretical Approach" The Geneva Papers on Risk and Insurance Theory, 27: 31-48, 2002.*

(Continued)

*Primary Examiner*—C. Luke Gilligan
*Assistant Examiner*—Neal R Sereboff
(74) *Attorney, Agent, or Firm*—Hunton & Williams

(57) ABSTRACT

An outlier detector that exploits the existing risk structure of the decision problem in order to discover risk assignments that are globally inconsistent is described. The technique works on a set of candidates for which risk categories have already been assigned. In the case of insurance underwriting, the invention pertains to the premium class assigned to an application. For this set of labeled candidates, the system finds all such pairs of applications belonging to different risk categories, which violate the principle of dominance. The invention matches the risk ordering of the applications with the ordering imposed by dominance and uses any mismatch during the process to identify applications that were potentially assigned incorrect risk categories.

6 Claims, 31 Drawing Sheets

U.S. PATENT DOCUMENTS

| | | | |
|---|---|---|---|
| 5,235,702 A | 8/1993 | Miller | |
| 5,241,620 A | 8/1993 | Ruggiero | |
| 5,359,509 A | 10/1994 | Little et al. | |
| 5,523,942 A | 6/1996 | Tyler et al. | |
| 5,537,315 A | 7/1996 | Mitcham | |
| 5,586,313 A | 12/1996 | Schnittker et al. | |
| 5,590,038 A | 12/1996 | Pitroda | |
| 5,613,072 A | 3/1997 | Hammond | |
| 5,619,621 A | 4/1997 | Puckett | |
| 5,619,694 A | 4/1997 | Shimazu | |
| 5,627,973 A | 5/1997 | Armstrong et al. | |
| 5,636,117 A | 6/1997 | Rothstein | |
| 5,655,085 A | 8/1997 | Ryan et al. | |
| 5,696,907 A | 12/1997 | Tom | |
| 5,701,400 A | 12/1997 | Amado | |
| 5,712,984 A | 1/1998 | Hammond | |
| 5,752,236 A | 5/1998 | Sexton | |
| 5,752,237 A | 5/1998 | Cherny | |
| 5,754,980 A | 5/1998 | Anderson | |
| 5,768,422 A | 6/1998 | Yaeger | |
| 5,774,761 A | 6/1998 | Rai | |
| 5,796,863 A | 8/1998 | Lyon | |
| 5,797,134 A | 8/1998 | McMillan | |
| 5,805,730 A | 9/1998 | Yaeger et al. | |
| 5,805,731 A | 9/1998 | Yaeger et al. | |
| 5,809,478 A | 9/1998 | Greco | |
| 5,819,230 A | 10/1998 | Christie | |
| 5,835,897 A | 11/1998 | Dang | |
| 5,839,103 A | 11/1998 | Mammone et al. | |
| 5,839,113 A | 11/1998 | Federau | |
| 5,839,118 A | 11/1998 | Ryan | |
| 5,845,256 A | 12/1998 | Pescitelli et al. | |
| 5,850,480 A | 12/1998 | Scanlon | |
| 5,852,808 A | 12/1998 | Cherny | |
| 5,855,005 A | 12/1998 | Schuler | |
| 5,870,721 A | 2/1999 | Norris | |
| 5,873,066 A | 2/1999 | Underwood et al. | |
| 5,884,274 A | 3/1999 | Walker | |
| 5,893,072 A | 4/1999 | Zizzamia | |
| 5,897,619 A | 4/1999 | Hargrove | |
| 5,907,848 A | 5/1999 | Zaiken et al. | |
| 5,930,392 A | 7/1999 | Ho | |
| 5,930,759 A | 7/1999 | Moore et al. | |
| 5,956,691 A | 9/1999 | Powers | |
| 5,970,464 A * | 10/1999 | Apte et al. | 705/4 |
| 5,978,769 A | 11/1999 | Brown | |
| 5,987,434 A | 11/1999 | Libman | |
| 6,003,007 A | 12/1999 | DiRienzo | |
| 6,009,402 A | 12/1999 | Whitworth | |
| 6,018,714 A | 1/2000 | Risen | |
| 6,023,691 A | 2/2000 | Bertrand et al. | |
| 6,026,363 A | 2/2000 | Shepard | |
| 6,049,773 A | 4/2000 | McCormack et al. | |
| 6,064,970 A | 5/2000 | McMillan | |
| 6,070,148 A | 5/2000 | Mori et al. | |
| 6,076,066 A | 6/2000 | DiRienzo et al. | |
| 6,078,890 A | 6/2000 | Mangin | |
| 6,088,677 A | 7/2000 | Spurgeon | |
| 6,088,686 A | 7/2000 | Walker et al. | |
| 6,098,070 A | 8/2000 | Maxwell | |
| 6,112,190 A | 8/2000 | Fletcher et al. | |
| 6,115,694 A | 9/2000 | Cheetham et al. | |
| 6,119,093 A | 9/2000 | Walker | |
| 6,125,194 A | 9/2000 | Yeh et al. | |
| 6,128,598 A | 10/2000 | Walker | |
| 6,141,648 A | 10/2000 | Bonissone et al. | |
| 6,151,584 A | 11/2000 | Papierniak et al. | |
| 6,163,770 A | 12/2000 | Gamble | |
| 6,178,406 B1 | 1/2001 | Cheetham et al. | |
| 6,182,048 B1 | 1/2001 | Osborn | |
| 6,186,793 B1 | 2/2001 | Brubaker | |
| 6,208,974 B1 | 3/2001 | Campbell et al. | |
| 6,246,991 B1 | 6/2001 | Abe | |
| 6,266,645 B1 | 7/2001 | Simpson | |
| 6,272,471 B1 | 8/2001 | Segal | |
| 6,272,482 B1 | 8/2001 | McKee et al. | |
| 6,304,859 B1 | 10/2001 | Ryan | |
| 6,314,415 B1 | 11/2001 | Mukherjee | |
| 6,334,192 B1 | 12/2001 | Karpf | |
| 6,415,284 B1 | 7/2002 | D'Souza et al. | |
| 6,519,578 B1 | 2/2003 | Reddy | |
| 6,542,905 B1 * | 4/2003 | Fogel et al. | 707/200 |
| 6,553,365 B1 | 4/2003 | Summerlin et al. | |
| 6,584,446 B1 | 6/2003 | Buchanan | |
| 6,594,668 B1 | 7/2003 | Hudy | |
| 6,604,080 B1 | 8/2003 | Kern | |
| 6,615,181 B1 | 9/2003 | Segal | |
| 6,647,374 B2 | 11/2003 | Kansal | |
| 6,683,697 B1 | 1/2004 | Lech et al. | |
| 6,684,188 B1 | 1/2004 | Mitchell et al. | |
| 6,684,189 B1 | 1/2004 | Ryan et al. | |
| 6,684,190 B1 | 1/2004 | Powers | |
| 6,684,276 B2 | 1/2004 | Walker | |
| 6,714,925 B1 | 3/2004 | Barnhill et al. | |
| 6,725,220 B2 | 4/2004 | Stratigos | |
| 6,731,993 B1 | 5/2004 | Carter et al. | |
| 6,757,668 B1 | 6/2004 | Goebel et al. | |
| 6,823,319 B1 | 11/2004 | Lynch et al. | |
| 6,826,539 B2 | 11/2004 | Loveland | |
| 6,829,584 B2 | 12/2004 | Loveland | |
| 6,868,386 B1 | 3/2005 | Henderson | |
| 6,869,362 B2 | 3/2005 | Walker | |
| 6,871,181 B2 | 3/2005 | Kansal | |
| 6,877,132 B1 | 4/2005 | De et al. | |
| 6,922,720 B2 | 7/2005 | Cianciarulo | |
| 6,937,990 B1 | 8/2005 | Walker | |
| 6,944,597 B2 | 9/2005 | Callen | |
| 6,963,853 B1 | 11/2005 | Smith | |
| 6,999,935 B2 | 2/2006 | Parankirinathan | |
| 7,020,692 B2 | 3/2006 | Cianciarulo | |
| 7,024,384 B2 | 4/2006 | Daughtery, III | |
| 7,027,992 B2 | 4/2006 | Zaccaria | |
| 7,050,932 B2 * | 5/2006 | Selby et al. | 702/179 |
| 7,062,706 B2 | 6/2006 | Maxwell et al. | |
| 7,072,841 B1 | 7/2006 | Pednault | |
| 7,095,426 B1 | 8/2006 | Childress | |
| 7,117,450 B1 | 10/2006 | Chaudhri et al. | |
| 7,127,407 B1 | 10/2006 | Averill | |
| 7,130,779 B2 | 10/2006 | Beverina | |
| 7,143,051 B1 | 11/2006 | Hanby | |
| 7,249,040 B1 | 7/2007 | Binns | |
| 7,260,549 B2 | 8/2007 | Spielmann et al. | |
| 7,319,970 B1 | 1/2008 | Simone | |
| 7,325,076 B1 | 1/2008 | Morrison et al. | |
| 7,337,121 B1 | 2/2008 | Beinat | |
| 7,343,307 B1 | 3/2008 | Childress | |
| 7,392,201 B1 | 6/2008 | Binns | |
| 7,398,218 B1 | 7/2008 | Bernaski | |
| 7,516,079 B2 | 4/2009 | Harrison | |
| 7,542,914 B1 | 6/2009 | Bates | |
| 7,555,438 B2 | 6/2009 | Binns | |
| 7,555,439 B1 | 6/2009 | Binns | |
| 7,567,914 B2 | 7/2009 | Bonissone | |
| 7,610,257 B1 | 10/2009 | Abrahams | |
| 7,617,240 B2 | 11/2009 | Guyan | |
| 7,620,560 B2 | 11/2009 | Dang | |
| 7,624,037 B2 | 11/2009 | Bost | |
| 7,630,909 B2 | 12/2009 | Wahlbin | |
| 7,630,910 B2 | 12/2009 | Bonissone | |
| 7,630,911 B2 | 12/2009 | Kay | |
| 7,630,913 B2 | 12/2009 | Kay | |
| 2001/0032099 A1 | 10/2001 | Joao | |
| 2001/0049611 A1 | 12/2001 | Peach | |
| 2001/0053986 A1 | 12/2001 | Dick | |

| Pub. No. | Date | Name | | Pub. No. | Date | Name |
|---|---|---|---|---|---|---|
| 2002/0010679 A1 | 1/2002 | Felsher | | 2004/0030589 A1 | 2/2004 | Leisher |
| 2002/0032585 A1 | 3/2002 | Keyes | | 2004/0039548 A1* | 2/2004 | Selby et al. ............... 702/179 |
| 2002/0035490 A1 | 3/2002 | Ohmoto | | 2004/0039608 A1 | 2/2004 | Mazur |
| 2002/0040306 A1 | 4/2002 | Sugiyama | | 2004/0039610 A1 | 2/2004 | Weitermann |
| 2002/0049618 A1 | 4/2002 | McClure | | 2004/0039710 A1 | 2/2004 | McMillan et al. |
| 2002/0055862 A1 | 5/2002 | Jinks | | 2004/0044763 A1 | 3/2004 | Besson |
| 2002/0059126 A1 | 5/2002 | Ricciardi | | 2004/0049506 A1 | 3/2004 | Ghouri |
| 2002/0072936 A1 | 6/2002 | Newman | | 2004/0054621 A1 | 3/2004 | Bretvin |
| 2002/0077860 A1 | 6/2002 | Earnest et al. | | 2004/0059608 A1 | 3/2004 | Gore |
| 2002/0087364 A1 | 7/2002 | Lerner et al. | | 2004/0059639 A1 | 3/2004 | Ripper |
| 2002/0091550 A1 | 7/2002 | White | | 2004/0078243 A1 | 4/2004 | Fisher |
| 2002/0095317 A1 | 7/2002 | McCabe | | 2004/0078250 A1 | 4/2004 | Schorb |
| 2002/0099596 A1 | 7/2002 | Geraghty | | 2004/0093242 A1 | 5/2004 | Cadigan et al. |
| 2002/0111834 A1 | 8/2002 | Kogure | | 2004/0103003 A1 | 5/2004 | Mayers |
| 2002/0111835 A1 | 8/2002 | Hele et al. | | 2004/0103012 A1 | 5/2004 | Nussbaum |
| 2002/0116231 A1 | 8/2002 | Hele et al. | | 2004/0128147 A1 | 7/2004 | Vallinayagam |
| 2002/0120474 A1 | 8/2002 | Hele et al. | | 2004/0128170 A1 | 7/2004 | MacKethan |
| 2002/0120560 A1 | 8/2002 | Morgan | | 2004/0128172 A1 | 7/2004 | Van Cleave |
| 2002/0123910 A1 | 9/2002 | Hereford | | 2004/0138927 A1 | 7/2004 | Eydeland |
| 2002/0128882 A1 | 9/2002 | Nakagawa | | 2004/0153346 A1 | 8/2004 | Grundel |
| 2002/0138307 A1 | 9/2002 | Kramer | | 2004/0172308 A1 | 9/2004 | Macchia |
| 2002/0143585 A1 | 10/2002 | Kodama | | 2004/0172311 A1 | 9/2004 | Kauderer |
| 2002/0143586 A1 | 10/2002 | Kodama | | 2004/0181435 A9 | 9/2004 | Snell |
| 2002/0156655 A1 | 10/2002 | Matsuda | | 2004/0186753 A1 | 9/2004 | Kim |
| 2002/0161609 A1 | 10/2002 | Zizzamia | | 2004/0199410 A1 | 10/2004 | Feyen |
| 2002/0169641 A1 | 11/2002 | Wallace | | 2004/0204858 A1 | 10/2004 | Brumbaugh |
| 2002/0173995 A1 | 11/2002 | Schiminovich | | 2004/0220837 A1 | 11/2004 | Bonissone |
| 2002/0178033 A1 | 11/2002 | Yoshioka | | 2004/0220838 A1 | 11/2004 | Bonissone |
| 2003/0023462 A1 | 1/2003 | Heilizer | | 2004/0220839 A1* | 11/2004 | Bonissone et al. ............ 705/4 |
| 2003/0028404 A1 | 2/2003 | Herron et al. | | 2004/0220840 A1 | 11/2004 | Bonissone |
| 2003/0061075 A1 | 3/2003 | Heckman | | 2004/0230459 A1 | 11/2004 | Dordick |
| 2003/0069760 A1 | 4/2003 | Gelber | | 2004/0230460 A1 | 11/2004 | Thomas |
| 2003/0074231 A1 | 4/2003 | Renes | | 2004/0236611 A1 | 11/2004 | Bonissone |
| 2003/0078817 A1 | 4/2003 | Harrison | | 2004/0249678 A1 | 12/2004 | Henderson |
| 2003/0088443 A1 | 5/2003 | Majikes | | 2004/0249679 A1 | 12/2004 | Henderson |
| 2003/0088488 A1 | 5/2003 | Solomon | | 2004/0260594 A1 | 12/2004 | Maddox |
| 2003/0093302 A1 | 5/2003 | Quido | | 2004/0267577 A1 | 12/2004 | Nakai |
| 2003/0093304 A1 | 5/2003 | Keller | | 2004/0267578 A1 | 12/2004 | Pearson |
| 2003/0097281 A1 | 5/2003 | Momose | | 2004/0267579 A1 | 12/2004 | Markman |
| 2003/0101080 A1 | 5/2003 | Zizzamia | | 2005/0022122 A1 | 1/2005 | Barrus et al. |
| 2003/0120557 A1 | 6/2003 | Evans et al. | | 2005/0027571 A1 | 2/2005 | Gamarnik |
| 2003/0126049 A1 | 7/2003 | Nagan | | 2005/0027572 A1 | 2/2005 | Goshert |
| 2003/0142043 A1 | 7/2003 | Matsueda | | 2005/0043971 A1 | 2/2005 | Hendrickson |
| 2003/0144874 A1 | 7/2003 | Barret et al. | | 2005/0055248 A1 | 3/2005 | Helitzer |
| 2003/0144888 A1 | 7/2003 | Baron | | 2005/0055249 A1 | 3/2005 | Helitzer |
| 2003/0158758 A1 | 8/2003 | Kanazawa | | 2005/0060203 A1 | 3/2005 | LaJoie |
| 2003/0167191 A1 | 9/2003 | Slabonik | | 2005/0060207 A1 | 3/2005 | Weidner |
| 2003/0172043 A1 | 9/2003 | Guyon et al. | | 2005/0060208 A1 | 3/2005 | Gianantoni |
| 2003/0176931 A1 | 9/2003 | Pednault et al. | | 2005/0071204 A1 | 3/2005 | Parankirinathan |
| 2003/0177032 A1 | 9/2003 | Bonissone | | 2005/0075911 A1 | 4/2005 | Craven |
| 2003/0182159 A1 | 9/2003 | Bonissone | | 2005/0080649 A1 | 4/2005 | Alvarez |
| 2003/0187693 A1 | 10/2003 | Oka | | 2005/0086084 A1 | 4/2005 | Dillard |
| 2003/0187696 A1 | 10/2003 | Bonissone | | 2005/0102168 A1 | 5/2005 | Thomas |
| 2003/0187697 A1 | 10/2003 | Bonissone | | 2005/0102171 A1 | 5/2005 | Ashley |
| 2003/0187698 A1 | 10/2003 | Bonissone | | 2005/0102172 A1 | 5/2005 | Sirmans |
| 2003/0187699 A1 | 10/2003 | Bonissone | | 2005/0108062 A1 | 5/2005 | Higgins |
| 2003/0187700 A1 | 10/2003 | Bonissone | | 2005/0108064 A1 | 5/2005 | Castleman |
| 2003/0187701 A1 | 10/2003 | Bonissone | | 2005/0108066 A1 | 5/2005 | Weidner |
| 2003/0187702 A1 | 10/2003 | Bonissone | | 2005/0114184 A1 | 5/2005 | Rock |
| 2003/0187703 A1 | 10/2003 | Bonissone | | 2005/0119919 A1 | 6/2005 | Eder |
| 2003/0187704 A1 | 10/2003 | Hashiguchi | | 2005/0119920 A1 | 6/2005 | Murphy |
| 2003/0187768 A1 | 10/2003 | Ryan | | 2005/0125253 A1 | 6/2005 | Bonissone |
| 2003/0195776 A1 | 10/2003 | Moore | | 2005/0125259 A1 | 6/2005 | Annappindi |
| 2003/0208385 A1 | 11/2003 | Zander | | 2005/0131742 A1 | 6/2005 | Hoffman |
| 2003/0233260 A1 | 12/2003 | Snell | | 2005/0137914 A1 | 6/2005 | Schmitter |
| 2003/0233323 A1 | 12/2003 | Bilski | | 2005/0137915 A1 | 6/2005 | Martin |
| 2003/0236685 A1 | 12/2003 | Buckner | | 2005/0144045 A1 | 6/2005 | Corsi |
| 2003/0236686 A1 | 12/2003 | Matsumoto | | 2005/0144046 A1 | 6/2005 | Schloss |
| 2004/0004453 A1 | 1/2004 | Junnan et al. | | 2005/0144047 A1 | 6/2005 | Tran |
| 2004/0019575 A1 | 1/2004 | Talbot | | 2005/0154618 A1 | 7/2005 | Kita |
| 2004/0024618 A1 | 2/2004 | Martin | | 2005/0154619 A1 | 7/2005 | Barr |
| 2004/0024619 A1 | 2/2004 | DiBella | | 2005/0182666 A1 | 8/2005 | Perry |
| 2004/0024620 A1 | 2/2004 | Robertson | | 2005/0182667 A1 | 8/2005 | Metzger |

| | | |
|---|---|---|
| 2005/0182670 A1 | 8/2005 | Burgess |
| 2005/0187799 A1 | 8/2005 | McGiffin |
| 2005/0192849 A1 | 9/2005 | Spalding |
| 2005/0203778 A1 | 9/2005 | Chen |
| 2005/0209894 A1 | 9/2005 | Wilson |
| 2005/0216426 A1 | 9/2005 | Weston et al. |
| 2005/0228699 A1 | 10/2005 | Samuels |
| 2005/0240447 A1 | 10/2005 | Kil |
| 2005/0246207 A1 | 11/2005 | Noonan |
| 2005/0256747 A1 | 11/2005 | Hellrigel |
| 2005/0261943 A1 | 11/2005 | Quarterman |
| 2005/0267783 A1 | 12/2005 | Zaccaria |
| 2005/0267785 A1 | 12/2005 | Parankirinathan |
| 2005/0273370 A1 | 12/2005 | Udell |
| 2005/0273371 A1 | 12/2005 | Callen |
| 2005/0278199 A1 | 12/2005 | Ghani |
| 2005/0288968 A1 | 12/2005 | Collins |
| 2005/0288971 A1 | 12/2005 | Cassandra |
| 2006/0015373 A1 | 1/2006 | Cuypers |
| 2006/0015374 A1 | 1/2006 | Ochs |
| 2006/0026044 A1 | 2/2006 | Smith |
| 2006/0026045 A1 | 2/2006 | Rothschild |
| 2006/0031104 A1 | 2/2006 | Gianantoni |
| 2006/0041454 A1 | 2/2006 | Matisonn |
| 2006/0047540 A1 | 3/2006 | Hutten |
| 2006/0059020 A1 | 3/2006 | Davidson |
| 2006/0064331 A1 | 3/2006 | Odermott |
| 2006/0064332 A1 | 3/2006 | Schoenbaum |
| 2006/0074724 A1 | 4/2006 | Schwartz |
| 2006/0080139 A1 | 4/2006 | Mainzer |
| 2006/0080153 A1 | 4/2006 | Fox |
| 2006/0085230 A1 | 4/2006 | Brill |
| 2006/0089860 A1 | 4/2006 | Fitzmorris |
| 2006/0089861 A1 | 4/2006 | King |
| 2006/0095301 A1 | 5/2006 | Gay |
| 2006/0095304 A1 | 5/2006 | Madison |
| 2006/0095305 A1 | 5/2006 | Madison |
| 2006/0100912 A1 | 5/2006 | Kumar |
| 2006/0108434 A1 | 5/2006 | Kallestad |
| 2006/0122871 A1 | 6/2006 | Cowley |
| 2006/0129427 A1 | 6/2006 | Wennberg |
| 2006/0129428 A1 | 6/2006 | Wennberg |
| 2006/0167735 A1 | 7/2006 | Ward |
| 2006/0241982 A1 | 10/2006 | Seifert |
| 2006/0253305 A1 | 11/2006 | Dougherty |
| 2006/0287892 A1 | 12/2006 | Jones |
| 2007/0011033 A1 | 1/2007 | Atkinson |
| 2007/0118554 A1 | 5/2007 | Chang |
| 2009/0055226 A1 | 2/2009 | Tritz |
| 2009/0055227 A1 | 2/2009 | Bakos |
| 2009/0070152 A1 | 3/2009 | Sperske |
| 2009/0076860 A1 | 3/2009 | Pelz |
| 2009/0089101 A1 | 4/2009 | Hashim |
| 2009/0094065 A1 | 4/2009 | Hyde |
| 2009/0094067 A1 | 4/2009 | Jung |
| 2009/0099877 A1 | 4/2009 | Hyde |
| 2009/0100095 A1 | 4/2009 | Jung |
| 2009/0106054 A1 | 4/2009 | Sarel |
| 2009/0119133 A1 | 5/2009 | Yeransian |
| 2009/0157433 A1 | 6/2009 | Schmidt |
| 2009/0177500 A1 | 7/2009 | Swahn |
| 2009/0182584 A1 | 7/2009 | Harkensee |
| 2009/0182678 A1 | 7/2009 | Braun |
| 2009/0187434 A1 | 7/2009 | Cowles |
| 2009/0192828 A1 | 7/2009 | Yunker |
| 2009/0198523 A1 | 8/2009 | Grieder |
| 2009/0198527 A1 | 8/2009 | Guerrero |
| 2009/0204447 A1 | 8/2009 | Tucker |
| 2009/0210256 A1 | 8/2009 | Upadhyayula |
| 2009/0216567 A1 | 8/2009 | Dust |
| 2009/0228308 A1 | 9/2009 | Chien |
| 2009/0240532 A1 | 9/2009 | Gore |
| 2009/0248453 A1 | 10/2009 | Seybold |
| 2009/0254379 A1 | 10/2009 | Adams |
| 2009/0265190 A1 | 10/2009 | Ashley |
| 2009/0265191 A1 | 10/2009 | Evanitsky |
| 2009/0276247 A1 | 11/2009 | Howell |
| 2009/0276249 A1 | 11/2009 | Dust |
| 2009/0281841 A1 | 11/2009 | Basak |
| 2009/0287509 A1 | 11/2009 | Basak |
| 2009/0287512 A1 | 11/2009 | Bonissone |
| 2009/0299773 A1 | 12/2009 | Gore |
| 2009/0299774 A1 | 12/2009 | Gore |
| 2009/0299775 A1 | 12/2009 | Gore |
| 2009/0299776 A1 | 12/2009 | Gore |
| 2009/0307015 A1 | 12/2009 | Gore |

FOREIGN PATENT DOCUMENTS

| | | |
|---|---|---|
| WO | WO 98/22936 | 5/1998 |
| WO | WO 01/20512 A2 | 3/2001 |
| WO | 01/93193 | 6/2001 |
| WO | 01/63445 | 8/2001 |
| WO | WO 01/88834 A2 | 11/2001 |
| WO | 2004/08256 | 11/2004 |

OTHER PUBLICATIONS

Haberman et al., "Generalised Linear Models in Actuarial Work" Presented to the Staple Inn Actuarial Society, Feb. 2, 1988.*

International Search Report mailed Dec. 7, 2009, PCT/US04/08256.

Keeney et al., *Decisions with Multiple Objective: Preferences and Value Tradeoffs* book, 1976, John Wiley & Sons, Inc., preface pages, acknowledgement page, Chapter Headings p. xv, Contents pp. xvii-xxviii.

Duda et al., "*Pattern Classification*" book, $2^{nd}$ Edition, John Wiley & Songs, Inc., 2001, Contents pp. vii-xvi, Preface pp. xvii-xx.

Shafer, "*A Mathematical Theory of Evidence*" book, published by Princeton University Press, Princeton and London, 1976, Preface pp. ix-x, Contents pp. xi-xiii.

Kuncheva et al., "*Designing Classifier Fusion System by Genetic Algorithms*," IEEE Transactions of Evolutionary Computation, vol. 4, No. 4, Sep. 2000, pp. 327-336.

Chibelushi et al., "*Adaptive Classifier Integration for Robust Pattern Recognition*," IEEE Transactions on Systems, Man, and Cybernetics—Part B: Cybernetics, vol. 29, No. 6, Dec. 1999, pp. 902-907.

Dempster, "*Upper and Lower Probabilities Induced By A Multivalued Mapping*," Annals of Mathematical Statistics, Harvard University, 38:, pp. 325-339, 1967.

Bonissone et al., "*Selecting Uncertainty Calculi and Granularity and Experiment in Trading-Off Precision and Complexity*," Uncertainty in Artificial Intelligence, Kanal & Lemmer (editors), pp. 217-247, Elsevier Science Publishers B.V. (North-Holland), 1986.

Bonissone, "*Summarizing and Propagating Uncertain Information With Triangular Norms*," International Journal of Approximate Reasoning, Elsevier Science Publishing Co., Inc., New York, NY, 1: pp. 71-101, 1987.

Krzyzak et al., "*Methods of Combining Multiple Classifiers and Their Applications to Handwriting Recognition*," IEEE Transactions on Systems, Man, and Cybernetics, vol. 22, No. 3, pp. 418-435, May/Jun. 1992.

Fairhurst et al., "*Enhancing Consensus in Multiple Expert Decision Fusion*," IEE Proceedings Vis. Image Signal Process, vol. 147, No. 1, 2000.

Ruspini, "*Epistemic Logics, Probability, and the Calculus of Evidence*," Proc. Tenth Intern Joint Conf. on Artificial Intelligence, Milan, Italy, Reasoning pp. 924-931, 1987.

Schweizer et al., "*Associative Functions and Abstract Semigroups*," Publicationes Mathematicae Debrecen, 10:pp. 69-81, 1963.

Srivastava et al., "*A Hybrid Neural Network Model for Fast Voltage Contingency Screening and Ranking,*" International Journal of Electrical Power & Energy Systems, vol. 22, No. 1, pp. 35-42.

Lampinen et al., "*Selection of Training Samples for Learning With Hints,*"IJCNN 1999 IEEE, International Joint Conference on Neural Networks, vol. 2, pp. 1438-1441.

Abu-Mostafa, "*Hints and the VC Dimension,*" Neural Computation, vol. 5, No. 2, Mar. 1993, pp. 278-288.

Ding et al., "*Multi-class Protein Fold Recognition Using Support Vector Machines and Neural Networks,*"Bioinformatics, vol. 17, No. 4, 2001, pp. 349-358.

Dorizzi et al., "*Cooperation and Modularity for Classification Through Neural Network Techniques,*" Proceedings of 1993 International Conference on System, Man and cybernetics, vol. 3, pp. 469-474.

Price at al., "*Pairwise Neural Network Classifiers with Probabilistic Outputs,*" Tesauro et al., eds., Neural Information Processing Systems, vol. 7, 1994, pp. 1109-1116.

Vaughn et al., "*Interpretation and Knowledge Discovery from a Multilayer Perception Network that Performs Whole Life Assurance Risk Assessment,*" Neural Computing & Applications, Springer-Verlag London Limited, vol. 6, 1997, pp. 201-213.

Collins et al., "*An Application of a Multiple Neural Network Learning System to Emulation of Mortgage Underwriting Judgements,*" Proceedings of the IEEE International Conference on Neural Networks, 1988, pp. II-459 through II-466.

Nossek et al., "*Classification Systems Based on Neural Networks,*" the Fifth IEEE International Workshop on Cellular Neural Networks and their Applications, London, England, Apr. 14-17, 1998, pp. 26-33.

Abu-Mostafa, "*A Method for Learning from Hints,*" in Hanson, Cowan & Giles eds., Advances in Neural Information Processing Systems, vol. 5, pp. 73-80, Morgan Kaufmann, San Mateo, CA.

Beradi et al., "*The Effect of Misclassification Costs on Neural Network Classifiers,*" Decision Sciences, vol. 30, No. 3, summer 1999, pp. 659-682.

Tong et al., "*Linguistic Approach to Decisionmaking with Fuzzy Sets,*" IEEE Transactions on Systems, Man, and Cybernetics, vol. SMC-10, No. 11, Nov. 1990, pp. 716-723.

Maccrimmon, "*An Overview of Multiple Objective Decision Making,*" editors Cochrane and Zeleny, 1973, pp. 18-44.

Kung et al., "*On Finding the Maxima of a Set of Vectors,*" Journal of the Association for Computing Machinery, vol. 22, No. 4, Oct. 1975, pp. 469-476.

Bentley et al., "*On the Average Number of Maxima in a Set of Vectors and Applications,*" Journal of the Association for Computing Machinery, vol. 25, No. 4, Oct. 1978, pp. 536-543.

Simon, "*A Behavioral Model of Rational Choice,*" Quarterly Journal of Economics, vol. 69, No. 1, Feb. 1955, pp. 99-118.

Zionts, "*Decision Making: Some Experiences, Myths and Observations,*" Multiple criteria Decision Making: Proceedings of the Twelfth International Conference, Lecture notes in Economics and Mathematical Systems, vol. 448, Hagen (Germany), 1997, pp. 233-241.

Friedman, "*Multivariate Adaptive Regression Splines,*" Annals of Statistics, SLAC PUB-4960 Rev, Tech Report 102 Rev, Aug. 1990, pp. 1-79.

Schumaker, Discussion of Friedman paper, "*Multivariate Adaptive Regression Splines,*" pp. 1-2.

Owen, Discussion of Friedman paper, "*Multivariate Adaptive Regression Splines,*"pp. 1-9 & Figs. 1-4.

Stone, Discussion of Friedman paper, "*Multivariate Adaptive Regression Splines,*"pp. 1-3.

Sullivan, Some Comments on Friedman paper, "*Multivariate Adaptive Regression Splines,*" pp. 1-6.

Breiman, Discussion of Friedman paper, "*Multivariate Adaptive Regression Splines,*" 8 pages.

Golubev et al., Discussion of Friedman paper, "*Multivariate Adaptive Regression Splines,*" 2 pages.

Buja et al., Discussion of Friedman paper, "*Multivariate Adaptive Regression Splines,*" pp. 1-5.

Gu et al., Comments on Friedman paper, "*Multivariate Adaptive Regression Splines,*" pp. 1-10, rev. Jun. 5, 1990.

Barron et al., Discussion of Friedman paper, "*Multivariate Adaptive Regression Splines,*" pp. 1-12 and 2 pages of Tables, Jul. 1990, University of IL.

Friedman, "*Rejoinder,*"pp. 1-14.

Gonzalez et al., "*A case-based reasoning approach to real estate property appraisal,*" Systems with Applications, vol. 4, pp. 229-246, 1992.

Bonissone et al., "*Evolutionary optimization of fuzzy decision systems for automated insurance underwriting,*" Proceedings of the 2002 IEEE International Conference on Fuzzy Systems, May 12-17, 2002, pp. 1003-1008.

Bonissone et al, "*Fuzzy case-based reasoning for decision making,*" 2001 IEEE International Fuzzy Systems Conference, pp. 995-998.

Foltin et al., "*Beyond expert systems: Neural networks in accounting,*" National Public Accountant, Jun. 1996, pp. 26-30, v41n6.

Goetz, "A Fuzzy Future for MIS?", Informationweek, p. 51, Feb. 25, 1991, ISSN: 8750-6874. Dialog ID No. 01544473, From Dialog file 16 (Gale Group).

Watje, et al., U.S. Appl. No. 09/510,535.

Apte, et al., RAMP: Rules Abstraction for Modeling and Prediction, IBM Research Division Technical Report RC-20271, IBM T.J. Watson Research Center, Jan. 12, 1996, pp. 1-14.

Finger, Robert J., Chapter 6 Risk Classification, Foundations of Casualty Actuarial Science, 4th Edition 2001, pp. 287-341.

Murphy, et al., Using Generalized Liner Models To Build Dynamic Pricing Systems, Casualty Actuarial Science, Winter 2000, pp. 106-139.

Brockett, et al., Operations Research in Insurance: A Review, Transactions of Society of Actuaries, 1995, vol. 47, pp. 7-87.

Aggour, et al., Automating the Underwriting of Insurance Applications, AI Magazine, Fall 2006, pp. 36-50.

Allwein et al., "Reducing Multiclass to Binary: a Unifying Approach for Margin Classifiers", Journal of Machine Learning Research, vol. 1, (2000), pp. 113-141.

Rubtsov et al., "A Unified Format for Trained Neural Network Description", Neural Network, Proceedings IJCNN '01 International Joint Conference, vol. 4, pp. 2367-2372, Meeting date: Jul. 15-19, 2001.

Yang, "An Evaluation of Statistical Approaches to Text Categorization", Kluwer Academic Publishers, Information Retrieval 1, pp. 69-90.

Foltin et al., "*Beyond expert systems: Neural networks in accounting,*" National Public Accountant, Jun. 1996, pp. 26-30, v41n6.

Goetz, "A Fuzzy Future for MIS?", Informationweek, p. 51, Feb. 25, 1991, ISSN: 8750-6874. Dialog ID No. 01544473, From Dialog file 16 (Gale Group).

Humpert, Bidirectional Associative Memory with Several Patterns, 1990, ISU, CS-122, I-741-1-750.

Waxman et al., "Information Fusion for Image Analysis: Geospatial Foundations for Higher Fusion", 2002, ISIF, 562-569.

Yap, Jr. et al., "Generalized Associative Memory Models for Data Fusion", 2003, IEEE, 0-7803-7898-9/03, 2528-2533.

Goetz, "Clearing up fuzzy logic—Forum—Column", Software Magazine, Jan. 1992, Wiesner Publications, Inc.

Nakao, et al., General Social Survey Methodological Report No. 70, Computing 1989, Occupational Prestige Scores, pp. 1-65.

Flores, et al. Robust Logistic Regression for Insurance Risk Classification, University Carlos III de Madrid, Nov. 2001, pp. 1-20.

Collins, et al., An Application of a Multiple Network Learning System to Emulation of Mortgage Underwriting Judgements, IEEE Service Center, 1988, pp. 11-459-11-466.

Schlesinger, Insurance Demand Without the Expected-Utility Paradigm, Journal of Risk and Insurance, Oct. 1996, pp. 1-29.

Subbu, et al., Modeling and Convergence Analysis of Distributed Coevolutionary Algorithms, IEEE, 2000, pp. 1276-1283.

http://web.archive.org/web/20021201125553/http://www.echoecho.com/jsforms02.htm.

Jablonoswki, Fuzzy Logic and Insurance Decisions Society of Chartered Property and Casualty Underwriters CPCU Journal Sep. 1991 vol. 44 Issue 3 p. 181-187.

Qureshi, Artificial Intelligence in Accounting & Business The National Public Accountant Sep. 1998 vol. 43 Issue 7 p. 13-18.

Nikolopoulos, A Hybrid Machine Learning System and its Application to Insurance Underwriting Evolutionary Computation 1994 IEEE World Cong on Computation Intell Proc of the first IEEE Conf Jun. 1994 p. 692-695 vol. 2.

Young, Adjusting Indicted Insurance Rates: Fuzzy Rules That Consider Both Experience and Auxiliary Data Proceeding of the Casualty Actuarial Society 1997.

H. C. Calpine and A. Golding, "Some properties of Pareto optimal choices in decision problems," Int. J. Manage. Sci., vol. 4, No. 2, pp. 141-147, 1976.

* cited by examiner

| T(x,y) | | | | | | |
|---|---|---|---|---|---|---|
| | Source 1 | | Source 2 | | | |
| | | Preferred Best | Preferred | Select | Standard Plus | Standard | Sent_to_UW |
| CLASSES | I1 | 0.85 | 0.1 | 0.05 | 0 | 0 | 0 |
| | | 0.8 | | | | | |
| | | 0.15 | | | | | |
| CLASSES | Preferred Best | 0.05 | | | | | |
| | Preferred | 0 | | | | | |
| | Select | 0 | | | | | |
| | Standard Plus | 0 | | | | | |
| | Standard | | | | | | |
| | Sent_to_UW | | | | | | |

| T3 = min(x,y) | | Preferred Best | D(M2) | | | | |
|---|---|---|---|---|---|---|---|
| | | | Preferred | Select | StandardPlus | Standard | Sent_to_UW |
| D(M1) | | 0.9 | 0.05 | 0.05 | 0 | 0 | 0 |
| Preferred Best | 0.8 | 0.800 | 0.050 | 0.050 | 0 | 0 | 0.000 |
| Preferred | 0.15 | 0.150 | 0.050 | 0.050 | 0 | 0 | 0.000 |
| Select | 0.05 | 0.050 | 0.050 | 0.050 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 6

| T2.5 = [x^(-1)+y^(-1)-1]^(-1) | | Preferred Best | D(M2) | | | | |
|---|---|---|---|---|---|---|---|
| | | | Preferred | Select | StandardPlus | Standard | Sent_to_UW |
| D(M1) | | 0.9 | 0.05 | 0.05 | 0 | 0 | 0 |
| Preferred Best | 0.8 | 0.735 | 0.049 | 0.049 | 0 | 0 | 0.000 |
| Preferred | 0.15 | 0.148 | 0.039 | 0.039 | 0 | 0 | 0.000 |
| Select | 0.05 | 0.050 | 0.026 | 0.026 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 7

| T2 = x*y | | Preferred Best | D(M2) | | | | |
|---|---|---|---|---|---|---|---|
| | | | Preferred | Select | StandardPlus | Standard | Sent_to_UW |
| D(M1) | | 0.9 | 0.05 | 0.05 | 0 | 0 | 0 |
| Preferred Best | 0.8 | 0.720 | 0.040 | 0.040 | 0 | 0 | 0.000 |
| Preferred | 0.15 | 0.135 | 0.008 | 0.008 | 0 | 0 | 0.000 |
| Select | 0.05 | 0.045 | 0.003 | 0.003 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 10

| T3 = min(x,y) | | Preferred Best | D(M2) | | | | |
|---|---|---|---|---|---|---|---|
| | | | Preferred | Select | StandardPlus | Standard | Sent_to_UW |
| D(M1) | | 0.9 | 0.05 | 0.05 | 0 | 0 | 0 |
| Preferred Best | 0.8 | 0.615 | 0.038 | 0.038 | 0 | 0 | 0.000 |
| Preferred | 0.15 | 0.115 | 0.038 | 0.038 | 0 | 0 | 0.000 |
| Select | 0.05 | 0.038 | 0.038 | 0.038 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 11

| T2.5 = [x^(-1)+y^(-1)-1]^(-1) | | Preferred Best | D(M2) | | | | |
|---|---|---|---|---|---|---|---|
| | | | Preferred | Select | StandardPlus | Standard | Sent_to_UW |
| D(M1) | | 0.9 | 0.05 | 0.05 | 0 | 0 | 0 |
| Preferred Best | 0.8 | 0.633 | 0.043 | 0.043 | 0 | 0 | 0.000 |
| Preferred | 0.15 | 0.127 | 0.034 | 0.034 | 0 | 0 | 0.000 |
| Select | 0.05 | 0.043 | 0.022 | 0.022 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 12

| T2 = x*y | | Preferred Best | D(M2) | | | | No Decision: |
|---|---|---|---|---|---|---|---|
| | | | Preferred | Select | StandardPlus | Standard | Sent_to_UW |
| D(M1) | | 0.9 | 0.05 | 0.05 | 0 | 0 | 0 |
| Preferred Best | 0.8 | 0.720 | 0.040 | 0.040 | 0 | 0 | 0.000 |
| Preferred | 0.15 | 0.135 | 0.008 | 0.008 | 0 | 0 | 0.000 |
| Select | 0.05 | 0.045 | 0.003 | 0.003 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

| T1.5 = max(0, (x*0.5+y*0.5-1))^2 | | | | | | |
|---|---|---|---|---|---|---|
| | | | D(M2) | | | |
| D(M1) | | Preferred Best | Preferred | Select | StandardPlus | Standard Sent_to_UW |
| | | 0.9 | 0.05 | 0.05 | 0 | 0 0 |
| Preferred Best | 0.8 | 0.771 | 0.014 | 0.014 | 0 | 0 0.000 |
| Preferred | 0.15 | 0.113 | 0.000 | 0.000 | 0 | 0 0.000 |
| Select | 0.05 | 0.030 | 0.000 | 0.000 | 0 | 0 0.000 |
| StandardPlus | 0 | 0 | 0 | 0 | 0 | 0 0 |
| Standard | 0 | 0 | 0 | 0 | 0 | 0 0 |
| Sent_to_UW | 0 | 0 | 0 | 0 | 0 | 0 0 |

FIG. 8

| T1 = max(0, x+y-1) | | | | | | |
|---|---|---|---|---|---|---|
| | | | D(M2) | | | |
| D(M1) | | Preferred Best | Preferred | Select | StandardPlus | Standard Sent_to_UW |
| | | 0.9 | 0.05 | 0.05 | 0 | 0 0 |
| Preferred Best | 0.8 | 0.700 | 0.000 | 0.000 | 0 | 0 0.000 |
| Preferred | 0.15 | 0.050 | 0.000 | 0.000 | 0 | 0 0.000 |
| Select | 0.05 | 0.000 | 0.000 | 0.000 | 0 | 0 0.000 |
| StandardPlus | 0 | 0 | 0 | 0 | 0 | 0 0 |
| Standard | 0 | 0 | 0 | 0 | 0 | 0 0 |
| Sent_to_UW | 0 | 0 | 0 | 0 | 0 | 0 0 |

FIG. 9

| T1.5 = max(0, (x*0.5+y*0.5-1))^2 | | | | | | | |
|---|---|---|---|---|---|---|---|
| | | | D(M2) | | | | No Decision: |
| D(M1) | | Preferred Best | Preferred | Select | StandardPlus | Standard | Sent_to_UW |
| | | 0.9 | 0.05 | 0.05 | 0 | 0 | 0 |
| Preferred Best | 0.8 | 0.807 | 0.016 | 0.016 | 0 | 0 | 0.000 |
| Preferred | 0.15 | 0.128 | 0.000 | 0.000 | 0 | 0 | 0.000 |
| Select | 0.05 | 0.034 | 0.000 | 0.000 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 13

| T1 = max(0, x+y-1) | | | | | | | |
|---|---|---|---|---|---|---|---|
| | | | D(M2) | | | | No Decision: |
| D(M1) | | Preferred Best | Preferred | Select | StandardPlus | Standard | Sent_to_UW |
| | | 0.9 | 0.05 | 0.05 | 0 | 0 | 0 |
| Preferred Best | 0.8 | 0.933 | 0.000 | 0.000 | 0 | 0 | 0.000 |
| Preferred | 0.15 | 0.067 | 0.000 | 0.000 | 0 | 0 | 0.000 |
| Select | 0.05 | 0.000 | 0.000 | 0.000 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 14

|  | Preferred Best | Preferred | Select | Standard Plus | Standard | Sent_to _UW |
|---|---|---|---|---|---|---|
| T3 = min(x,y) | 0.615 | 0.038 | 0.038 | 0 | 0 | 0 |
| T2.5 = [x^(-1)+y^(-1)-1]^(-1) | 0.633 | 0.034 | 0.022 | 0 | 0 | 0 |
| T2 = x*y | 0.720 | 0.008 | 0.003 | 0 | 0 | 0 |
| T1.5 = max(0, (x^0.5+y^0.5-1))^2 | 0.807 | 0.000 | 0.000 | 0 | 0 | 0 |
| T1 = max(0, x+y-1) | 0.933 | 0.000 | 0.000 | 0 | 0 | 0 |

FIG. 15

| P | $r_1$ | $r_2$ |  | $r_N$ | U |
|---|---|---|---|---|---|
| $r_1$ | 1 | 0.3 | 0.1 | 0 | 0 | 1 |
| $r_2$ | 0.3 | 1 | 0.3 | 0.1 | 0 | 1 |
|  | 0.1 | 0.3 | 1 | 0.3 | 0.1 | 1 |
|  | 0 | 0.1 | 0.3 | 1 | 0.3 | 1 |
| $r_N$ | 0 | 0 | 0.1 | 0.3 | 1 | 1 |
| U | 1 | 1 | 1 | 1 | 1 | 1 |

FIG. 16

|  | Preferred Best | Preferred | Select | Standard Plus | Standard | Sent_to _UW | Normalized Confidence |
|---|---|---|---|---|---|---|---|
| T3 = min(x,y) | 0.115 | 0.038 | 0.038 | 0 | 0 | 0 | 0.438 |
| T2.5 = [x^(-1)+y^(-1)-1]^(-1) | 0.127 | 0.043 | 0.022 | 0 | 0 | 0 | 0.438 |
| T2 = x*y | 0.135 | 0.040 | 0.003 | 0 | 0 | 0 | 0.434 |
| T1.5 = max(0, (x^0.5+y^0.5-1))^2 | 0.128 | 0.016 | 0.000 | 0 | 0 | 0 | 0.416 |
| T1 = max(0, x+y-1) | 0.067 | 0.000 | 0.000 | 0 | 0 | 0 | 0.373 |

FIG. 17

|  | Preferred Best | Preferred | Select | Standard Plus | Standard | Sent_to _UW | Normalized Confidence |
|---|---|---|---|---|---|---|---|
| T3 = min(x,y) | 0.563 | 0.125 | 0.063 | 0 | 0 | 0 | 0.816 |
| T2.5 = [x^(-1)+y^(-1)-1]^(-1) | 0.585 | 0.110 | 0.051 | 0 | 0 | 0 | 0.811 |
| T2 = x*y | 0.720 | 0.053 | 0.018 | 0 | 0 | 0 | 0.841 |
| T1.5 = max(0, (x^0.5+y^0.5-1))^2 | 0.922 | 0.000 | 0.000 | 0 | 0 | 0 | 0.943 |
| T1 = max(0, x+y-1) | 1.000 | 0.000 | 0.000 | 0 | 0 | 0 | 1.000 |

T3 = min(x,y)

| D(M1) | Preferred Best | D(M2) Preferred | Select | Standard Plus | Standard | Sent_to_UW |
|---|---|---|---|---|---|---|
| | 0.6 | 0.05 | 0.05 | | | 0.3 |
| Preferred Best 0.8 | 0.600 | 0.050 | 0.050 | 0 | 0 | 0.300 |
| Preferred 0.15 | 0.150 | 0.150 | 0.150 | 0 | 0 | 0.150 |
| Select 0.05 | 0.050 | 0.050 | 0.050 | 0 | 0 | 0.050 |
| StandardPlus 0 | 0 | 0 | 0 | 0 | 0 | 0 |
| Standard 0 | 0 | 0 | 0 | 0 | 0 | 0 |
| Sent_to_UW 0 | 0 | 0 | 0 | 0 | 0 | 0 |

| D(M1) | Preferred Best | D(M2) Preferred | Select | Standard Plus | Standard | Sent_to_UW |
|---|---|---|---|---|---|---|
| | 0.6 | 0.05 | 0.05 | | | 0.3 |
| Preferred Best 0.8 | 0.522 | 0.049 | 0.049 | 0 | 0 | 0.279 |
| Preferred 0.15 | 0.136 | 0.039 | 0.039 | 0 | 0 | 0.111 |
| Select 0.05 | 0.048 | 0.026 | 0.026 | 0 | 0 | 0.045 |
| StandardPlus 0 | 0 | 0 | 0 | 0 | 0 | 0 |
| Standard 0 | 0 | 0 | 0 | 0 | 0 | 0 |
| Sent_to_UW 0 | 0 | 0 | 0 | 0 | 0 | 0 |

| D(M1) | Preferred Best | D(M2) Preferred | Select | Standard Plus | Standard | Sent_to_UW |
|---|---|---|---|---|---|---|
| | 0.6 | 0.05 | 0.05 | | | 0.3 |
| Preferred Best 0.8 | 0.480 | 0.040 | 0.040 | 0 | 0 | 0.240 |
| Preferred 0.15 | 0.099 | 0.008 | 0.008 | 0 | 0 | 0.045 |
| Select 0.05 | 0.030 | 0.003 | 0.003 | 0 | 0 | 0.015 |
| StandardPlus 0 | 0 | 0 | 0 | 0 | 0 | 0 |
| Standard 0 | 0 | 0 | 0 | 0 | 0 | 0 |
| Sent_to_UW 0 | 0 | 0 | 0 | 0 | 0 | 0 |

FIG. 24

T3 = min(x,y)

| D(M1) | Preferred Best | D(M2) Preferred | Select | StandardPlus | Standard | Sent_to_UW |
|---|---|---|---|---|---|---|
| | 0.6 | 0.05 | 0.05 | | | 0.3 |
| Preferred Best 0.8 | 0.375 | 0.031 | 0.031 | 0 | 0 | 0.188 |
| Preferred 0.15 | 0.094 | 0.031 | 0.031 | 0 | 0 | 0.094 |
| Select 0.05 | 0.031 | 0.031 | 0.031 | 0 | 0 | 0.031 |
| StandardPlus 0 | 0 | 0 | 0 | 0 | 0 | 0 |
| Standard 0 | 0 | 0 | 0 | 0 | 0 | 0 |
| Sent_to_UW 0 | 0 | 0 | 0 | 0 | 0 | 0 |

| D(M1) | Preferred Best | D(M2) Preferred | Select | StandardPlus | Standard | Sent_to_UW |
|---|---|---|---|---|---|---|
| | 0.6 | 0.05 | 0.05 | | | 0.3 |
| Preferred Best 0.8 | 0.381 | 0.036 | 0.036 | 0 | 0 | 0.204 |
| Preferred 0.15 | 0.100 | 0.028 | 0.028 | 0 | 0 | 0.081 |
| Select 0.05 | 0.035 | 0.019 | 0.019 | 0 | 0 | 0.033 |
| StandardPlus 0 | 0 | 0 | 0 | 0 | 0 | 0 |
| Standard 0 | 0 | 0 | 0 | 0 | 0 | 0 |
| Sent_to_UW 0 | 0 | 0 | 0 | 0 | 0 | 0 |

FIG. 26

T2 = x*y   No Decision:

| D(M1) | Preferred Best | D(M2) Preferred | Select | StandardPlus | Standard | Sent_to_UW |
|---|---|---|---|---|---|---|
| | 0.6 | 0.05 | 0.05 | | | 0.3 |
| Preferred Best 0.8 | 0.480 | 0.040 | 0.040 | 0 | 0 | 0.240 |
| Preferred 0.15 | 0.099 | 0.008 | 0.008 | 0 | 0 | 0.045 |
| Select 0.05 | 0.030 | 0.003 | 0.003 | 0 | 0 | 0.015 |
| StandardPlus 0 | 0 | 0 | 0 | 0 | 0 | 0 |
| Standard 0 | 0 | 0 | 0 | 0 | 0 | 0 |
| Sent_to_UW 0 | 0 | 0 | 0 | 0 | 0 | 0 |

FIG. 22

T1.5 = max(0, (x*0.5+y*0.5-1))^2

| | | D(M2) | | | | | No Decision: |
|---|---|---|---|---|---|---|---|
| D(M1) | | Preferred Best | Preferred | Select | Standard Plus | Standard | Sent_to_UW |
| | | 0.6 | 0.05 | 0.05 | 0 | 0 | 0.3 |
| Preferred Best | 0.8 | 0.448 | 0.014 | 0.014 | 0 | 0 | 0.195 |
| Preferred | 0.15 | 0.026 | 0.000 | 0.000 | 0 | 0 | 0.000 |
| Select | 0.05 | 0.000 | 0.000 | 0.000 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 23

T1 = max(0, x+y-1)

| | | D(M2) | | | | | No Decision: |
|---|---|---|---|---|---|---|---|
| D(M1) | | Preferred Best | Preferred | Select | Standard Plus | Standard | Sent_to_UW |
| | | 0.6 | 0.05 | 0.05 | 0 | 0 | 0.3 |
| Preferred Best | 0.8 | 0.400 | 0.000 | 0.000 | 0 | 0 | 0.100 |
| Preferred | 0.15 | 0.000 | 0.000 | 0.000 | 0 | 0 | 0.000 |
| Select | 0.05 | 0.000 | 0.000 | 0.000 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 27

T1.5 = max(0, (x*0.5+y*0.5-1))^2

| | | D(M2) | | | | | No Decision: |
|---|---|---|---|---|---|---|---|
| D(M1) | | Preferred Best | Preferred | Select | Standard Plus | Standard | Sent_to_UW |
| | | 0.6 | 0.05 | 0.05 | 0 | 0 | 0.3 |
| Preferred Best | 0.8 | 0.642 | 0.020 | 0.020 | 0 | 0 | 0.280 |
| Preferred | 0.15 | 0.038 | 0.000 | 0.000 | 0 | 0 | 0.000 |
| Select | 0.05 | 0.000 | 0.000 | 0.000 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

FIG. 28

T1 = max(0, x+y-1)

| | | D(M2) | | | | | No Decision: |
|---|---|---|---|---|---|---|---|
| D(M1) | | Preferred Best | Preferred | Select | Standard Plus | Standard | Sent_to_UW |
| | | 0.6 | 0.05 | 0.05 | 0 | 0 | 0.3 |
| Preferred Best | 0.8 | 0.600 | 0.000 | 0.000 | 0 | 0 | 0.200 |
| Preferred | 0.15 | 0.000 | 0.000 | 0.000 | 0 | 0 | 0.000 |
| Select | 0.05 | 0.000 | 0.000 | 0.000 | 0 | 0 | 0.000 |
| StandardPlus | 0 | 0 | 0 | 0 | 0 | 0 | 0 |
| Standard | 0 | 0 | 0 | 0 | 0 | 0 | 0 |
| Sent_to_UW | 0 | 0 | 0 | 0 | 0 | 0 | 0 |

| P | $r_1$ | $r_2$ | | $r_N$ | U |
|---|---|---|---|---|---|
| $r_1$ | 1 | 0 | 0 | 0 | 1 |
| $r_2$ | 0 | 1 | 0 | 0 | 1 |
| | 0 | 0 | 1 | 0 | 1 |
| | 0 | 0 | 0 | 1 | 0 | 1 |
| $r_N$ | 0 | 0 | 0 | 0 | 1 | 1 |
| U | 1 | 1 | 1 | 1 | 1 | 1 |

FIG. 29

| D(FLE) | D(FUS) | | | | | Sent_to_UW |
|---|---|---|---|---|---|---|
| | Preferred Best | Preferred | Select | Standard Plus | Standard | |
| Preferred Best | A | | | | | |
| Preferred | | A | | | C | |
| Select | | | A | | | B |
| Standard Plus | | C | | A | | |
| Standard | | | | | A | |
| Sent_to_UW | | | D | | | E |

FIG. 30

| CONFIDENCE THRESHOLD T1 | 0 | 0.025 | 0.05 | 0.075 | 0.1 | 0.125 | 0.15 |
|---|---|---|---|---|---|---|---|
| NO FUSION DECISIONS | 36 | 80 | 97 | 122 | 148 | 182 | 212 |
| AGREEMENTS | 1669 | 1661 | 1652 | 1641 | 1623 | 1604 | 1588 |
| FALSE POSITIVE | 82 | 52 | 48 | 40 | 35 | 29 | 25 |
| FALSE NEGATIVES | 43 | 43 | 42 | 39 | 36 | 32 | 27 |
| CORRECTIONS | 37 | 34 | 32 | 29 | 29 | 26 | 22 |
| COMPLETE DISAGREEMENT | 8 | 5 | 4 | 4 | 4 | 2 | 1 |
| TOTAL | 1875 | 1875 | 1875 | 1875 | 1875 | 1875 | 1875 |

FIG. 31

| CONFIDENCE THRESHOLD | 0 | 0.025 | 0.05 | 0.075 | 0.1 | 0.125 | 0.15 | 0.175 | 0.2 | 0.225 | 0.25 |
|---|---|---|---|---|---|---|---|---|---|---|---|
| NO FUSION DECISIONS | 37 | 47 | 55 | 56 | 59 | 62 | 68 | 75 | 84 | 90 | 94 |
| AGREEMENTS | 750 | 745 | 740 | 739 | 736 | 733 | 729 | 728 | 724 | 721 | 718 |
| FALSE POSITIVE | 23 | 20 | 18 | 18 | 18 | 18 | 16 | 13 | 11 | 10 | 9 |
| FALSE NEGATIVES | 16 | 15 | 15 | 15 | 15 | 15 | 15 | 13 | 11 | 9 | 9 |
| CORRECTIONS | 5 | 4 | 3 | 3 | 3 | 3 | 3 | 2 | 1 | 1 | 1 |
| COMPLETE DISAGREEMENT | 0 | 0 | 0 | 0 | 0 | 0 | 0 | 0 | 0 | 0 | 0 |
| TOTAL | 831 | 831 | 831 | 831 | 831 | 831 | 831 | 831 | 831 | 831 | 831 |

FIG. 32

DOMINANCE BASED RISK CLASSIFICATION (4404, 4006, 4008, 4010, 4012, 4014, 4016, 4018, 4002)

| CORRECT (UW) DECISION | | PB | P | Sel | Std+ | Std | P Nic | Std+Nic | Std Nic | UW | TOT |
|---|---|---|---|---|---|---|---|---|---|---|---|
| | PB | 55 | 0 | 0 | 0 | 0 | 0 | 0 | 0 | 47 | 102 |
| | P | 0 | 22 | 0 | 0 | 0 | 0 | 0 | 0 | 52 | 74 |
| | Sel | 0 | 0 | 16 | 0 | 0 | 0 | 0 | 0 | 66 | 82 |
| | Std+ | 0 | 0 | 0 | 10 | 0 | 0 | 0 | 0 | 61 | 71 |
| | Std | 0 | 0 | 0 | 0 | 3 | 0 | 0 | 0 | 43 | 46 |
| | P Nic | 0 | 0 | 0 | 0 | 0 | 28 | 0 | 0 | 32 | 60 |
| | Std+Nic | 0 | 0 | 0 | 0 | 0 | 0 | 8 | 0 | 62 | 70 |
| | Std Nic | 0 | 0 | 0 | 0 | 0 | 0 | 0 | 3 | 33 | 36 |
| | | 55 | 22 | 16 | 10 | 3 | 28 | 8 | 3 | 396 | 541 |

DOMINANCE BASED RISK CLASSIFICATION (4104, 4106, 4108, 4110, 4112, 4114, 4116, 4118, 4102)

| CORRECT (UW) DECISION | | PB | P | Sel | Std+ | Std | P Nic | Std+Nic | Std Nic | UW | TOT |
|---|---|---|---|---|---|---|---|---|---|---|---|
| | PB | 78 | 0 | 0 | 0 | 0 | 0 | 0 | 0 | 24 | 102 |
| | P | 1 | 22 | 0 | 0 | 0 | 0 | 0 | 0 | 51 | 74 |
| | Sel | 0 | 0 | 16 | 0 | 4 | 0 | 0 | 0 | 62 | 82 |
| | Std+ | 0 | 0 | 0 | 10 | 1 | 0 | 0 | 0 | 60 | 71 |
| | Std | 0 | 0 | 0 | 0 | 24 | 0 | 0 | 0 | 22 | 46 |
| | P Nic | 0 | 0 | 0 | 0 | 0 | 38 | 0 | 0 | 22 | 60 |
| | Std+Nic | 0 | 0 | 0 | 0 | 0 | 0 | 8 | 0 | 62 | 70 |
| | Std Nic | 0 | 0 | 0 | 0 | 0 | 0 | 0 | 11 | 25 | 36 |
| | | 79 | 22 | 16 | 10 | 29 | 38 | 8 | 11 | 328 | 541 |

|  | | CLASSIFIER ACTIONS | | | | | | | | | |
|---|---|---|---|---|---|---|---|---|---|---|---|
|  | | CLASSIFIER DECISIONS | | | | | | | | NO DECISION | |
| 4502 | | PB | P | Sel | Std+ | Std | P Nic | Std+Nic | Std Nic | UW | TOT |
| CORRECT ACTIONS | STANDARD REFERENCE DECISION — PB | 501 | 20 | 0 | 0 | 0 |  |  |  | 0 | 521 |
|  | P | 1 | 360 | 11 | 0 | 0 |  |  |  | 1 | 374 |
|  | Sel | 0 | 9 | 394 | 10 | 2 |  |  |  | 0 | 415 |
|  | Std+ | 0 | 0 | 8 | 304 | 24 |  |  |  | 22 | 358 |
|  | Std | 0 | 0 | 0 | 4 | 212 |  |  |  | 12 | 228 |
|  | P Nic |  |  |  |  |  | 296 | 5 | 0 | 0 | 301 |
|  | Std+Nic |  |  |  |  |  | 5 | 327 | 12 | 13 | 357 |
|  | Std Nic |  |  |  |  |  | 0 | 2 | 164 | 18 | 184 |
|  | NO DECISION — UW | 0 | 2 | 0 | 0 | 0 | 2 | 1 | 1 | 176 | 182 |
|  | TOT | 502 | 391 | 413 | 318 | 239 | 303 | 335 | 177 | 242 | 2920 |
|  | Perc. | 99.80% | 92.07% | 95.40% | 95.60% | 88.70% | 97.69% | 97.61% | 92.66% | 72.73% | |

| | | | Training | | Validation | |
|---|---|---|---|---|---|---|
| | | | | 4780 | | 4760 | | 4770 |
| | | | | COVERAGE | | COVERAGE |
| 4710 | PARTITION 1 | GLOBAL ACCURACY | 94.50% | 94.40% | 92.20% | 94.60% |
| | | POST PROCESSED | 96.40% | 90.90% | 94.20% | 94.40% |
| | | REL ACCURACY | 95.10% | 93.70% | 93.10% | 93.60% |
| | | POST PROCESSED | 97.10% | 90.60% | 94.80% | 89.60% |
| 4720 | PARTITION 2 | | TRAINING | | VALIDATION | |
| | | | | COVERAGE | | COVERAGE |
| | | GLOBAL ACCURACY | 94.05% | 94.20% | 91.70% | 94.30% |
| | | POST PROCESSED | 95.40% | 91.10% | 92.90% | 94.30% |
| | | REL ACCURACY | 95.00% | 93.50% | 92.90% | 93.20% |
| | | POST PROCESSED | 96.30% | 90.50% | 94.10% | 90.60% |
| 4730 | PARTITION 3 | | TRAINING | | VALIDATION | |
| | | | | COVERAGE | | COVERAGE |
| | | GLOBAL ACCURACY | 94.05% | 94.20% | 91.70% | 94.30% |
| | | POST PROCESSED | 95.40% | 91.10% | 92.90% | 94.30% |
| | | REL ACCURACY | 95.00% | 93.50% | 92.90% | 93.20% |
| | | POST PROCESSED | 96.30% | 90.50% | 94.10% | 90.60% |
| 4740 | PARTITION 4 | | TRAINING | | VALIDATION | |
| | | | | COVERAGE | | COVERAGE |
| | | GLOBAL ACCURACY | 93.90% | 94.80% | 92.20% | 94.10% |
| | | POST PROCESSED | 95.40% | 91.20% | 94.20% | 90.00% |
| | | REL ACCURACY | 94.90% | 93.80% | 93.70% | 93.10% |
| | | POST PROCESSED | 96.30% | 90.40% | 95.70% | 89.20% |
| 4750 | PARTITION 5 | | TRAINING | | VALIDATION | |
| | | | | COVERAGE | | COVERAGE |
| | | GLOBAL ACCURACY | 94.60% | 94.00% | 93.90% | 95.10% |
| | | POST PROCESSED | 96.30% | 90.30% | 95.00% | 91.50% |
| | | REL ACCURACY | 95.00% | 93.60% | 94.50% | 94.30% |
| | | POST PROCESSED | 96.70% | 90.00% | 95.40% | 90.80% |

FIG. 47

| MINIMUM | | TRAINING | | VALIDATION | |
|---|---|---|---|---|---|
| | | | COVERAGE | | COVERAGE |
| | GLOBAL ACCURACY | 93.90% | 94.00% | 91.70% | 93.60% |
| | POST PROCESSED | 95.40% | 90.30% | 92.90% | 90.00% |
| | REL ACCURACY | 94.90% | 93.50% | 92.90% | 93.10% |
| | POST PROCESSED | 96.30% | 89.90% | 94.10% | 89.20% |

| MAXIMUM | | TRAINING | | VALIDATION | |
|---|---|---|---|---|---|
| | | | COVERAGE | | COVERAGE |
| | GLOBAL ACCURACY | 94.60% | 94.80% | 93.90% | 95.10% |
| | POST PROCESSED | 96.40% | 91.20% | 95.00% | 94.40% |
| | REL ACCURACY | 95.10% | 93.80% | 94.50% | 94.30% |
| | POST PROCESSED | 97.10% | 90.60% | 95.70% | 90.80% |

| AVERAGES | | TRAINING | | VALIDATION | |
|---|---|---|---|---|---|
| | | | COVERAGE | | COVERAGE |
| | GLOBAL ACCURACY | 94.21% | 94.30% | 92.48% | 94.34% |
| | POST PROCESSED | 95.84% | 90.78% | 94.08% | 92.10% |
| | REL ACCURACY | 94.98% | 93.62% | 93.50% | 93.46% |
| | POST PROCESSED | 96.62% | 90.28% | 95.00% | 90.04% |

| | | NN DECISION | | | | | | | | |
|---|---|---|---|---|---|---|---|---|---|---|
| | | PB | P | Sel | Std+ | Std | P Nic | Std+Nic | StdNic | ACCURACY | |
| CORRECT DECISION | PB | 508 | 4 | 1 | 0 | 0 | | | | 99.03 | 513 |
| | P | 16 | 328 | 24 | 2 | 0 | | | | 88.65 | 370 |
| | Sel | 2 | 12 | 377 | 19 | 0 | | | | 91.95 | 410 |
| | Std+ | 1 | 3 | 9 | 320 | 22 | | | | 90.14 | 355 |
| | Std | 0 | 0 | 2 | 13 | 212 | | | | 93.39 | 227 |
| | P Nic | | | | | | 289 | 9 | 0 | 96.98 | 298 |
| | Std+Nic | | | | | | 8 | 331 | 13 | 94.03 | 352 |
| | StdNic | | | | | | 0 | 13 | 168 | 92.82 | 181 |
| | | 96.39 | 94.52 | 91.28 | 90.40 | 90.60 | 97.31 | 93.77 | 92.82 | 93.61 | 2706 |
| | | 527 | 347 | 413 | 354 | 234 | 297 | 353 | 181 | 2706 | |

FIG. 53

| | | NN DECISION | | | | | | | | |
|---|---|---|---|---|---|---|---|---|---|---|
| | | PB | P | Sel | Std+ | Std | P Nic | Std+Nic | StdNic | ACCURACY | |
| CORRECT DECISION | PB | 507 | 3 | 1 | 0 | 0 | | | | 99.22 | 511 |
| | P | 16 | 326 | 23 | 2 | 0 | | | | 88.83 | 367 |
| | Sel | 1 | 10 | 374 | 18 | 0 | | | | 92.80 | 403 |
| | Std+ | 1 | 2 | 6 | 312 | 21 | | | | 91.23 | 342 |
| | Std | 0 | 0 | 2 | 9 | 211 | | | | 95.05 | 222 |
| | P Nic | | | | | | 285 | 9 | 0 | 96.94 | 294 |
| | Std+Nic | | | | | | 5 | 318 | 9 | 95.78 | 332 |
| | StdNic | | | | | | 0 | 10 | 165 | 94.29 | 175 |
| | | 96.57 | 95.60 | 92.12 | 91.50 | 90.95 | 98.28 | 94.36 | 94.83 | 94.41 | 2646 |
| | | 525 | 341 | 406 | 341 | 232 | 290 | 337 | 174 | 2646 | |

BEFORE POST-PROCESSING

| TEST SETS | MODEL-1 | MODEL-2 | MODEL-3 | MODEL-4 | MODEL-5 | AVERAGE |
|---|---|---|---|---|---|---|
| COVERAGE | 93.92% | 93.92% | 93.92% | 93.92% | 94.26% | 93.99% |
| REL. ACC. | 93.16% | 92.98% | 93.90% | 94.45% | 93.54% | 93.61% |
| GLOBAL ACC. | 87.50% | 87.33% | 88.19% | 88.72% | 88.17% | 87.98% |

FIG. 54

AFTER POST-PROCESSING

| TEST SETS | MODEL-1 | MODEL-2 | MODEL-3 | MODEL-4 | MODEL-5 | AVERAGE |
|---|---|---|---|---|---|---|
| COVERAGE | 92.01% | 91.32% | 91.84% | 91.67% | 92.70% | 91.91% |
| REL. ACC. | 93.96% | 93.73% | 94.52% | 95.45% | 94.37% | 94.41% |
| GLOBAL ACC. | 86.46% | 85.59% | 86.81% | 87.50% | 87.48% | 86.77% |

FIG. 55

SYSTEM AND PROCESS FOR DETECTING OUTLIERS FOR INSURANCE UNDERWRITING SUITABLE FOR USE BY AN AUTOMATED SYSTEM

BACKGROUND OF THE INVENTION

1. Field of the Invention

The present invention relates to a system and process for underwriting insurance applications, and more particularly to a system and process for underwriting insurance applications based on the detection and identification of outlier applications.

2. Description of Related Art

Classification is the process of assigning an input pattern to one of a predefined set of classes. Classification problems exist in many real-world applications, such as medical diagnosis, machine fault diagnosis, handwriting character recognition, fingerprint recognition, and credit scoring, to name a few. Broadly speaking, classification problems can be categorized into two types: dichotomous classification, and polychotomous classification. Dichotomous classification deals with two-class classification problems, while polychotomous classification deals with classification problems that have more than two classes.

Classification consists of developing a functional relationship between the input features and the target classes. Accurately estimating such a relationship is key to the success of a classifier. Insurance underwriting is one of these classification problems. The underwriting process consists of assigning a given insurance application, described by its medical and demographic records, to one of the risk categories (also referred to as rate classes). A trained individual or individuals traditionally perform insurance underwriting. A given application for insurance (also referred to as an "insurance application") may be compared against a plurality of underwriting standards set by an insurance company. The insurance application may be classified into one of a plurality of risk categories available for a type of insurance coverage requested by an applicant. The risk categories then affect the premium paid by the applicant, e.g., the higher the risk category, higher the premium. A decision to accept or reject the application for insurance may also be part of this risk classification, as risks above a certain tolerance level set by the insurance company may simply be rejected.

Insurance underwriting often involves the use of a large number of features in the decision-making process. The features typically include the physical conditions, medical information, and family history of the applicant. Further, insurance underwriting frequently has large number of risk categories (rate classes). The risk category of an insurance application is traditionally determined by using a number of rules/standards, which have the form of, for example, "if the value of feature x exceeds a, then the application can't be rate class C, i.e., the application has to be lower than C". Such manual underwriting, however, is not only time-consuming, but also often inadequate in consistency and reliability. The inadequacy becomes more apparent as the complexity of insurance applications increases.

There can be a large amount of variability in the insurance underwriting process when individual underwriters perform it. Typically, underwriting standards cannot cover all possible cases and variations of an application for insurance. The underwriting standards may even be self-contradictory or ambiguous, leading to an uncertain application of the standards. The subjective judgment of the underwriter will almost always play a role in the process. Variation in factors such as underwriter training and experience, and a multitude of other effects can cause different underwriters to issue different, inconsistent decisions. Sometimes these decisions can be in disagreement with the established underwriting standards of the insurance company, while sometimes they can fall into a "gray area" not explicitly covered by the underwriting standards.

Further, there may be an occasion in which an underwriter's decision could still be considered correct, even if it disagrees with the written underwriting standards. This situation can be caused when the underwriter uses his/her own experience to determine whether the underwriting standards should be adjusted. Different underwriters may make different determinations about when these adjustments are allowed, as they might apply stricter or more liberal interpretations of the underwriting standards. Thus, the judgment of experienced underwriters may be in conflict with the desire to consistently apply the underwriting standards.

Other drawbacks may also exist.

SUMMARY OF THE INVENTION

By way of an exemplary embodiment of the invention, a process for preparing an insurance application for underwriting based on a plurality of previous insurance application underwriting decisions is disclosed. The process includes receiving a request to underwrite the insurance application, assigning a risk classification to the insurance application, defining a set comprising at least one of the plurality of previous insurance application underwriting decisions, comparing the insurance application to the set, and designating the insurance application based at least in part on the comparison between the insurance application and the set and the risk classification assigned to the insurance application, where the designation is one of designating the insurance application as an outlier insurance application and designating the insurance application for underwriting.

By way of another exemplary embodiment, a process for preparing an insurance application for underwriting based on a plurality of previous insurance application underwriting decisions includes receiving a request to underwrite the insurance application, wherein the insurance application comprises at least one feature, assigning a risk classification to the insurance application, and defining a set comprising at least one of the plurality of previous insurance application underwriting decisions. The process further includes comparing the insurance application to the set, where comparing comprises comparing at least one feature of the insurance application to a corresponding feature in the at least one of the plurality of previous insurance application underwriting decisions in the set, comparing the classification assignment of the insurance application to the classification assignment of the at least one of the plurality of previous insurance application underwriting decisions in the set, designating the insurance application based at least in part on the comparison between the insurance application and the set and the risk classification assigned to the insurance application, where the designation is one of designating the insurance application as an outlier insurance application and designating the insurance application for underwriting.

According to another example of an embodiment of the invention, a computer readable medium having code for causing a processor to prepare an insurance application for underwriting based on a plurality of previous insurance application underwriting decisions is described. The medium includes code for receiving a request to underwrite the insurance application, code for assigning a risk classification to the insurance application, code for defining a set comprising at least one of the plurality of previous insurance application underwriting decisions, code for comparing the insurance application to the set, and code for designating the insurance application based at least in part on the comparison between the insurance application and the set and the risk classification assigned to the insurance application, where the designation is one of designating the insurance application as an outlier insurance application and designating the insurance application for underwriting.

According to a further exemplary embodiment, a computer readable medium having code for causing a processor to prepare an insurance application for underwriting based on a plurality of previous insurance application underwriting decisions includes code for receiving a request to underwrite the insurance application, wherein the insurance application comprises at least one feature, code for assigning a risk classification to the insurance application, code for defining a set comprising at least one of the plurality of previous insurance application underwriting decisions, and code for comparing the insurance application to the set, where the code for comparing comprises code for comparing at least one feature of the insurance application to a corresponding feature in the at least one of the plurality of previous insurance application underwriting decisions in the set, code for comparing the classification assignment of the insurance application to the classification assignment of the at least one of the plurality of previous insurance application underwriting decisions in the set. The exemplary embodiment further includes code for designating the insurance application based at least in part on the comparison between the insurance application and the set and the risk classification assigned to the insurance application, where the designation is one of designating the insurance application as an outlier insurance application and designating the insurance application for underwriting.

By way of a further exemplary embodiment, a system for preparing an insurance application for underwriting based on a plurality of previous insurance application underwriting decisions includes means for receiving a request to underwrite the insurance application, means for assigning a risk classification to the insurance application, means for defining a set comprising at least one of the plurality of previous insurance application underwriting decisions, means for comparing the insurance application to the set, and means for designating the insurance application based at least in part on the comparison between the insurance application and the set and the risk classification assigned to the insurance application, where the designation is one of designating the insurance application as an outlier insurance application, and designating the insurance application for underwriting.

According to another embodiment of the present invention, a system for preparing an insurance application for underwriting based on a plurality of previous insurance application underwriting decisions is described. The system includes means for receiving a request to underwrite the insurance application, wherein the insurance application comprises at least one feature, means for assigning a risk classification to the insurance application, and means for defining a set comprising at least one of the plurality of previous insurance application underwriting decisions. In addition, the system also includes means for comparing the insurance application to the set, where the code for comparing comprises means for comparing at least one feature of the insurance application to a corresponding feature in the at least one of the plurality of previous insurance application underwriting decisions in the set, means for comparing the classification assignment of the insurance application to the classification assignment of the at least one of the plurality of previous insurance application underwriting decisions in the set, and means for designating the insurance application based at least in part on the comparison between the insurance application and the set and the risk classification assigned to the insurance application, where the designation is one of designating the insurance application as an outlier insurance application, and designating the insurance application for underwriting.

By way of another exemplary embodiment of the present invention, a system for preparing an insurance application for underwriting based on a plurality of previous insurance application underwriting decisions includes a receiver for receiving a request to underwrite the insurance application, a classifier module assigning a risk classification to the insurance application, a definition module for defining a set comprising at least one of the plurality of previous insurance application underwriting decisions, a comparison module comparing the insurance application to the set, and a designation module for designating the insurance application based at least in part on the comparison between the insurance application and the set and the risk classification assigned to the insurance application, where the designation is one of designating the insurance application as an outlier insurance application and designating the insurance application for underwriting.

According to a further exemplary embodiment of the invention, a system for preparing an insurance application for underwriting based on a plurality of previous insurance application underwriting decisions includes a receiver for receiving a request to underwrite the insurance application, wherein the insurance application comprises at least one feature, a classifier module for assigning a risk classification to the insurance application, a definition module for defining a set comprising at least one of the plurality of previous insurance application underwriting decisions, a comparison module for comparing the insurance application to the set, comparing at least one feature of the insurance application to a corresponding feature in the at least one of the plurality of previous insurance application underwriting decisions in the set, comparing the classification assignment of the insurance application to the classification assignment of the at least one of the plurality of previous insurance application underwriting decisions in the set, and a designation module for designating the insurance application based at least in part on the comparison between the insurance application and the set and the risk classification assigned to the insurance application, where the designation is one of designating the insurance application as an outlier insurance application and designating the insurance application for underwriting.

BRIEF DESCRIPTION OF THE DRAWINGS

FIG. 2 illustrates a table of an outer product using the function T(x,y) according to an embodiment of the invention.

FIGS. 5-9 illustrate the results of T-norm operators according to an embodiment of the invention.

FIGS. 10-14 illustrate the normalized results of T-norm operators according to an embodiment of the invention.

FIG. 15 illustrates a summary of the fusion of two classifiers according to an embodiment of the invention.

FIG. 16 illustrates a penalty matrix for a fusion module according to an embodiment of the invention.

FIG. 17 illustrates a summary of the fusion of two classifiers with disagreement according to an embodiment of the invention.

FIG. 18 illustrates a summary of the fusion of two classifiers with agreement and discounting according to an embodiment of the invention.

FIGS. 19-23 illustrate the results of T-norm operators according to an embodiment of the invention.

FIGS. 24-28 illustrate the normalized results of T-norm operators according to an embodiment of the invention.

FIG. 29 illustrates a Dempster-Schaefer penalty matrix according to an embodiment of the invention.

FIG. 30 illustrates a comparison matrix according to an embodiment of the invention.

FIG. 31 illustrates fusion as a function of a confidence threshold for non-nicotine cases according to an embodiment of the invention.

FIG. 32 illustrates fusion as a function of a confidence threshold for nicotine cases according to an embodiment of the invention.

FIG. 40 illustrates a comparison matrix according to an embodiment of the invention.

FIG. 41 illustrates a comparison matrix for a modified process according to an embodiment of the invention.

FIG. 45 illustrates a comparison matrix according to an embodiment of the invention.

FIG. 47 illustrates a performance of MARS models using five partitions according to an embodiment of the invention.

FIG. 48 illustrates minimum, maximum, and average performances of a network of MARS models according to an embodiment of the invention.

FIG. 52 illustrates a confusion matrix before post-processing according to an embodiment of the invention.

FIG. 53 illustrates a confusion matrix after post-processing according to an embodiment of the invention.

FIG. 54 illustrates performance before post-processing according to an embodiment of the invention.

FIG. 55 illustrates performance after post-processing according to an embodiment of the invention.

DETAILED DESCRIPTION OF PREFERRED EMBODIMENTS

Figure 1:
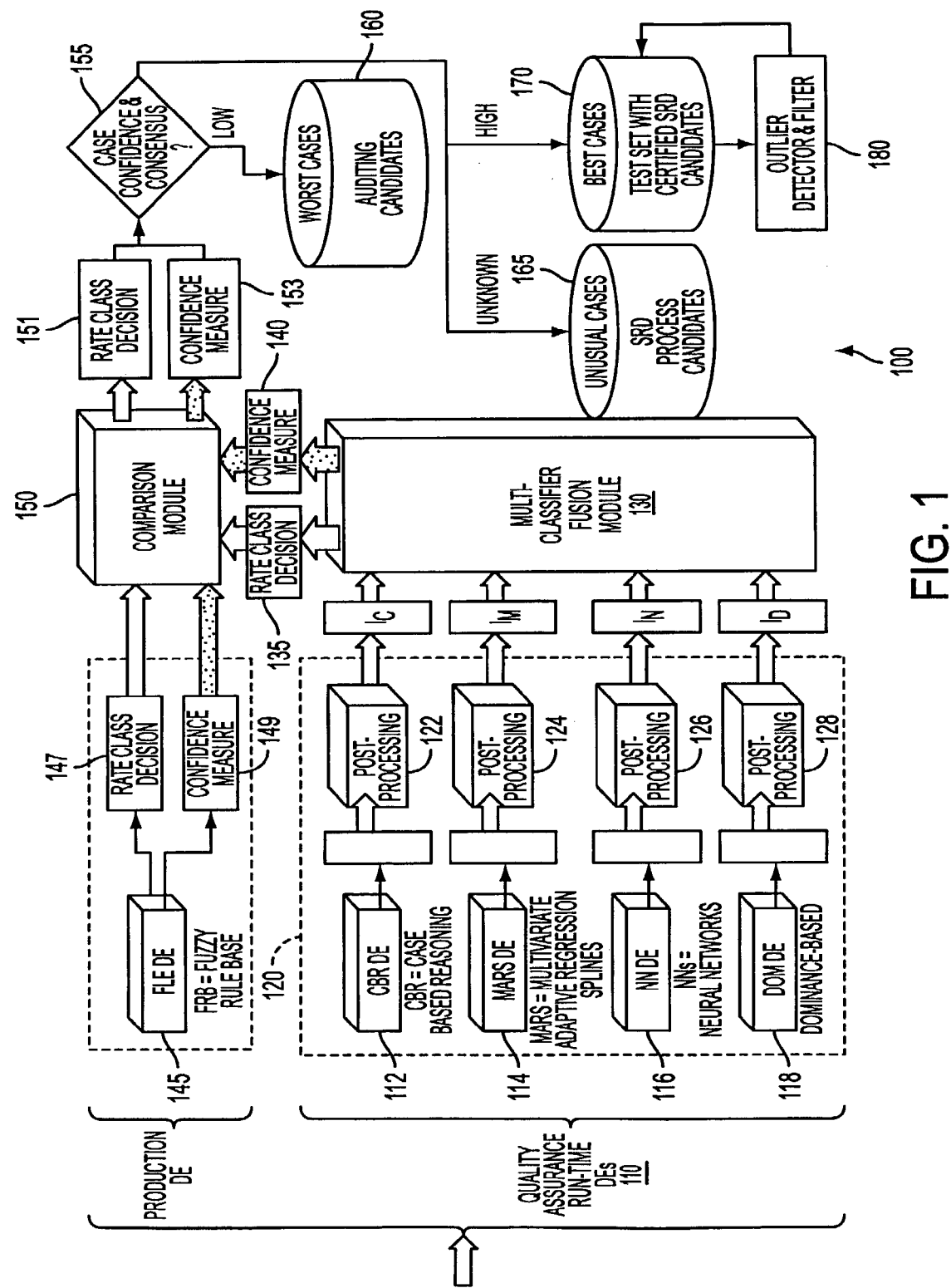
FIG. 1 illustrates the architecture of a quality assurance system based on the fusion of multiple classifiers according to an embodiment of the invention.

A system and process for underwriting of insurance applications that is suitable for use by a computer rather than by human intervention is described. The system and process make use of existing risk assignments made by human underwriters to categorize new applications in terms of the risk involved. One technical effect of the invention is to provide an automated process for consistent and accurate underwriting decisions for insurance applications. Various aspects and components of this system and process are described below.

It will be recognized, however, that the principles disclosed herein may extend beyond the realm of insurance underwriting and that it may be applied to any risk classification process, of which the determination of the proper premium to cover a given risk (i.e. insurance underwriting) is just an example. Therefore the ultimate domain of this invention may be considered risk classification.

1. Fusion Module

An aspect of the invention provides a system and process for fusing a collection of classifiers used for an automated insurance underwriting system and/or its quality assurance. While the design method is demonstrated for quality assurance of automated insurance underwriting, it is broadly applicable to diverse decision-making applications in business, commercial, and manufacturing processes. A process of fusing the outputs of a collection of classifiers is provided. The fusion can compensate for the potential correlation among the classifiers. The reliability of each classifier can be represented by a static or dynamic discounting factor, which will reflect the expected accuracy of the classifier. A static discounting factor represents a prior expectation about the classifier's reliability, e.g., it might be based on the average past accuracy of the model. A dynamic discounting represents a conditional assessment of the classifier's reliability, e.g., whenever a classifier bases its output on an insufficient number of points, the result is not reliable. Hence, this factor could be determined from the post-processing stage in each model. The fusion of the data will typically result in some amount of consensus and some amount of conflict among the classifiers. The consensus will be measured and used to estimate a degree of confidence in the fused decisions.

According to an embodiment of the invention, a fusion module (also referred to as a fusion engine) combines the outputs of several decision engines (also referred to as classifiers or components of the fusion module) to determine the correct rate class for an insurance application. Using a fusion module with several decision engines may enable a classification to be assigned with a higher degree of confidence than is possible using any single model. According to an embodiment of the invention, a fusion module function may be part of a quality assurance ("QA") process to test and monitor a production decision engine ("PDE") that makes the rate class assignment in real-time. At periodic intervals, e.g., every week, the fusion module and its components may review the decisions made by the PDE during the previous week. The output of this review will be an assessment of the PDE performance over that week, as well as the identification of cases with different level of decision quality.

The fusion module may permit the identification of the best cases of application classification, e.g., those with high-confidence, high-consensus decisions. These best cases in turn may be likely candidates to be added to the set of test cases used to tune the PDE. Further, the fusion module may permit the identification of the worst cases of application classification, e.g., those with low-confidence, low-consensus decisions. These worst cases may be likely candidates to be selected for a review by an auditing staff and/or by senior underwriters.

A fusion module may also permit the identification of unusual cases of application classification, e.g., those with unknown confidence in their decisions, for which the models in the fusion module could not make any strong commitment or avoided the decision by routing the insurance application to a human underwriter. These cases may be candidates for a blind review by senior underwriters. In addition, a fusion module may also permit an assessment of the performance of the PDE, by monitoring the PDE accuracy and variability over time, such as monitoring the statistics of low, borderline and high quality cases as well as the occurrence of unusual cases. These statistics can be used as indicators for risk management.

According to an embodiment of the invention, a fusion module may leverage the fact that except for the unusual situation where all the components (e.g., models) contain the same information (e.g., an extreme case of positive correlation), each component should provide additional information. This information may either corroborate or refute the output of the other modules, thereby supporting either a measure of consensus, or a measure of conflict. These measures may define a confidence in the result of the fusion. In general, the fusion of the components' decisions may provide a more accurate assessment than the decision of each individual component.

The fusion module is described in relation to various types of decision engines, including a case-based decision engine, a dominance-based decision engine, a multi-variate adaptive regression splines engine, and a neural network decision engine respectively. However, the fusion module may use any type of decision engine. According to an embodiment of the invention, the fusion module will support a quality assurance process for a production decision engine. However, it is understood that the fusion module could be used for a quality assurance process for any other decision making process, including a human underwriter.

According to an embodiment of the invention, a general method for the fusion process, which can be used with classifiers that may exhibit any kind of (positive, neutral, or negative) correlation with each other, may be based on the concept of triangular norms ("T-norm"), a multi-valued logic generalization of the Boolean intersection operator. The fusion of multiple decisions, produced by multiple sources, regarding objects (e.g., classes) defined in a common framework (e.g., the universe of discourse) consists of determining the underlying of degree of consensus for each object (e.g., class) under consideration, i.e., the intersections of their decisions. With the intersections of multiple decisions, possible correlation among the sources needs to be taken into account to avoid under-estimates or over-estimates. This is done by the proper selection of a T-norm operator.

According to an embodiment of the invention, each model is assumed to be solving the same classification problem. Therefore, the output of each classifier is a weight assignment that represents the degree to which a given class is selected. The set of all possible classes, referred to as U, represents the common universe of all answers that can be considered by the classifiers. The assignment of weights to this universe represents the classifier's ignorance (i.e., lack of commitment to a specific decision). This is a discounting mechanism that can be used to represent the classifier's reliability.

According to an embodiment of the invention, the outputs of the classifiers may be combined by selecting the generalized intersection operator (e.g., the T-norm) that better represents the possible correlation between the classifiers. With this operator, the assignments of the classifiers are intersected and a derived measure of consensus is computed. This fusion may be performed in an associative manner, e.g., the output of the fusion of the first two classifiers is combined with the output of the third classifier, and so on, until all available classifiers have been considered. At this stage, the final output may be normalized (e.g., showing the degree of selection as a percentage). Further, the strongest selection of the fusion may be identified and qualified with its associated degree of confidence.

Thus, according to an embodiment of the invention, a fusion module only considers weight assignments made either to disjoint subsets that contain a singleton (e.g., a rate class) or to the entire universe of classes U (e.g., the entire set of rate classes), as will be described in greater detail below. Once compensation has been made for correlation and fusion has been performed, the degree of confidence C is computed among the classifiers and used to qualify the decision obtained from the fusion. Further, the confidence measure and the agreement or disagreement of the fusion module's decision is used with the production engine's decision to assess the quality of the production engine. As a by-product, the application cases may be labeled in terms of the decision confidence. Thus, cases with low, high, or unknown confidence may be used in different ways to maintain and update the production engine.

Other types of aggregation could be used, but would need to be associative, compensate for correlation, accommodate the discounting of classifiers, and generate a confidence measure of the combined decision, properties that are not directly satisfied. A particular case may be a Dempster-Shafer ("DS") fusion rule. The DS fusion rule requires the classifiers to be evidentially independent, i.e., the errors of one classifier must be uncorrelated with those of another one. Furthermore, the DS paradigm does not allow us to represent the ordering among the classes, typical of the insurance underwriting process. This ordering implies that there could be minor differences (such as the selection of two adjacent classes) and major differences (such as the selection of different classes at the extreme of their range). Therefore, the conflict between two sources is a gradual one, rather than a binary one (hit/miss). Finally, in DS theory, the classifiers' outputs are considered probability assignments.

Triangular norms (T-norms) and Triangular conorms (T-conorms) are the most general families of binary functions that satisfy the requirements of the conjunction and disjunction operators, respectively. T-norms $T(x,y)$ and T-conorms $S(x,y)$ are two-place functions that map the unit square into the unit interval, i.e., $T(x,y): [0,1] \times [0,1] \rightarrow [0,1]$ and $S(x,y): [0,1] \times [0,1] \rightarrow [0,1]$. They are monotonic, commutative and associative functions. Their corresponding boundary conditions, i.e., the evaluation of the T-norms and T-conorms at the extremes of the [0,1] interval, satisfy the truth tables of the logical AND and OR operators. They are related by the DeMorgan duality, which states that if N(x) is a negation operator, then the T-conorm S(x,y,) can be defined as S(x,y) =N(T(N(x), N(y))).

As described in Bonissone and Decker (1986) the contents of which are incorporated by reference in their entirety, six parameterized families of T-norms and their dual T-conorms may be used. Of the six parameterized families, one family was selected due to its complete coverage of the T-norm space and its numerical stability. This family has a parameter p. By selecting different values of p, T-norms with different properties can be instantiated, and thus may be used in the fusion of possibly correlated classifiers.

Various articles discuss the fusion and the different features associated therewith, include proofs as to the development of algorithms associated with the present invention. Chibelushi et al. (Chibelushi, C. C., Deravi, F., and Mason, J. S. D., "Adaptive Classifier Integration for Robust Pattern Recognition," *IEEE Transactions on Systems, Man, and Cybernetics*, vol. 29, no. 6, 1999, the contents of which are incorporated herein by reference) describe a linear combination method for combining the outputs of multiple classifiers used in speaker identification applications.

Fairhurst and Rahman (Fairhurst, M. C., and Rahman, A. F. R., "Enhancing consensus in multi expert decision fusion," *IEE Proc.-Vis. Image Signal Process*, vol. 147, no. 1, 2000, the contents of which are incorporated herein by reference) describe ENCORE, a multi-classifier fusion system for enhancing the performance of individual classifiers for pattern recognition tasks, specifically, the task of hand written digit recognition. Kuncheva and Jain (Kuncheva, L. I., and Jain, L. C., "Designing Classifier Fusion Systems by Genetic Algorithms," *IEEE Transactions on Evolutionary Computation*, vol. 4, no. 4, 2000, the contents of which are incorporated herein by reference) describe a genetic algorithm approach to the design of fusion of multiple classifiers.

Xu et al. (Xu, L., Krzyzak, A., and Suen, C. Y., "Methods of Combining Multiple Classifiers and Their Applications to Handwriting Recognition," *IEEE Transactions on Systems, Man, and Cybernetics*, vol. 22, no. 3, 1992, the contents of which are incorporated herein by reference) describe several standard approaches for classifier decision fusion, including the Dempster-Shafer approach, and demonstrate fusion for handwritten character recognition.

Arthur Dempster (A. P. Dempster, "Upper and lower probabilities induced by a multivalued mapping," *Annals of Mathematical Statistics*, 38:325-339, 1967, the contents of which are incorporated herein by reference) describes a calculus based on lower and upper probability bounds. Dempster's rule of combination describes the pooling of sources under the assumption of evidential independence. Glenn Shafer (G. Shafer, "*A Mathematical Theory of Evidence*", Princeton University Press, Princeton, N.J., 1976, the contents of which are incorporated herein by reference) describes the same calculus discovered by Dempster, but starting from a set of super-additive belief functions that are essentially lower bounds. Shafer derives the same rule of combination as Dempster. Enrique Ruspini (E. Ruspini, "Epistemic logic, probability, and the calculus of evidence. *Proc. Tenth Intern. Joint Conf. on Artificial Intelligence*, Milan, Italy, 1987, the contents of which are incorporated herein by reference) goes on to describe a possible-world semantics for Dempster-Shafer theory.

B. Schweizer and A. Sklar (B. Schweizer and A. Sklar, "Associative Functions and Abstract Semi-Groups", *Publicationes Mathematicae Debrecen*, 10:69-81, 1963, the contents of which are incorporated herein by reference) describe a parametric family of triangular T-norm functions that generalize the concept of intersection in multiple-valued logics. Piero Bonissone and Keith. Decker (P. P. Bonissone and K. Decker, "Selecting Uncertainty Calculi and Granularity: An Experiment in Trading-off Precision and Complexity" in Kanal and Lemmer (editors) *Uncertainty in Artificial Intelligence*, pages 217-247, North-Holland, 1986, the contents of which are incorporated herein by reference) describe an experiment based on Schweizer and Sklar's parameterized T-norms. They show how five triangular norms can be used to represent an infinite number of t-norm for some practical values of information granularity. Piero Bonissone (P. P. Bonissone, "Summarizing and Propagating Uncertain Information with Triangular Norms", *International Journal of Approximate Reasoning*, 1(1):71-101, January 1987, the contents of which are incorporated herein by reference) also describes the use of Triangular norms in dealing with uncertainty in expert system, Specifically he shows the use Triangular norms to aggregate the uncertainty in the left-hand side of production rules and to propagate it through the firing and chaining of production rules.

FIG. 1 illustrates the architecture of a quality assurance system based on the fusion of multiple classifiers according to an embodiment of the invention. These classifiers may include case-based reasoning model (described in U.S. patent application Ser. Nos. 10/170,471 and 10/171,190, the contents of which are incorporated herein by reference), a multivariate adaptive regression splines model (hereinafter also referred to as "MARS"), a neural network model and a dominance-based model. The MARS, neural networks, and dominance-based models are all described in greater detail below.

System 100, as illustrated in FIG. 1, includes a number of quality assurance decision engines 110. In the embodiment illustrated in FIG. 1, the quality assurance decision engines 110 comprise a case-based reasoning decision engine 112, a MARS decision engine 114, a neural network decision engine 116, and a dominance-based decision engine 118. It is understood, however, that other types of quality assurance decision engines 110 could be used in addition to and/or as substitutes for those listed in the embodiment of the invention illustrated in FIG. 1.

Post processing modules 122, 124, 126, and 128 receive the outputs from the various quality assurance decision engines 120 and perform processing on the outputs. The results of the post-processing are input into a multi-classifier fusion module 130. The multi-classifier fusion module 130 then outputs a fusion rate class decision 135 and a fusion confidence measure 140, which are input into comparison module 150.

A fuzzy logic rule-based production engine 145 outputs a production rate class decision 147 and a production confidence measure 149, which are then input into comparison module 150. After a comparison has been made between the production rate class decision 147 and the fusion rate class decision 135, and the production confidence measure 149 and the fusion confidence measure 140, a compared rate class decision 151 and a compared confidence measure 153 are output by comparison module 150. An evaluation module 155 evaluates the case confidence and consensus regarding the compared rate class 151 and the compared confidence measure 153. Those cases evaluated as "worst cases" are stored in case database 160, and may be candidates for auditing. Those cases evaluated as "unusual cases" are stored in case database 165, and may be candidates for standard underwriting. Those cases evaluated as "best cases" are stored in case database 170, and may be candidates for using with the test sets. The outlier detector and filter 180 may ensure that any new addition to the best-case database 170 will be consistent (in the dominance sense described below) with the existing cases, preventing logical outliers from being used. System 100 of FIG. 1 will now be described in greater detail below.

According to an embodiment of the invention, the fusion process as disclosed in FIG. 1 includes four general steps. These steps are: (1) collection, discounting and post-processing of modules' outputs; (2) determination of a combined decision via the associative fusion of the modules' outputs; (3) determination of degree of confidence; and (4) identification of cases that are candidates for test set, auditing, or standard reference decision process, via the comparison module 150. These steps will now be described in greater detail below.

Each quality assurance decision module 110 generates an output vector $I=[I_{(1)}, I_{(2)}, \ldots I_{(N+1)}]$ where $I_{(i)} \in [0,M]$, where M is a large real value and N is the number of rate classes. In the embodiment of the invention illustrated in FIG. 1, each vector I is identified by a superscript associated with the quality assurance decision module 120 that generates the vector. Therefore, $I^C$ is generated by case-based reasoning decision engine 112, $I^M$ is generated by MARS decision engine 114, $I^N$ neural network decision engine 116, and $I^D$ is generated by dominance-based decision engine 118. Further, each entry $I_{(i)}$, for $i=1, \ldots, N$, can be considered as the (un-normalized) degree to which the case could be classified in rate class i. The last element, $I_{(N+1)}$ indicates the degree to which the case cannot be decided and the entire universe of rate classes is selected.

For illustration purpose, assume that five rate classes are used, i.e., N=5, namely:

Rate Class={Preferred Best, Preferred, Select, Standardplus, Standard, No Decision (Send to UW)}

By way of this example, assume that the output of the first classifier (CBE) is: $I^C=[0.3, 5.4, 0.3, 0, 0, 0]$. This indicates that the second rate class (e.g., Preferred) is strongly supported by the classifier. Normalizing $I^C$ to see the support as a percentage of the overall weights, $\hat{I}^C=[0.05, 0.9, 0.05, 0, 0, 0]$, shows that 90% of the weights is assigned to the second rate class.

Further, to represent partial ignorance, i.e., cases in which the classifier does not have enough information to make a more specific rate classification, discounting may be used. According to an embodiment of the invention, discounting may involve the assignment of some weight to the last element, corresponding to the universe U=(No Decision: Send to UW). For example, the previous assignment of $I^C$ could be changed such that $I^C=[0.3, 1.4, 0.3, 0, 0, 4]$, and its normalized assignment would be $\hat{I}^C=[0.05, 0.23, 0.05, 0, 0, 0.67]$. This example shows how 67% of the weights have now been assigned to the universe of discourse U (the entire set of rate classes). This feature allows a representation of the lack of commitment by individual modules. According to an embodiment of the invention, if it is necessary to discount a source because it is not believed to be credible, competent, or reliable enough in generating the correct decision, a portion of the weight is transferred to the universe of discourse (e.g., "any of the above categories"). The determination of the discount may be derived from meta-knowledge, as opposed to object-knowledge. Object knowledge is the level at which each classifier is functioning, e.g., mapping input vectors into decision bins. Meta-knowledge is reasoning about the classifiers' performance over time. Discounting could be static or dynamic. Static discounting may be used a priori to reflect historical (accuracy) performance of each classifier. Dynamic discounting may be determined by evaluating a set of rules, whose Left Hand Side ("LHS") defines a situation, characterized by a conjunct of conditions, and whose Right Hand Side ("RHS") defines the amount by which to discount whichever output is generated by the classifier. According to an embodiment of the invention, postprocessing may be used to detect lack of confidence in a source. When this happens, all the weights may be allocated to the universe of discourse, i.e., refrain from making any decision.

According to an embodiment of the invention, each decision engine model will independently perform a post-processing step. For purposes of illustration, the post processing used for the neural network model will be described. According to an embodiment of the invention, to further improve the classification performance of a neural network module, some post-processing techniques may be applied to the outputs of the individual networks, prior to the fusion process. For example, if the distribution of the outputs did not meet certain pre-defined criteria, no decision needs to be made by the classifier. Rather, the case will be completely discounted by allocating all of the weights to the entire universe of discourse U. The rationale for this particular example is that if a correct decision cannot be made, it would be better not to make any decision rather than making a wrong decision. Considering the outputs as discrete membership grades for all rate classes, the four features that characterize the membership grades may be defined as follows, where N is the number of rate classes and I the membership function, i.e., the output of the classifier.

1. Cardinality $$C = \sum_{1}^{N} I(i)$$

2. Entropy $$E = \frac{1}{E_{max}} \sum_{1}^{N} I(i) \times \log(I(i)), \text{ where } E_{max} = -\log(1/N)$$

3. Difference between the highest and the second highest values of outputs.

$$D = I_{max1} - I_{max2}$$

4. Separation between the rank orders of the highest and the second highest values of outputs $$S = \text{RankOrder}(I_{max1}) - \text{RankOrder}(I_{max2})$$

With the features defined for characterizing the network outputs, the following two-step criteria may be used to identify the cases with weak decisions:

Step 1: $C < \tau_1$ OR $C > \tau_2$ OR $E > \tau_3$

Step 2: $D < \tau_4$ AND $S \leq 1$ where $\tau_1, \tau_2, \tau_3$, and $\tau_4$ are the thresholds. The value of the thresholds is typically dataset dependent. However, in some embodiments, the value of the thresholds may be independent of the dataset. In the present example related to a neural network classifier module (which in turn is described in greater detail below), the value of the thresholds may be first empirically estimated and then fine-tuned by a global optimizer, such as an evolutionary algorithm. As part of this example, the final numbers are shown below in Table 1. Other optimization methods may also be used to obtain the thresholds.

TABLE 1

| Thresholds | Non-nicotine Users | Nicotine Users |
|---|---|---|
| $\tau_1$ | 0.50 | 0.30 |
| $\tau_2$ | 2.00 | 1.75 |
| $\tau_3$ | 0.92 | 0.84 |
| $\tau_4$ | 0.10 | 0.21 |

Thus, post-processing may be used to identify those cases for which the module's output is likely to be unreliable. According to an embodiment of the invention, rather than rejecting such cases, the model assignment of normalized weights to rate classes may be discounted by assigning some or all of those weights to the universe of discourse U.

As described previously, the fusion module 150 may perform the step of determining a combined decision via the associative fusion of the decision engine models' outputs. According to an embodiment of the invention, any general method that can be used to fuse the output of several classifiers may be used. The fusion method may also be associative, meaning that given three or more classifiers, any two of the classifiers may be fused, then fusing the results with the third classifier, and so on, regardless of the order.

By way of example of determining a combined decision, define m classifiers $S_1, \ldots S_m$, such that the output of classifier $S_j$ is the vector $I^j$ showing the normalized decision of such classifier to the N rate classes. Recall the last $(N+1)^{th}$ element represents the classifier's lack of commitment, i.e., $I^j=[I^j(1), I^j(2), \ldots, I^j(N+1)]$, where:

$$I^j(i) \in [0, 1] \text{ and } \sum_{i=1}^{N+1} I^j(i) = 1$$

The un-normalized fusion of the outputs of two classifiers $S_1$ and $S_2$ is further defined as:

$$F(I^1, I^2) = \text{Outerproduct}(I^1, I^2, T) = A$$

where the outer-product is a well-defined mathematical operation, which in this case takes as arguments the two N-dimensional vectors $I^1$ and $I^2$ and generates as output the N×N dimensional array A. Each element $A(i,j)$ is the result of applying the operator T to the corresponding vector elements, namely $I^1(i)$ and $I^2(j)$, e.g., $$A(i,j) = T[I^1(i), I^2(j)]$$

and as illustrated in FIG. 2. Matrix 200 illustrates classes 202 and values 204 for vector $I^1$ and classes 206 and values 208 for vector $I^2$. Intersection 210 illustrates one intersection between the vector $I^1$ and vector $I^2$. Other intersections and representations may also be used.

The operator $T(x,y)$ may be referred to as a Triangular Norm. Triangular Norms (also referred to as "T-norms") are general families of binary functions that satisfy the requirements of the intersection operators. T-norms are functions that map the unit square to the unit interval, i.e., T: $[0,1] \times [0,1] \to [0,1]$. T-norms are monotonic, commutative and associative. Their corresponding boundary conditions, i.e., the evaluation of the T-norms at the extremes of the [0,1] interval, satisfy the truth tables of the logical AND operator.

As there appear to be an infinite number of T-norms, the five most representative T-norms for some practical values of information granularity may be selected. According to an embodiment of the invention, the five T-norms selected are:

| T-Norm | Correlation Type |
|---|---|
| $T_1(x, y) = \max(0, x + y - 1)$ | Extreme case of negative correlation |
| $T_{1.5}(x, y) = \max(0, x^{0.5} + y^{0.5} - 1)^2$ | Partial case of negative correlation |
| $T_2(x, y) = x \cdot y$ | No correlation |
| $T_{2.5}(x, y) = (x^{-1} + y^{-1} - 1)^{-1}$ | Partial case of positive correlation |
| $T_3(x, y) = \min(x, y)$ | Extreme case of positive correlation |

The selection of the best T-norm to be used as an intersection operation in the fusion of the classifiers may depend on the potential correlation among the classifiers to be fused. For example, T3 (the minimum operator) may be used when one classifier subsumes the other one (e.g., extreme case of positive correlation). T2 may be selected when the classifiers are uncorrelated (e.g., similar to the evidential independence in Dempster-Shafer). T1 may be used if the classifiers are mutually exclusive (e.g., extreme case of negative correlation). The operators $T_{1.5}$ and $T_{2.5}$ may be selected when the classifiers show intermediate stages of negative or positive correlation, respectively. Of course, it will be understood by one of ordinary skill in the art that other T-norms may also be used. However, for the purposes of the present invention, these five T-norms provide a good representation of the infinite number of functions that satisfy the T-norm properties.

Because the T-norms are associative, so is the fusion operator, i.e., $$F(I^1, F(I^2, I^3)) = F(F(I^1, I^2), I^3)$$

Figures 3, 4:
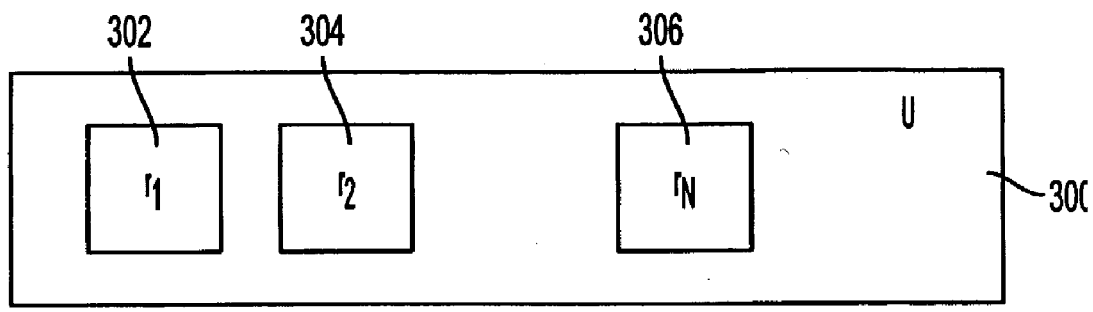
FIG. 3 illustrates the disjointed rate classes within the universe of rate classes according to an embodiment of the invention.
FIG. 4 illustrates the results of the intersections of the rate classes and the universe according to an embodiment of the invention.

Each element $A(i,j)$ represents the fused assignment of the two classifiers to the intersection of rate classes $r_i$ and $r_j$. FIG. 3 illustrates that each rate class is disjointed and that U 300, is the universe of all (rate) classes. In this example, rate classes $r_1$ 302, $r_2$ 304 to $r_n$ 306 are shown. Given that the rate classes are disjoint, there are five possible situations:

(a) When i=j and i<(N+1) then $r_i \cap r_j = r_j \cap r_i = r_i$ (b) When i=j and i=(N+1) then $r_i \cap r_j = U$ (the universe of rate classes)

(c) When i≠j and i<(N+1) and j<(N+1) then $r_i \cap r_j = \phi$ (the empty set)

(d) When i≠j and i=(N+1) then $U \cap r_j = r_j$ (e) When i≠j and j=(N+1) then $r_i \cap U = r_i$ FIG. 4 depicts a chart 400 that illustrates the result of the intersections of the rate classes and the universe U, according to an embodiment of the invention. The chart demonstrates the intersection according to those situations set forth above, such that when situation (a) occurs, the results are tabulated in the main diagonal identified as 410 in FIG. 4. Further, when situation (b) occurs, the results are tabulated in the appropriate areas identified as 420 in FIG. 4. When situation (c) occurs, the results are tabulated in the appropriate areas identified as 430, while when situations (d) or (e) occur, the results are tabulated in the appropriate areas identified as 440 in FIG. 4. By way of example, when one application is rated r1 in the first instance and r2 in the second instance, the intersection may be tabulated at 450, where the column for r1 and the row for r2 intersect. In this example, the intersection of r1 and r2 is the empty set $\phi$. The decisions for each rate class can be gathered by adding up all the weights assigned to them. According to the four possible situations described above, weights may be assigned to a specific rate class only in situation a) and d), as illustrated in FIG. 4. Thus, there will be:

Weight($r_i$)=$A(i,i)+A(i,N+1)+A(N+1,i)$

Weight($U$)=$A(N+1,N+1)$

To illustrate the fusion operator based on T-norms, an example will now be described. Assume that $I^1$=[0.8, 0.15, 0.05, 0, 0, 0] and $I^2$=[0.9, 0.05, 0.05, 0, 0, 0]

This indicates that both classifiers are showing a strong preference for the first rate class (e.g., "Preferred Best") as they have assigned them 0.8 and 0.9, respectively. Fusing these classifiers using each of the five T-norm operators defined above will generate the corresponding matrices A that are shown in the tables in FIGS. 5-9, such that FIG. 5 illustrates an extreme positive correlation, FIG. 6 illustrates a partial positive correlation, FIG. 7 illustrates no correlation, FIG. 8 illustrates a partial negative correlation and FIG. 9 illustrates an extreme negative correlation. If the results are normalized so that the sum of the entries is equal to one, the matrices $\hat{A}$ are generated, as shown in the tables in FIGS. 10-14 in a manner corresponding to the un-normalized results. During the process, the un-normalized matrices A (FIGS. 5-9) may be used to preserve the associative property. At the end, the normalized matrices $\hat{A}$ are used (FIGS. 10-14). Using the expressions for weights of a rate class, the final weights for the N rate classes and the universe U from FIGS. 10-14 can be computed. An illustration of the computation of the final weights is illustrated in the chart of FIG. 15. Chart 1500 illustrates the five classes 1510, the five T-norms 1520, and the fused intersection results 1530.

According to an embodiment of the invention, the confidence in the fusion may be calculated by defining a measure of the scattering around the main diagonal. The more the weights are assigned to elements outside the main diagonal, the less is the measure of the consensus among the classifiers. This concept may be represented by defining a penalty matrix P=[P(i,j)], of the form:

$$P(i,j) = \begin{cases} \max(0, (1 - W*|i - j|))^d & \text{for } 1 \le i \le N \text{ and } 1 \le j \le N \\ 1 & \text{for } i = (N+1) \text{ or } j = (N+1) \end{cases}$$

This function rewards the presence of weights on the main diagonal, indicating agreement between the two classifiers, and penalizes the presence of elements off the main diagonal, indicating conflict. The conflict increases in magnitude as the distance from the main diagonal increases. For example, for W=0.2 and d=5 we have the penalty matrix set forth in FIG. 16. Matrix 1600 intersects the column classes 1610 with the row classes 1620 to determine the appropriate penalty.

Other functions penalizing elements off the main diagonal, such as any suitable non-linear function of the distance from the main diagonal, i.e., the absolute value |i-j|, could also be used. The penalty function is used because the conflict may be gradual, as the (rate) classes have an ordering. Therefore, the penalty function captures the fact that the discrepancy between rate classes $r_1$ and $r_2$ is smaller than then the discrepancy between $r_1$ and $r_3$. The shape of the penalty matrix P in FIG. 16 captures this concept, as P1600 shows that the confidence decreases non-linearly with the distance from the main diagonal. A measure of the normalized confidence $\hat{C}$ is the sum of element-wise products between $\hat{A}$ and P 1600, e.g.:

$$\hat{C} = \text{Normalized Confidence}(\hat{A}, P) = \sum_{i=1}^{N+1} \sum_{j=1}^{N+1} \hat{A}(i,j) * P(i,j)$$

where $\hat{A}$ is the normalized fusion matrix. The results of the fusion of classifiers S1 and S2, using each of the five T-norms with the associated normalized confidence measure, are shown in FIG. 15.

In a situation in which there is a discrepancy between the two classifiers, this fact may be captured by the confidence measure. For instance, consider a situation different from the assignment illustrated in FIGS. 5-14, in which the classifiers agreed to select the first rate class. Now e.g., assume that the two classifiers are showing strong preferences for different rate classes, the first classifier is selecting the second rate class, while the second classifier is favoring the first class:

$I^1$=[0.15, 0.85, 0.05, 0, 0, 0] and $I^2$=[0.9, 0.05, 0.05, 0, 0, 0]

The results of their fusion are summarized in the table of FIG. 17, where the chart 1700 illustrates the rate classes 1710, the T-norms 1720 and the fused intersection results 1730. None of the rate classes have a high weight and the normalized confidence has dropped.

According to an embodiment of the invention, it may be desirable to be able to discount the one of the classifiers, to reflect our lack of confidence in its reliability. For example, the second classifier (S2) in the first example (in which the classifiers seemed to agree on selecting the first rate class) may be discounted:

$I^1$=[0.8, 0.15, 0.05, 0, 0, 0] and $I^2$=[0.9, 0.05, 0.05, 0, 0, 0]

This discounting is represented by allocating some of the classifier's weight, in this instance 0.3, to the universe of discourse U, (U=No decision: Sent_to_UW):

$I^1$=[0.8, 0.15, 0.05, 0, 0, 0] and $I^2$=[0.6, 0.05, 0.05, 0, 0, 0.3]

The results of the fusion of $I^1$ and $I^2$ are summarized in FIG. 18 below. Summarization chart 1800 illustrates the classes 1810, T-norms 1820, the fused intersection results 1830 and the confidence measure 1840. The rate classes have a slightly lower weight (for T3, T2.5, T2), but the normalized confidence is higher than with respect to FIG. 15, as there is less conflict. Fusion matrices A are shown in the tables of FIGS. 19-23, while the tables of FIGS. 24-28 illustrate matrices $\hat{A}$. According to an embodiment of the invention, a fusion rule based on Dempster-Shafer corresponds to the selection of:

a) T-norm operator T(x,y)=x*y; and b) Penalty function using W=1 (or alternatively d=∞)

Constraint b) implies the penalty matrix P 2900 illustrated in FIG. 29. Therefore, the two additional constraints a) and b) required by Dempster-Shafer theory (also referred to as "DS") imply that the classifiers to be fused must be uncorrelated (e.g., evidentially independent) and that there is no ordering over the classes, and any kind of disagreement (e.g., weights assigned to elements off the main diagonal) can only contribute to a measure of conflict and not, at least to a partial degree, to a measure of confidence. In DS, the measure of conflict K is the sum of weights assigned to the empty set. This corresponds to the elements with a 0 in the penalty matrix P 2900 illustrated in FIG. 29.

According to an embodiment of the invention, the normalized confidence C described above may be used as a measure of confidence, i.e.:

$$\hat{C} = \text{Normalized Confidence}(\hat{A}, P) = \sum_{i=1}^{N+1} \sum_{j=1}^{N+1} \hat{A}(i, j) * P(i, j)$$

The confidence factor $\hat{C}$ may be interpreted as the weighted cardinality of the normalized assignments around the main diagonal, after all the classifiers have been fused. In the case of DS, the measure of confidence $\hat{C}$ is the complement (to one) of the measure of conflict K, i.e.: $\hat{C}=1-K$, where K is the sum of weights assigned to the empty set.

An additional feature of the present invention is the identification of cases that are candidates for a test set, auditing, or standard reference decision process via the comparison module. As illustrated previously in FIG. 1, the comparison module has four inputs. These inputs include the decision of the production engine, which according to an embodiment of the invention, is one of five possible rate classes or a no-decision (e.g., "send the case to a human underwriter"), i.e.:

D(FLE)=r1 and r1ϵ{Best, Preferred, Select, Standardplus, Standard, Sent_to_UW}

An additional input may comprise the decision of the fusion module, which according to an embodiment of the invention, is also one of five possible rate classes or a no-decision (e.g., "send the case to a human underwriter"), i.e.:

D(FUS)=r2 and r2ϵ{Best, Preferred, Select, Standardplus, Standard, Sent_to_UW}

An additional input may comprise the degree of confidence in the production engine decision. The computation of the confidence measure is described in the U.S. patent application Ser. Nos. 10/173,000 and 10/171,575, entitled "A Process/System for Rule-Based Insurance Underwriting Suitable for Use by an Automated System," the contents of which are incorporated herein by reference. This measure may be equated to the degree of intersection of the soft constraints used by a fuzzy logic engine ("FLE"). This measure may indicate if a case had all its constraints fully satisfied (and thus C(FLE)=1) or whether at least one constraint was only partially satisfied (and therefore C(FLE)<1).

An additional input may comprise the degree of confidence in the fusion process. The normalized confidence measure $\hat{C}$ is C(FUS). According to an embodiment of the invention, the first test performed is to compare the two decisions, i.e., D(FLE) and D(FUS). FIG. 30 illustrates all the possible comparisons between the decision of the production engine and the fusion module. Comparison matrix 3000 illustrates the D(FLE) classes 3010 and the D(FUS) classes 3020. From the table it can be seen that label A shows that D(FLE)=D(FUS) and they both indicate the same, specific rate class. Further, label B shows that the fusion module made no automated decision and suggested to send the application to a human underwriter, i.e. D(FUS) =No Decision. Label C shows that D(FLE)≠D(FUS) and that both D(FLE) and D(FUS) indicate a specific, distinct rate class. In addition, label D shows that D(FLE)≠D(FUS), and in particular, that the FLE made no automated decision and suggested to send the application to a human underwriter, while the Fusion module selected a specific rate class. Label E shows that D(FLE)=(FUS) and that both D(FLE) and D(FUS) agree not to make any decision.

A second test may be done by using this information in conjunction with the measures of confidence C(FLE) and C(FUS) associated with the two decisions. With this information, the performance of the decision engine may be assessed over time by monitoring the time statistics of these labels, and the frequencies of cases with a low degree of confidence. According to an embodiment of the invention, a stable or increasing number of label A's would be an indicator of good, stable operations. An increase in the number of label B's would be an indicator that the fusion module (with its models) needs to be retrained. These cases might be shown to a team of senior underwriters for a standard reference decision. An increase in the frequency of label C's or of cases with low confidence could be a leading indicator of increased classification risk and might warrant further scrutiny (e.g., auditing, retraining of the fusion models, re-tuning of the production engine). An increase in label D's may demonstrate that either the production engine needs re-tuning and/or the fusion modules needs retraining. An increase in label E's may demonstrate an increase in unusual, more complex cases, possibly requiring the scrutiny of senior underwriters. Thus, the candidates for the auditing process will be the ones exhibiting a low degree of confidence (C(FUS)<T1), regardless of their agreement with the FLE and the ones for which the Fusion and the Production engine disagree, i.e., the ones labeled C.

The candidates for the standard reference decision process are the cases for which the fusion module shows no decisions (labeled B or E). The candidates to augment the test set may be selected among the cases for which the fusion module and the production engine agree (label A). These cases may be filtered to remove the cases in which the production engine was of borderline quality (C(FLE)<T2) and the cases in which the confidence measure of the fusion was below complete certainty (C(FUS)<T1). Thresholds T1 and T2, may be data dependent and must be obtained empirically. By way of example, T1=0.15 and T2=1. Table 2 below summarizes the conditions and the quality assurance actions required, according to an embodiment of the invention. Dashes ("-") in the entries of the table may indicate that the result of the confidence measures are not material to the action taken and/or to the label applied.

TABLE 2

| Decisions Label from Table 7 | Confidence Measures | | ACTION |
|---|---|---|---|
| | C(FLE) | C(FUS) | |
| A | ≧T2 | ≧T1 | Candidate to be added to data set for tuning of FLE |
| B | — | — | Candidate for Stand Ref Dec. Process. After enough cases are collected, re-tune the classifiers |
| C | — | — | Candidate for Auditing |
| D | — | — | Candidate for Stand Ref Dec. Process. After enough cases are collected, re-tune the classifiers |
| E | — | — | Candidate for Stand Ref Dec. Process. After enough cases are collected, re-tune the classifiers |
| — | — | <T3 | Candidate for Auditing |

According to an embodiment of the invention, the fusion module may be implemented using software code on a processor. By way of an example of the results of an implementation of the present invention, a fusion module was tested against a case base containing a total of 2,879 cases. After removing 173 UW cases, the remaining 2,706 cases were segmented into 831 nicotine users, with three rate classes, and 1,875 non-nicotine users, with five rate-classes. These cases were then used to test the fusion process. Because the cases for which the production engine had made no decision were removed, use of a comparison matrix similar to the one of Table 1400 will only have labels A, B, C. The fusion was performed using the T-norm T2(x,y)=x*y.

FIG. 31 illustrates the effect of changing the threshold T1 on the measure of confidence $\hat{C}$, were $0 \leq \hat{C} \leq 1$. Table 3100 display decisions 3110, confidence thresholds 3120 and the case distributions 3130 based on the confidence threshold 3120. Each column shows the number of cases whose measure of confidence $\hat{C}$ is $\geq T1$. As the threshold is raised, the number of "No Fusion Decision" increases. A "No Fusion Decision" occurs when the results of the fusion are deemed too weak to be used. When the threshold T is 1, no case is rejected on the basis of the measure of conflict. This leaves 36 cases for which no decision could be made. As the threshold is decreased, decisions with a high degree of conflict are rejected, and the number of "No Fusion Decisions" increases.

"Agreements" occur when the fused decision agrees with the FLE and with the Standard Reference Decision (SRD). "False Positives" occur when the fused decision disagrees with the FLE, which in turn is correct since the FLE agrees with the Standard Reference Decision ("SRD"). "False Negatives" occur when the fused decision agrees with the FLE, but both the fusion decision and the FLE are wrong, as they disagree with the SRD. "Corrections" occur when the fused decision agrees with the SRD and disagrees with the FLE. Finally, "Complete Disagreement" occurs when the fused decision disagrees with the FLE, and both the fused decision and the FLE disagree with the SRD. Further, similar results were obtained for nicotine users, and these results are illustrated in FIG. 32, with table 3200 displaying decisions 3210, confidence thresholds 3220 and the case distributions 3230 based on the confidence thresholds 3220.

Figure 33:
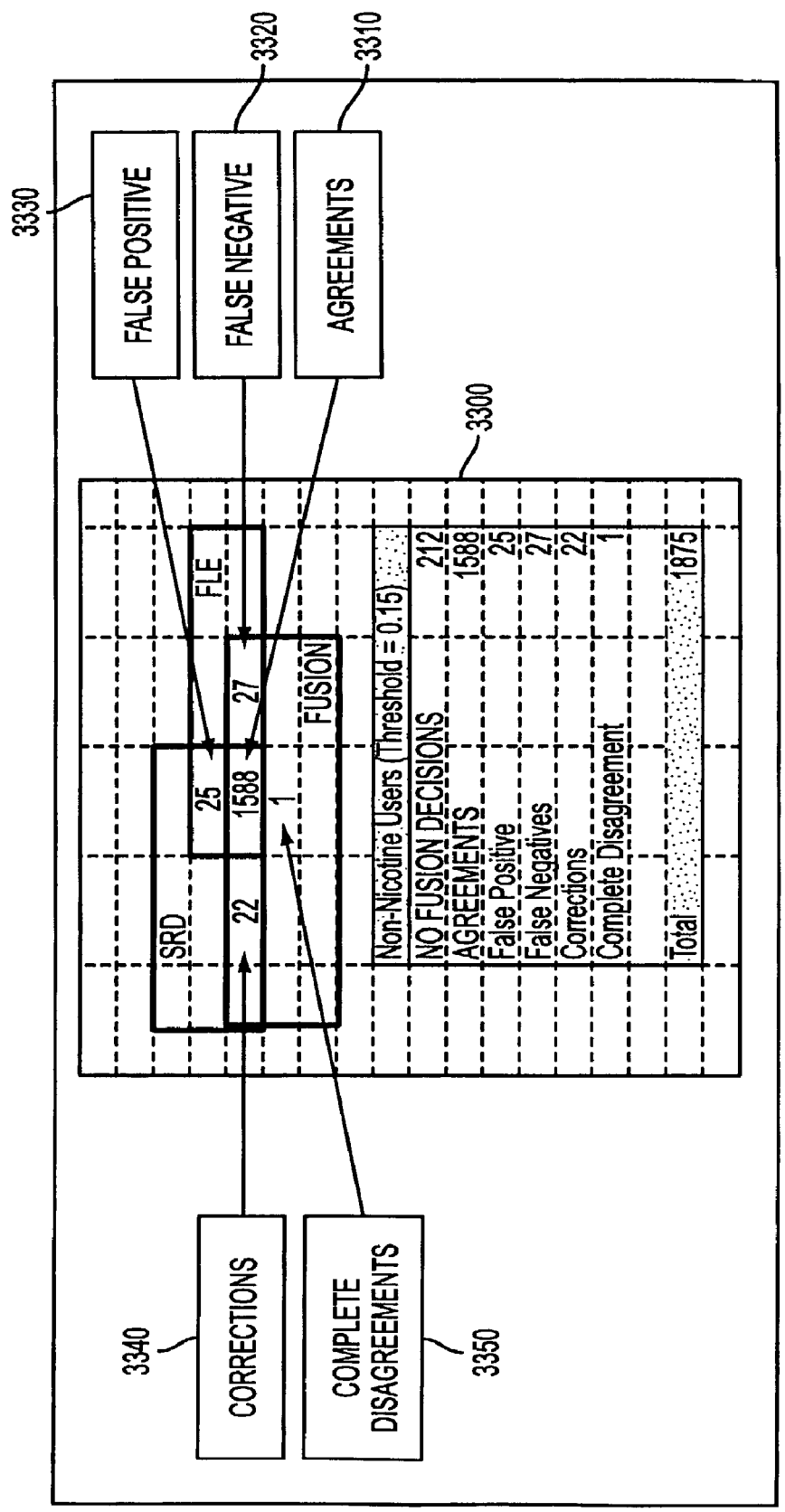
FIG. 33 illustrates a Venn diagram for fusion for non-nicotine cases according to an embodiment of the invention.
Figure 34:
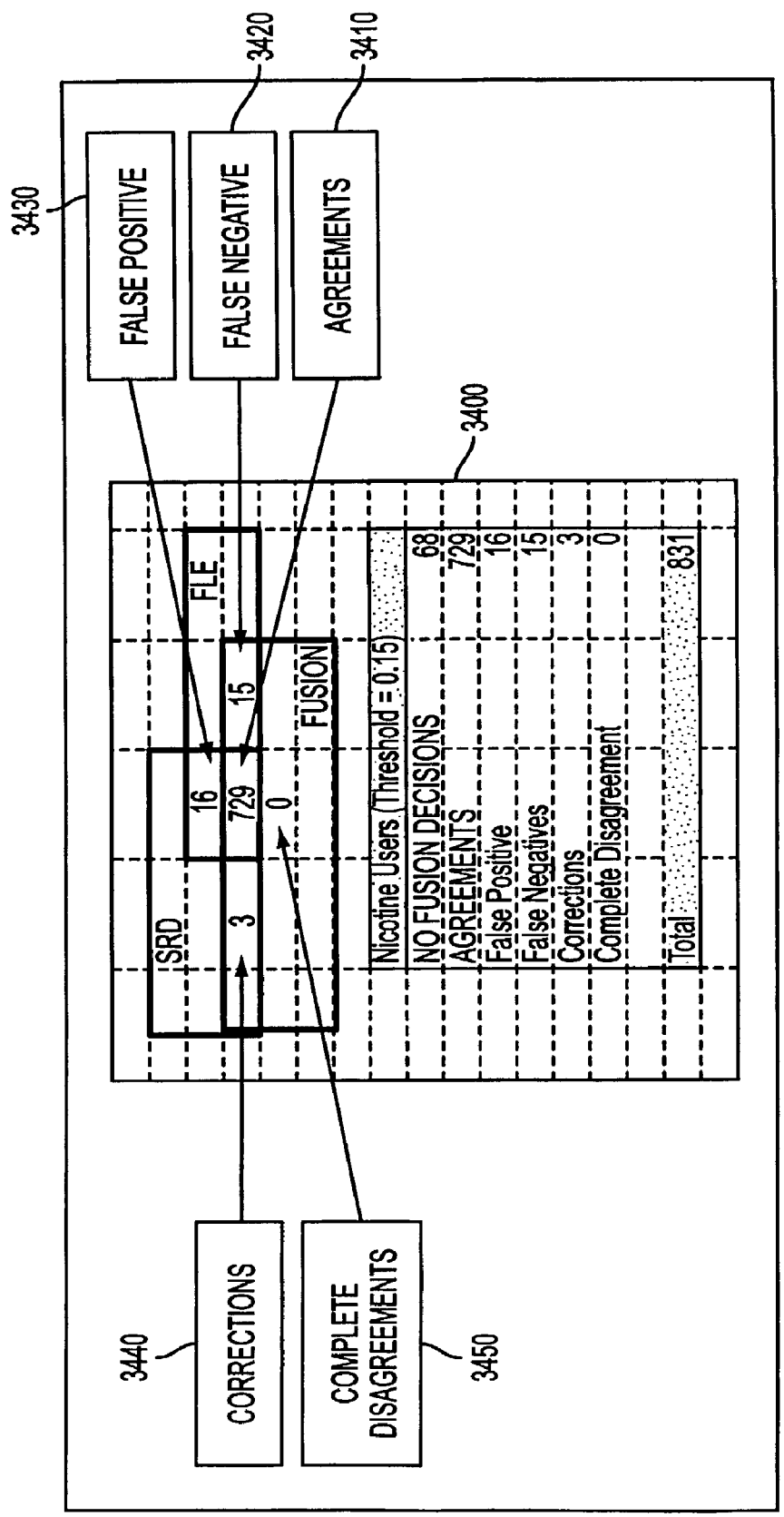
FIG. 34 illustrates a Venn diagram for fusion for nicotine cases according to an embodiment of the invention.

FIG. 33 illustrates a Venn diagram 3300 illustrating the situation for the threshold T1=0.15 (i.e., for $C \geq 0.15$) for the non-nicotine users, while FIG. 34 illustrates a Venn diagram 3400 illustrating the situation for the threshold T1=0.15 (i.e., for $C \geq 0.15$) for the nicotine users. In the case of the non-nicotine users (for T1=0.15) the following labels result:

A: 1,588+27=1,615 (86.13%) in which 3310 D(FUS)=D (FLE); (e.g., agreements 3310 and false negative 3320)

B: =36 (1.92%) in which the fusion did not make any decision (from $\hat{C}$=0);

C1: 212−36=176 (9.39%) in which the fusion was too conflictive ($\hat{C}$<0.15); and C2: 22+25+1=48 (2.56%) in which D(FUS)≠D(FLE) (e.g., false positive 3330, corrections 3340 and complete disagreements 3350).

In the case of the nicotine users (for T1=0.15), the following labels result:

A: 729+15=744 cases (89.5%) in which D(FUS)=D(FLE); (e.g., agreements 3410 and false negatives 3420);

B: =37 cases (4.5%) in which the fusion did not make any decision (from $\hat{C}$=0);

C1: 68−37=31 cases (3.7%) in which the fusion was too conflictive ($\hat{C}$<0.15); and C2: 16+3=19 cases (2.3%) in which D(FUS)≠D(FLE) (e.g., false positives 3430, corrections 3440 and complete disagreements 3450).

According to the present example, since there is no SRD in production, there can only be reliance on the degree of conflict and the agreement between the fused decision and the FLE. If the disagreement between FLE and FUS (e.g., subset C2) is used, it can be observed that the number of cases in which the fusion will disagree with the FLE, and make a classification, is 48/1875 (2.56%) for non-nicotine users and 19/831 (2.3%) for nicotine users. This may be considered a manageable percentage of cases to audit. Further, this sample of cases may be augmented by additional cases sampled from subsets C1.

A further analysis of set C2 in the case of non-nicotine users shows that out of 48 cases, the fusion module called 22 of them correctly and 26 of them incorrectly. From the 26 incorrectly called cases, 14 cases were borderline cases according to the FLE. This illustrates that the problematic cases may be correctly identified and are good candidates for an audit.

A further analysis of set C2 in the case of nicotine users shows that out of 19 cases, the fusion module incorrectly called 16. Of these 16 cases, 6 cases were borderline cases, i.e., the FLE only had partial degree of satisfaction of the intersection of all the constraints e.g., C(FLE)<0.9. Furthermore, 11 cases had a conflict measure $\hat{C}$<0.4. If the union of these two subsets (e.g., the borderline cases and the conflict measure cases) is taken, the results are 13 cases that are either borderline (from the FLE) or have low confidence in the fusion, and the remaining 3 cases were ones that the CBE could not classify (i.e., it could not find enough similar cases). This again demonstrates that the problematic cases may be generally correctly identified and are worth auditing.

The set B (4.5%) illustrates a lack of commitment and is a candidate for a review to assign an SRD. The set A may be a starting point to identify the cases that could go to the test set. However, set A may need further filtering by removing all cases that were borderline according to the FLE (i.e., C(FLE) <T2), as well as removing those cases whose fusion confidence was too low (i.e., C(FUS)<1). Again T2 will be determined empirically, from the data.

Various aspects of the fusion module will now be discussed in greater detail below. It is understood that various portions of the fusion module, as well the different aspects described below, may be performed in different manners without departing from the scope of the invention.

2. Outlier Detector

One component of a fusion module may be determining outlier applications. According to an embodiment of the invention, it may be desirable to detect all classification assignments to applications, such as insurance applications, that are inconsistent and therefore potentially incorrect. Applications that are assigned these inconsistent labels may be defined as outliers. The concept of outliers may extend beyond the realm of insurance underwriting and be intrinsic to all risk classification processes, of which the determination of the proper premium to cover a given risk (i.e., insurance underwriting) is just an example. Therefore, the ultimate domain of this invention may be considered risk classification, with a focus on insurance underwriting.

According to an embodiment of the invention, the existing risk structure of the risk classification problem is exploited from the risk assignments made by the underwriters, similar to the dominance-based classifier described in greater detail below. But whereas the dominance based classifier uses the risk structure to produce a risk assignment for an unlabeled application, the outlier detector examines the risk structure to find any applications that might have been potentially assigned an incorrect risk assignment by the underwriter.

The outlier detector may add to the rationality of the overall underwriting process by detecting globally inconsistent labels and bringing it to the attention of human experts. Many papers in the decision sciences demonstrate that in the presence of information overload, humans tend to be boundedly rational and often, unintentionally, violate compelling principles of rationality like dominance and transitivity. The outlier detector may attempt to counter these drawbacks exhibited by human decision-makers and make the decision-making process more rational. As a result, the risk assignments can be expected to be more optimal and consistent.

Further, by bringing these globally inconsistent risk assignments to the attention of the underwriters, the system may gain knowledge about exceptional decision rules, or additional features that are implicitly used by experts and which may be left unmentioned during the initial design stages of an automated system. This additional knowledge may be used to improve the performance of any automated system. Thus, the outlier detector may also act as a knowledge-eliciting module.

By removing globally inconsistent risk assignments from the initial set, the detection of outliers may further improve the performance and simplicity of other supervised classification systems, such as neural networks and decision-tree classifiers when used as the primary automated system. This is because the presence of global inconsistencies may add to the "non separability" of the feature space, which will often lead to either inferior learning, or very complicated architectures. As the outlier detector reduces the number of global inconsistencies, a cleaner, more consistent training set may be expected to result in a better learning, and by a simpler system. Hence, the outlier detector may improve the classification accuracy, and simplicity of other automated systems.

Because the outlier detector uses the principle of dominance to capture the risk structure of the problem, the outlier detector has explanation capability to account for its results. This is because dominance is a compelling principle of rationality and thus the outliers detected by the system are rationally defensible.

According to an embodiment of the invention, the functionality of the outlier detection system may be generic, so that it can be used to detect outliers for any preference-based problem where the candidates in question are assigned preferences based on the values that they take along a common set of features, and the preference of a candidate is a monotonic function of its feature-values. Therefore, the applicability of an outlier detection system transcends the problem of insurance underwriting, and can be easily extended to any risk classification process.

In many domains where expert opinions are used to score entities, the set of entities that have already been scored are stored as precedents, cases, or reference data points for use in future scoring or comparison with new candidates. The outlier detector can help in ensuring that any new candidate case that goes into the reference dataset will always lead to a globally consistent dataset, thereby ensuring that the reference dataset is more reliable.

According to an embodiment of the invention, an outlier detector may exploit the existing risk structure of a decision problem to discover risk assignments that are globally inconsistent. The technique may work on a set of candidates for which risk categories have already been assigned (e.g., in the case of insurance underwriting, for example, this would pertain to the premium class assigned to an application). For this set of labeled candidates, the system may find all such pairs of applications belonging to different risk categories, which violate the principle of dominance. The outlier detector attempts to match the risk ordering of the applications with the ordering imposed by dominance, and use any mismatch during this process to identify applications that were potentially assigned incorrect risk categories.

As described previously, automating an insurance underwriting process may involve trying to emulate the reasoning used by the human expert while assigning premium classes to insurance applications, and finding computable functions that capture those reasoning principles. According to an embodiment of the invention, the risk category of an application depends upon the values taken by the application along various dimensions, such as Body Mass Index ("BMI"), Cholesterol Level, and Smoking History. The values of the dimensions are then used to assign risk categories to insurance applications. An automated system would operate on these same features while trying to emulate the underwriter. Typically, the risk associated with an application changes with changes to the magnitude of the individual features. For example, assuming that all other features remaining the same, if the BMI of an applicant increases, the application becomes riskier. The outlier detector uses this knowledge to detect all such applications that do not satisfy the principle of dominance.

According to an embodiment of the invention, there is a monotonic non-decreasing relationship between all the feature-values and the associated risk (e.g., higher values imply equal-or-higher risk). Variables that do not meet this relationship may be substituted by their mirror image, which will then satisfy this condition. For instance, let us assume that the relevant medical information for a non-smoker applicant is captured by the following five variables:

$X1$=Cholesterol,
$X2$=Cholesterol Level,
$X3$=Systolic Blood Pressure,
$X4$=Diastolic Blood Pressure,
$X5$=Years since quitting smoking (if applicable).

Mortality risk is monotonically non-decreasing with respect to the first four variables, meaning that such risk can increase (or remain the same) as the values of the four variables increase. However, higher values in the fifth variable have a positive effect, as they decrease the mortality risk. Therefore, the fifth variable needs to be transformed into another variable. By way of example, $X5$ may be transformed into $X5'$, where $X5'$ is defined as $X5'=K-X5=K-$"years since quitting smoking". K is a constant, e.g., $K=7$, so that higher values of $X'$ will reflect same or increased mortality risk. Other relationships between all the feature-values may also be used.

Further, if two insurance applicants A and B are compared where applicants A and B are identical along all features, except that the applicant B has a higher BMI than A, then the risk associated with applicant A cannot be greater than that associated with B. In other words, the premium associated to the rate class assigned to A should not be higher than that one assigned to B. The above reasoning principle is referred to, in decision theory, as the principle of dominance and in the above example applicant A dominates applicant B. The terminology dominates(A,B) is used to capture this relation between applicant A and applicant B.

For example, given two applications A and B, it can be said that application A dominates application B if and only if application A is at least as good-as application B along all the features and there is at least one feature along which application A is strictly better than application B. The dominates relation may be based on the above definition of dominance. It is a trichotomous relation, meaning that given two applications A and B either application A dominates application B, application B dominates application A, or neither dominates the other. In the case where neither applicant dominates the other, each application may be better than its counterpart along different features. In such a case, application A and application B may be said to be dominance-tied. For example, as illustrated in Table 3 below, assume there are three applicants A, B, and C with the following feature values:

TABLE 3

| Application | BMI | Cholesterol | BP_sys |
|---|---|---|---|
| A | 25 | 255 | 115 |
| B | 26 | 248 | 120 |
| C | 24 | 248 | 112 |

Assuming for simplicity that these are the only three features used to assess the risk of an applicant. By the definition, it can be seen that application C dominates both application A and application B, since application C is at least as good (e.g., as low) as application A and application B along each feature, and moreover there is at least one feature along which application C is strictly better (e.g., strictly lower) than both application A and application B. However, application A and application B are dominance-tied since each is better (e.g., lower) than the other along some feature (application A has better cholesterol value while application B has better BMI value).

According to an embodiment of the invention, the relation No_Riskier_Than(A,B) is true if the risk associated with applicant A (say $r_A$) is no higher than that associated with applicant B (say $r_B$), i.e., $$\text{No\_Riskier\_Than}(A,B) \Leftrightarrow (r_A \leq r_B).$$

According to an embodiment of the invention, based on the assumption that the risk associated with an applicant is a monotonic non-decreasing function of the feature values, it can be seen that for any pair of insurance applications, if the dominates relation holds between the two applications in a certain direction (e.g., application A dominates application B), then the No_Riskier_Than relation will also hold in the same direction (e.g., application A is No_Riskier_Than application B). In other words, the dominates relation is a sufficiency condition for the No_Riskier_Than relation. That is:

$$\text{dominates}(A,B) \rightarrow \text{No\_Riskier\_Than}(A,B).$$

An application may be considered an outlier based on one or more characteristics. According to an embodiment of the invention, application X and application Y are marked as outliers if application X dominates application Y, and application X is assigned a risk category that associates greater risk with application X compared to application Y. According to an embodiment of the invention, application X and application Y are marked as outliers if application Y dominates application X, and application Y is assigned a risk category that associates greater risk with application Y compared to application X.

The above statements can be described formally with the following equation:

$$(X,Y \text{ are outliers}) \Leftrightarrow (\text{dominates}(X,Y) \char`\^ (r_X > r_Y))$$

$$\vee (\text{dominates}(Y,X) \char`\^ (r_Y > r_X))$$

As can be seen, from the definitions of the dominates relation and the No_Riskier_Than relation, inconsistent risk assignments may be identified. If application X dominates application Y, then application X will be at least as good as application Y along all features and strictly better than application Y along at least one feature. As a result, logically, application X cannot be riskier than application Y. Therefore, if the risk assignments made by the underwriters are such that application X is categorized as being riskier than application Y, then the existing risk assignments made to application X, and application Y, or to both application X and application Y, may likely be logically infeasible. Therefore, both application X and application Y are labeled as outliers, e.g., applications that have inconsistent assignments, and therefore potentially incorrect risk categories. According to an embodiment of the invention, in order to exploit the presence of the dominance relation between two applications and to logically restrict the risk assignment of the two applications, it may be necessary to ensure that all the features that are being used by the experts during the risk assignments are also used during the dominance comparisons.

Figure 35:
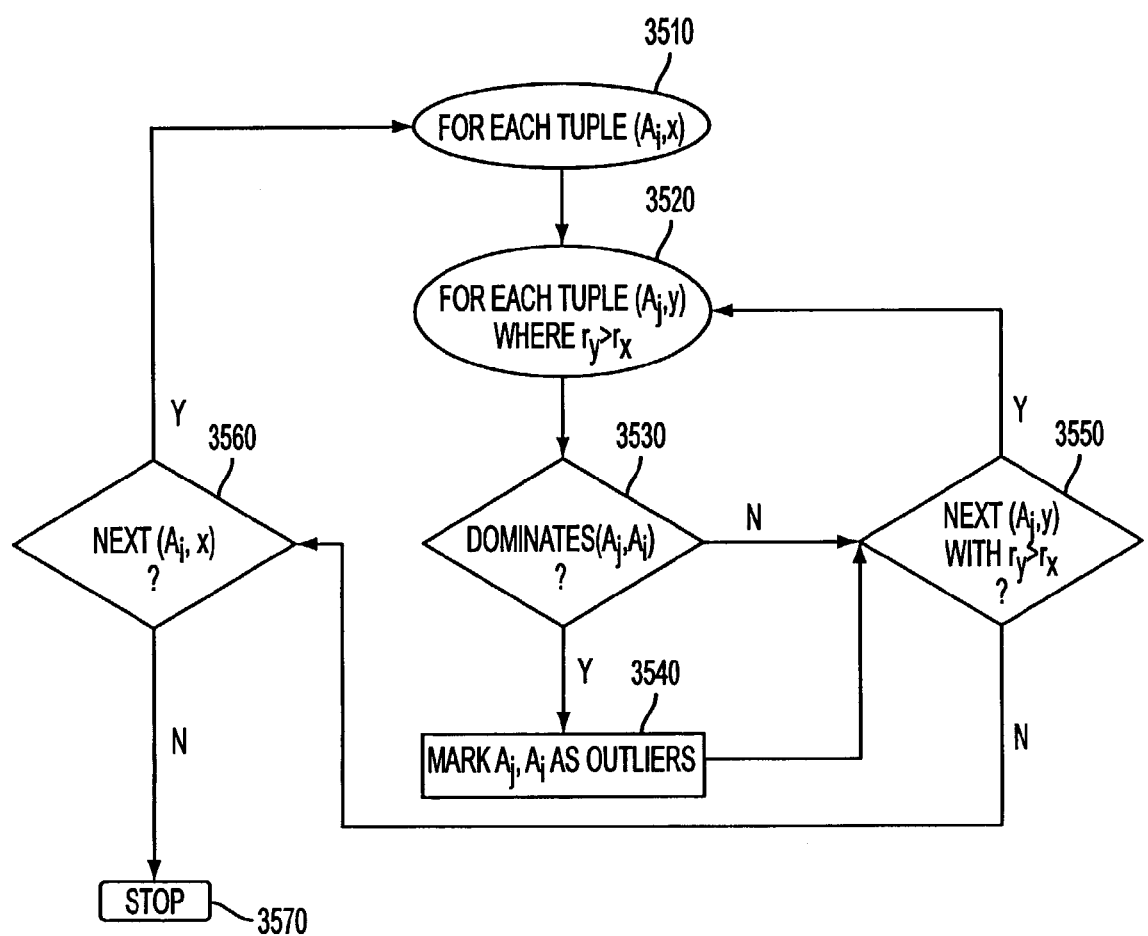
FIG. 35 is a flowchart that illustrates an outlier detector according to an embodiment of the invention.

The steps involved in outlier detection according to an embodiment of the invention are described below and shown in FIG. 35. An outlier module operates on a set A of applications, each of which has been assigned a risk category from one of the i possible categories. The system may be thought of as operating on a set of tuples $\{(A_j,x)\}$ where x is the risk category assigned by the underwriter to application $A_j$. The process for outlier detection may be implemented in pseudocode as set forth below:

```
Outlier_detect(A:{A_j,x})
{
  for each tuple (A_j,x) ∈ A
  {
    for each tuple (A_k,y) ∈ A where r_y > r_x
    {
      if (dominates(A_k,A_j))
        mark A_j, A_k as outliers;
        break;
      else
        next A_k;
    }
    next A_j;
  }
  Report set of outliers;
}
```

As defined earlier, outliers are pairs of tuples $(A_p,x)$, $(A_q,y)$ where $A_p$ dominates $A_q$ but $r_y < r_x$. FIG. 35 illustrates a flowchart for detecting outliers given a set of labeled applications. At step 3510, a tuple $(A_i,x)$ is identified. A tuple $(A_j,y)$ is identified at step 3520, where the rate class $r_y$ for tuple $(A_j,y)$ is greater than the rate class $r_x$. At step 3530, a determination is made whether tuple $(A_j,y)$ dominates tuple $(A_i,x)$ (e.g., Dominates $((A_j,i))$. If yes, tuples $(A_i,x)$ and $(A_j,y)$ are marked as outliers. The system then determines at step 3550 if there is another tuple $(A_j,y)$, where $r_y > r_x$. This determination is also made if tuple $(A_j,y)$ does not dominate tuple $(A_i,x)$. At step 3550, if there is another $(A_j,y)$, where $r_y > r_x$, the process returns to step 3520. If there is no other tuple $(A_j,y)$ where $r_y > r_x$, a determination is made at step 3560 whether there is another tuple $(A_i,x)$. If yes, the process returns to step 3510, while if not, the system ends at 3570.

According to an embodiment of the invention, an outlier detector may be implemented in software code, and tested against a database of cases. For example, an outlier detector may be tested against a database of approximately 2,900 cases. In such an example, the outlier detector identified more than a dozen of subsets containing at least one inconsistency. The results produced by the outlier detector in this example are shown in Table 4 below, along with a few relevant feature values.

TABLE 4

| Risk Class | Age | Height | Weight | BP_Sys | BP_Dias | Cholesterol | Chol_Ratio | SGOT | SGPT | GGT | Curr Smoking Status | Build | Fam_Hist | Fam_Death |
|---|---|---|---|---|---|---|---|---|---|---|---|---|---|---|
| PREF | 53 | 62 | 146 | 112 | 80 | 258 | 4.1 | 21 | 16 | 17 | 0 | 26.70 | 0 | 0 |
| BEST | 29 | 77 | 229 | 132 | 84 | 278 | 4.6 | 25 | 22 | 17 | 0 | 27.16 | 0 | 0 |

In Table 4 above, each row represents an insurance application for which the risk classification had already been determined, as shown in the first column. The risk class "BEST" is a lower risk class compared to the risk class "PREF." A person classified in the "BEST" risk class will have to pay a lower premium than a person classified in the "PREF" class. Yet, it can be seen that the application indicated in the row first of Table 4 dominates the application of the second row. In the present example, upon sending these two applications to human underwriters for reconsideration, the risk classifications for the applications were reversed. This simple example illustrates the use of an outlier detector to obtain more consistent risk assignments.

Figure 36:
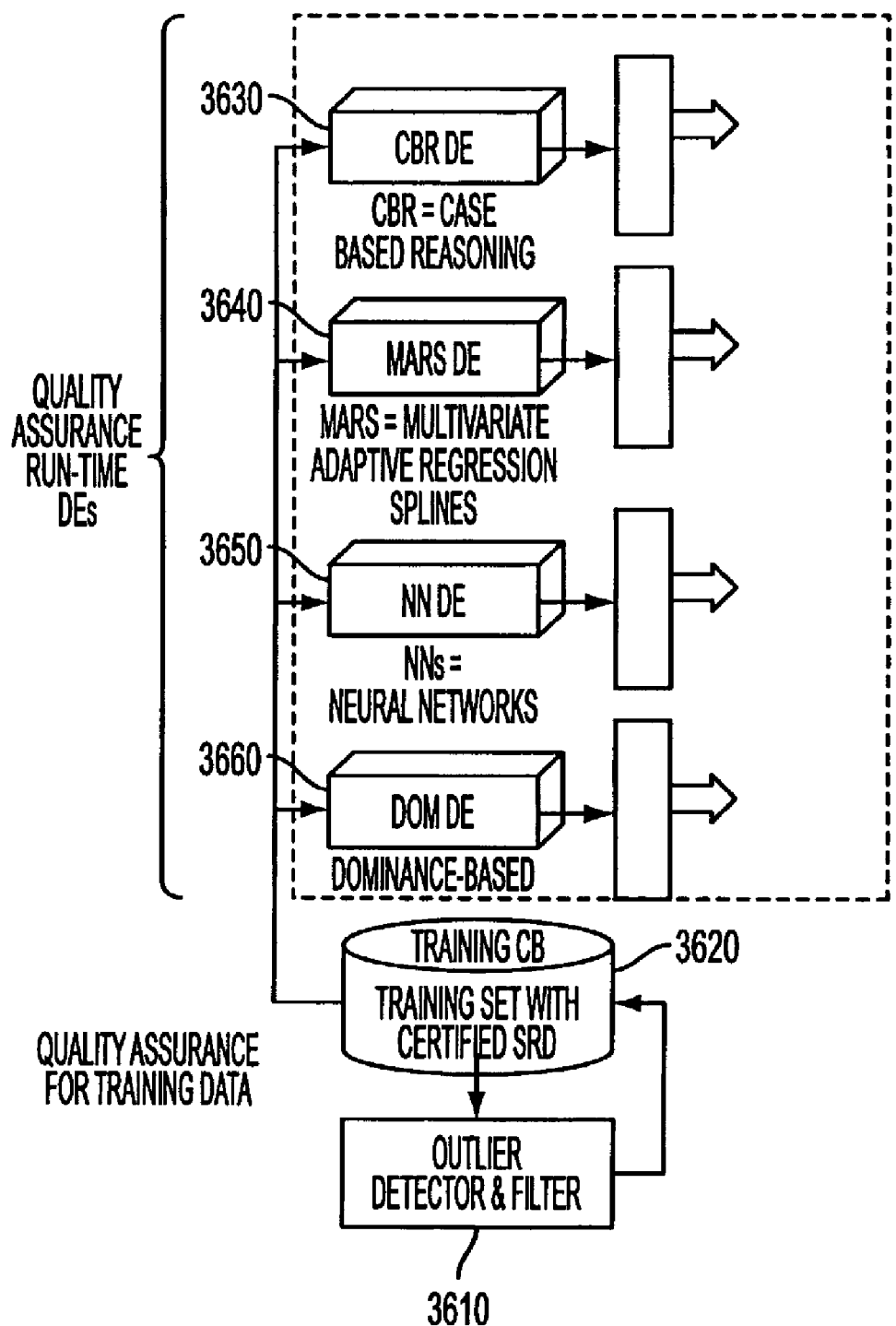
FIG. 36 illustrates an outlier detector used in quality assurance according to an embodiment of the invention.

As illustrated in FIG. 1 above, outlier detector 180 is shown after the fusion to insure that any new addition to the best-cases database would be dominance-consistent with the existing cases. Another potential use for the outlier detector is its application to the training-cases database used to train each of the decision engines used by the fusion module. This is a Quality Assurance step for the training data to insure that the training cases do not contain outliers (e.g., inconsistent cases in the dominance sense) so as to improve the learning phase of the four models illustrated (CBR, NN, MARS, Dominance) before they are used as run-time classifiers for the Quality Assurance process of the production engine. According to an embodiment of the invention, as illustrated in FIG. 36, an outlier detector 3610 and a training case-base 3620 may be positioned for quality assurance for CBR DE 3630, MARS DE 3640, NN DE 3650 and DOM DE 3660, the output of which is fed into a fusion module (not shown).

3. Dominance Classifier

According to an embodiment of the invention, the risk structure of an underlying problem may also be exploited to produce a risk category label for a given application, such as an insurance application. This risk classification can be assured to be accurate with a high degree of confidence. Specifically, as described above in relation to the outlier detector, the application of a dominance classifier may also provide risk assignments having a high confidence measure. Further, when strict definitions are implemented, the relative accuracy of the system approaches 100%, thus minimizing the degree of mismatch between the risk assignment made by a human underwriter and the automated rate class decisions.

A dominance classifier may have many of the advantages of the outlier detector. The principle of dominance is a compelling principle of rationality and thus the classification produced by the technique is rationally defensible. This imparts explanation capability to the classification making it transparent and easy to comprehend. Further, there are no iterative runs involved in tuning. As a result, the tuning process may reduce and become less time-consuming. The output of this dominance-based classifier can be combined in a fusion module with the output(s) generated by other classifiers. A fusion process may be used for quality assurance of a production decision engine, to provide a stronger degree of confidence in the decision of the engine, in the case of consensus among the classifiers, or to suggest manual audit of the application, in the case of dissent among the classifiers.

According to an embodiment of the invention, automating an insurance application underwriting process may essentially involve trying to emulate the reasoning used by a human expert while assigning premium classes to insurance applications, and finding computable functions that capture those reasoning principles. The risk category of an application depends upon the values taken by the application along various dimensions, such as, but not limited to, body mass index (BMI), cholesterol level, and smoking history. An underwriter makes use of these values to assign risk categories to the applications. Hence, an automated system should operate on these same features while trying to emulate the underwriter. Typically, the manner in which the risk associated with an insurance application changes with changes to the magnitude of the individual features is also known. For example, when all other features in an insurance application remain the same, if the BMI of an applicant increases, the application becomes riskier.

A dominance-based risk classification may use this knowledge to generate a risk category for a given application, such as an insurance application. According to an embodiment of the invention, an assumption may be made that there is a monotonic non-decreasing relationship between all the feature-values and the associated risk (i.e., higher values imply equal-or-higher risk). For those variables that do not meet this relationship, a mirror image may be substituted, which will then satisfy this condition that lower values correspond to lower risk. This can be seen with reference to Table 3 regarding the outlier detector.

Further, as discussed above with respect to the outlier detector, the relation: dominates (A,B)→No_Riskier Than (A,B) still holds The term Bounded_within(B,{A,C}) may be used when application B is bounded_within application A and application C, if and only if application A dominates application B and application B dominates application C, i.e., Bounded_within(B,{A,C})⇔dominates(A,B)^dominates(B,C).

This relation may then be read as "B is bounded within A and C."

If application B is bounded within two applications A and C, and if the risk category assigned to applications A and C is the same, then the risk category of application B has to be the same as that of applications A and C. i.e., Bounded_within(B,{A,C})^($r_A$=$r_C$=r)→($r_B$=r)

To better demonstrate this, suppose the following is present:

Bounded_within(B,{A,C})^($r_A$=$r_C$=r).

This implies that dominates(A,B)^dominates(B,C)^($r_A=r_C=r$).

Or,

No_Riskier_Than(A,B)^No_Riskier_Than(B,C)^
($r_A=r_C=r$).

Based on the definitions of the relation, the above can be rewritten as, ($r_A \leq r_B$)^($r_B \leq r_C$)^($r_A=r_C=r$).

In other words, $r_B=r$ thereby demonstrating the principle of dominance based risk classification.

This principle may serve as the basis for a risk classification. For any given application B with unassigned risk category, a determination is made whether there exist two applications A and C such that the Left Hand Side (LHS) of the principle is satisfied, i.e., Bounded_within(B,{A,C})^($r_A=r_C=r$). If this occurs, the risk category of application B is assigned to be the same as that of applications A and C.

Even if an application A dominates another application B, the two applications may still be quite close in terms of their feature-values so that they belong to the same risk category. In other words, it may be expected for the dominates relation to hold between some pairs of applications even if the two applications belong to the same risk category. This may mean that further partitions of the applications within a risk category may be made, such as into the best, non-dominated subset and worst, non-dominating subset.

According to an embodiment of the invention, the best, non-dominated subset for a given risk category may be defined as the one that contains all such applications that are not dominated by another application within that risk category. This may also be referred to as the Pareto-best subset.

According to an embodiment of the invention, the worst, non-dominating subset for a given risk category may be defined as the one that contains all those applications that do not dominate even a single application in that risk category. This may also be referred to as the Pareto-worst subset.

Figure 37:
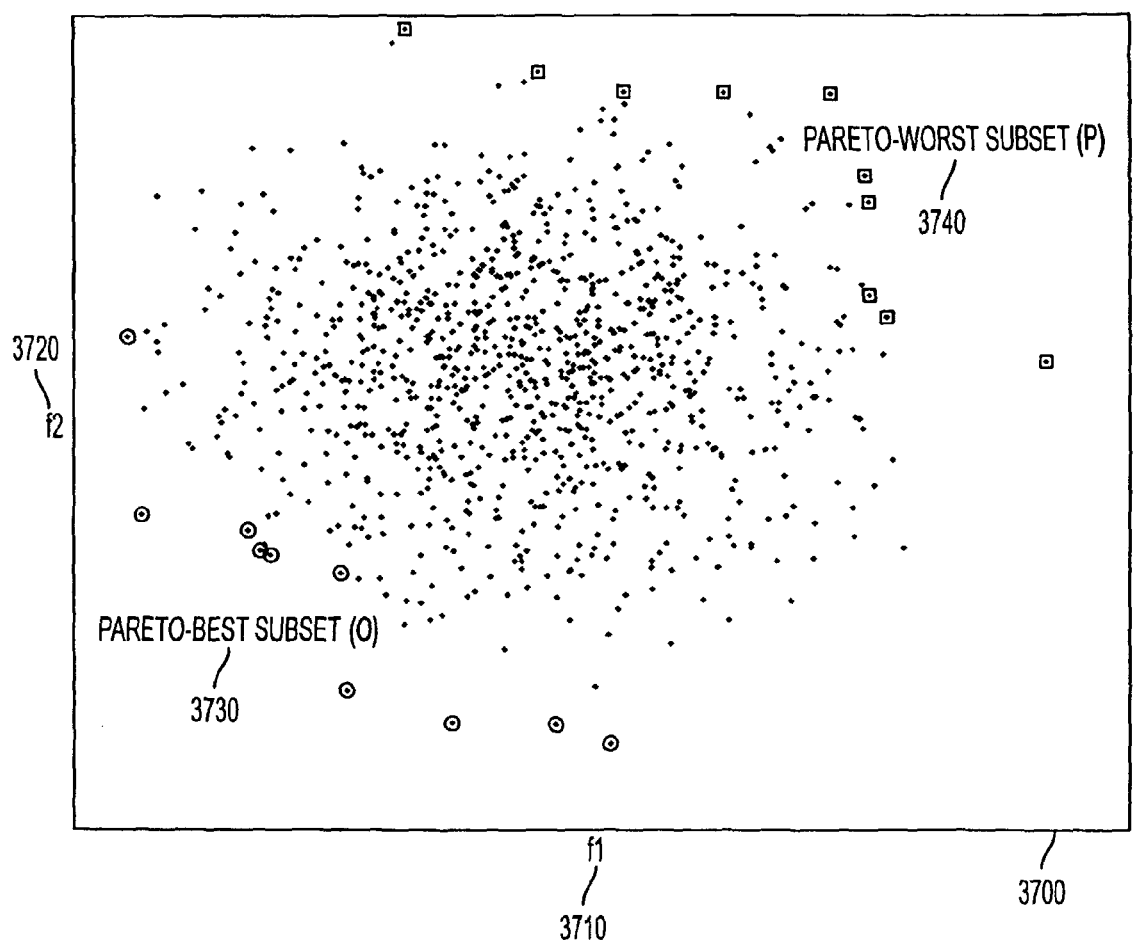
FIG. 37 illustrates a plot of two features for insurance applications according to an embodiment of the invention.

To visualize these two subsets geometrically, FIG. 37 may be referred to, which shows a plot of features f1 3710 and f2 3720 for 1000 insurance applications. The insurance applications are plotted as points in the 2-dimensional feature space. For simplicity, assume that these are the only two features used while assigning a risk category to the applications, and that the lower values along a feature correspond to a lower risk. In FIG. 37, circles denote the Pareto-best subset 3730 while the squares denote the Pareto-worst subset 3740. The circles take the lowest (e.g., the most desirable) values along both features while the squares take on the highest (e.g., the least desirable) values. In addition, using the definition of the Pareto-best subsets 3730 and the Pareto-worst subsets 3740 as set forth above, each of the remaining insurance applications is such that at least one application represented by a circle dominates it, and it dominates at least one application represented by a square. In other words, for each point X that is not in the Pareto-best subset(O) 3730 or in the Pareto-worst subset(P) 3740 in FIG. 37, there is at least one square S and one circle C such that Bounded_within(X,{C,S})is true. For example, suppose that every circle and square in FIG. 37 representing an application was assigned the same risk category r. Then, by applying the principle of dominance-based risk classification, all the points shown in FIG. 37 can be assigned the risk category r as well.

According to an embodiment of the invention, the production of the two subsets O and P is identical to the production of the dominance subset in discrete alternative decision problems. By way of example, articles by Kung, Luccio, and Preparata (1975), and Calpine and Golding (1976), the contents of which are incorporated herein by reference, present algorithms which can create these subsets in $O(n.\log^{m-1}(n))$ time, where n is the number of candidates involved and m is the number of features along which the dominance comparisons are being done. Hence, for an underwriting problem with r risk categories, there may be 2r such subsets, or one pair for each risk category representing the risk surfaces that form the upper bound and the lower bound.

According to an embodiment of the invention, an algorithm may produce the Dominance subset for a given set of alternatives X(n,m) where n is the number of candidates and m is the number of features used. The term Dominance(X,k) may be used to indicate the application of such an algorithm to the set X(n,m), where k is either +1 or −1, depending upon whether higher or lower feature values are desired to be considered as better during dominance comparisons. According to an embodiment of the invention, two principal modules, the tuning module and the classification module, may be used. The tuning module may compute the Pareto-best and Pareto-worst subsets for each risk category. The Classification module may use the results of the tuning to classify new applications.

The tuning module may use the Dominance algorithm to compute the Pareto-best and the Pareto-worst sets for each risk category. Given a set of applications A, such as insurance applications that have been partitioned into i different risk categories by the underwriter, tuning may use the pseudocode set forth below:

```
TUNE(A,i){
    for each risk category r_i
    {
        Compute and store the indices of the Pareto-Best subset O(r_i).
        Obtain the Dominance(A) enforcing that lower feature-
        values are better.
        Compute and store the indices of the Pareto-Worst subset P(r_i).
        Obtain the Dominance(A) enforcing that higher feature-
        values are better.
    }
```

Figure 38:
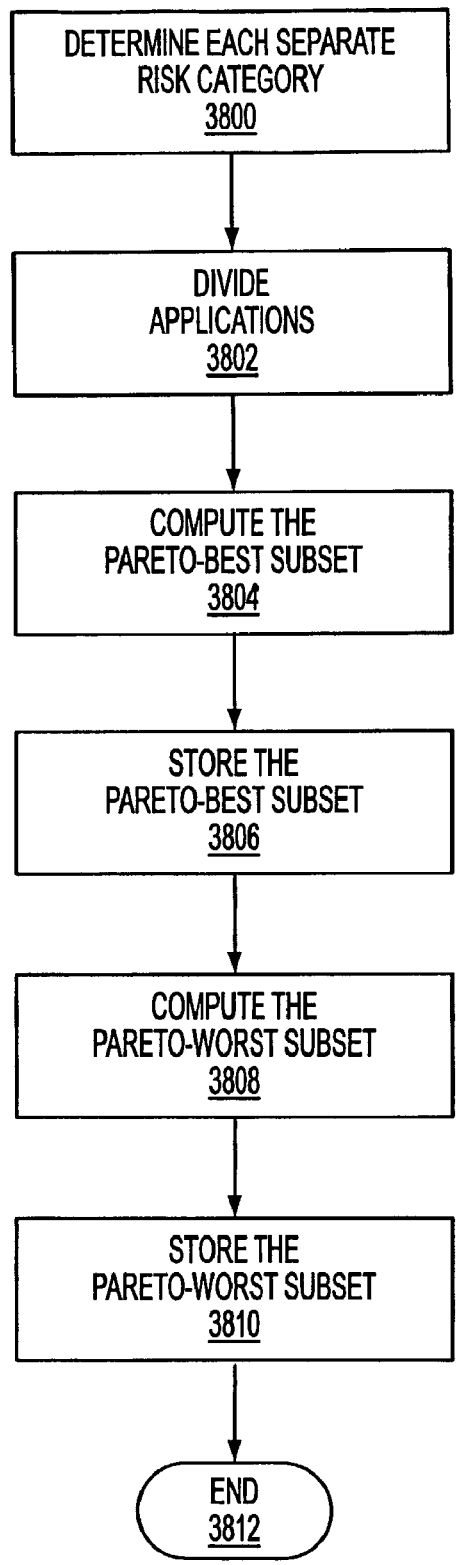
FIG. 38 is a flowchart that illustrates a tuning process according to an embodiment of the invention.

FIG. 38 is a flowchart illustrating the steps involved in the tuning process according to an embodiment of the invention. At step 3800, each separate risk category is determined. At step 3802, a set of applications A is divided into the different risk categories. At step 3804, the Pareto-best subset of the applications within each risk category is computed. At step 3806, the Pareto-best subset is stored. At step 3808, the Pareto-worst subset of the applications within each risk category is computed. At step 3810, the Pareto-worst subset is stored, completing the tuning process at step 3812.

The classification module may use the sets O and P from the tuning process to assign risk classifications to new applications. According to an embodiment of the invention, the classification module assigns a risk category to any new application by checking if a given application satisfies the Bounded_within relation with respect to a Pareto-best, and another Pareto-worst application for a given rate class. According to an embodiment of the invention, given a set of unlabeled applications, U, and the Pareto-best subsets and the Pareto-worst subsets obtained for each of the i risk categories from tuning, each application in U is assigned a risk category.

Figure 39:
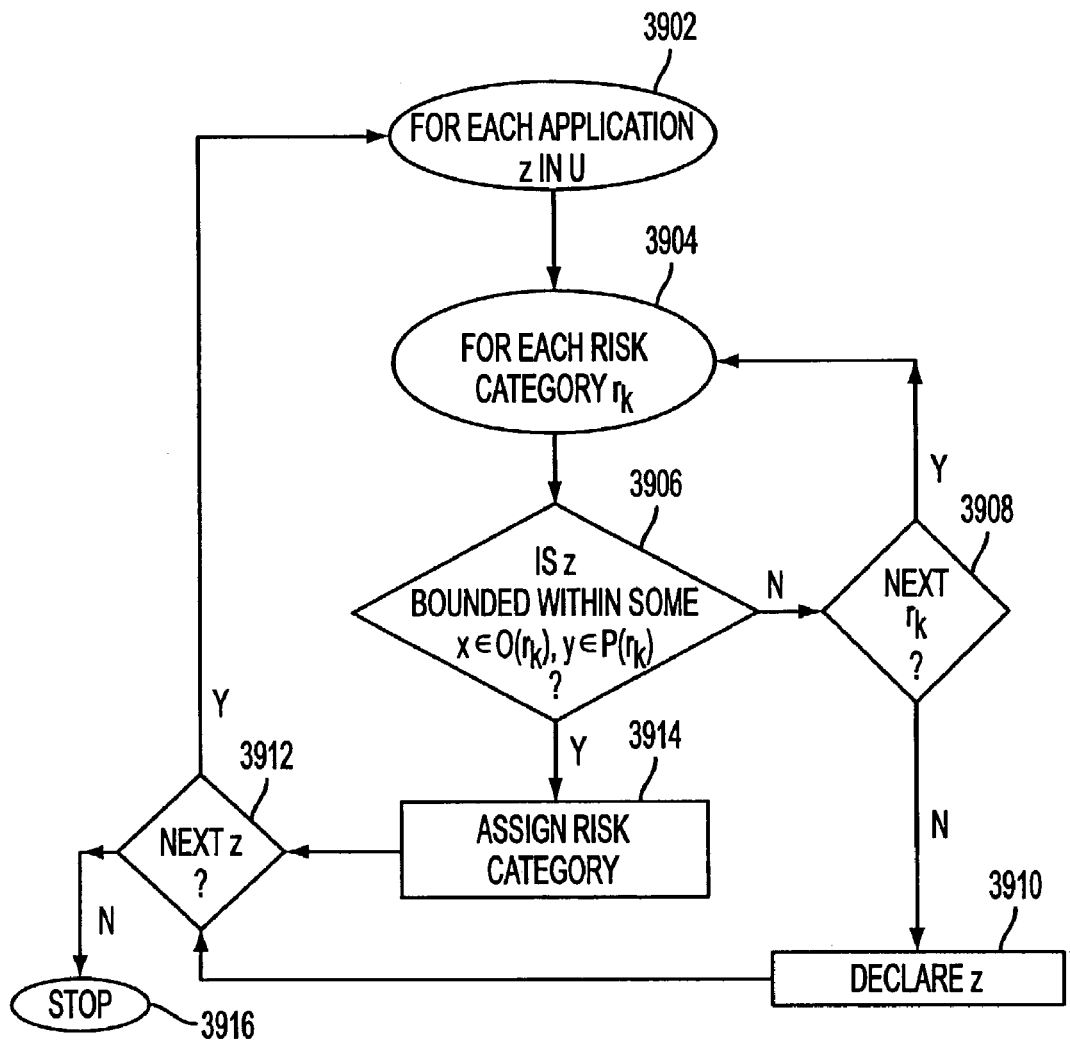
FIG. 39 is a flowchart that illustrates a classification process according to an embodiment of the invention.

Assignment of a risk category may be carried out according to the pseudocode set forth below using the principle of dominance based risk classification:

FIG. 39 illustrates the steps involved in the classification process according to an embodiment of the invention. At step 3902, an application is selected from U. At step 3904, a risk category $r_k$ is selected. At step 3906, a determination is made whether application Z is bounded within some $x \in O(r_k)$, $y \in P(r_k)$. If not, a determination is made if there is another risk category $r_k$, at step 3908. If there is another $r_k$, the process returns to step 3904. If there is no other $r_k$, application Z is declared unresolved at step 3910, and a determination is made if there is another application Z at step 3912. If there is another application Z, the process returns to step 3902. If there is no other application Z, the process ends at step 3916.

Returning to step 3906, if application Z is bounded, risk category $r_k$ is assigned to application Z at step 3914. The process then moves on to step 3912 to determine if there is another application Z.

When assigning a risk category, such as according to the pseudocode steps illustrated previously or according to the steps of FIG. 39, there may be situations that need to be accounted for in the above risk assignment algorithm. One example is where there is no risk category for which the Bounded_within condition is satisfied for A[j]. Another example is where there are at least two risk categories for which the Bounded_within condition is satisfied for A[j]. Each of the above two situations can lead to a different kind of ambiguity. Other situations may also lead to various types of ambiguity.

According to an embodiment of the invention, where there is no risk category for which the Bounded_within condition is satisfied for A[j], an application may be regarded as ambiguous by the system. No risk category is assigned to the application and the application is marked as unresolved.

The comparison matrix 4000 illustrated in FIG. 40 provides an example of the performance of the system for a particular set of applicants. In the example illustrated in FIG. 40, the system initially used the tuning set in order to compute the Pareto-best and the Pareto-worst subsets for each of the risk categories, which in this case are eight risk categories. The system may then classify a set of applications that were not in the tuning set. For these applications, risk assignments were also obtained from the human underwriters. This allows a comparison of the performance of the system with that of the experts using the comparison matrix.

As mentioned earlier, an application that does not satisfy the Bounded_within relation for any of the risk categories, is marked as unresolved by the system. These applications are shown in the column 4002 labeled "UW." As can be seen, quite a large number of applicants were marked as unresolved by the system. However, for the applications that were assigned a risk category by the system, the system was accurate 100% of the time. Thus, 52 applications were correctly classified in column 4004 labeled "PB," 22 applications were correctly classified in column 4006 labeled "P," 16 applications were correctly classified in column 4008 labeled "Sel," 10 applications were correctly classified in column 4010 labeled "Std+," 3 applications were correctly classified in column 4012 labeled "Std," 28 applications were correctly classified in column 4014 labeled "P Nic," 8 applications were correctly classified in column 4016 labeled "Std+Nic," and 3 applications were correctly classified in column 4018 labeled "Std Nic." Hence, the principle of dominance based risk classification presented in this letter has the potential to produce risk assignments with a high degree of confidence. For the few applications that are misclassified above, the use of another system called the dominance based outlier detection system may be used. The dominance based outlier detection system has been described above.

As can be seen from the example of FIG. 40, the classifier is 100% accurate, but may have a lower coverage, meaning that it does not provide a decision for a large number of cases. A different tradeoff may be achieved between relative accuracy and coverage of the system by allowing a minor relaxation of the classification rule used in the extreme rate classes (e.g., the best and worst rate class). According to an embodiment of the invention, one type of modification makes use of the fact that since the risk categories are totally ordered, the principle of dominance-based risk classification can be relaxed for the best and the worst risk categories. This relaxation may therefore be expected to improve the coverage of the automated system. The basis for this relaxation principle may be seen from understanding that if the application for applicant X dominates the application for applicant A such that the risk category assigned to application A is the best risk category for the problem, say $r_{best}$, then the risk category of application X is also $r_{best}$, i.e.:

$$\text{dominates}(X,A) \wedge (r_A = r_{best}) \rightarrow (r_X = r_{best}).$$

For example, assume that there is an application X such that it dominates application A, where it is known that A is assigned the best risk category, i.e.:

$$r_A = r_{best}$$

Since application A belongs to the best risk category, no other applicant can be assigned a better risk category than application A. In other words, $$r_X \geq r_A$$

However since application X also dominates application A, application X can be no riskier than application A which implies that:

$$r_X \leq r_A$$

From this, it can therefore be inferred that:

$$r_X = r_{best}$$

thereby demonstrating the applicability of the relaxation condition described above with respect to the best classification. Further, the relaxed principle of dominance based risk classification for the worst risk category can be seen by noting that if application A dominates application X such that the risk category assigned to application A is the worst risk category, say $r_{worst}$, then the risk category of application X is also $r_{worst}$; i.e.:

$$\text{dominates}(A,X) \wedge (r_A = r_{worst}) \rightarrow (r_X = r_{worst}).$$

For example, assume that there is an application X such that it is dominated by application A, where it is known that A is assigned the worst risk category. i.e.:

$$r_A = r_{worst}$$

Because application A belongs to the worst risk category, every other applicant belongs to a risk category that is better than or equal to that of application A. In other words:

$$r_X \leq r_A$$

However, since application A also dominates application X, therefore application A must also be no riskier than application X, which implies that:

$$r_X \geq r_A$$

From this, it is demonstrated that:

$$r_X = r_{worst}$$

thereby demonstrating the applicability of the relaxation condition described above with respect to the worst classification. Thus, according to an embodiment of the invention, the steps for classification remain the same except that during the $r_k$-loop in FIG. 39, the application at hand is tested for the relaxed conditions described above respectively, and assigned the risk category accordingly if one of the conditions is satisfied.

The comparison matrix 4100 shown in FIG. 41 illustrates performance of the dominance based risk classifier used after incorporating the relaxed conditions defined above, during classification of an applicant and tested against a case base of approximately 541 cases. Coverage of the classifier has improved, since 68 applicants that were initially marked as unresolved by the classifier are now assigned a risk category. Whereas the relative accuracy of the new classifier is not 100% like its counterpart, the number of misclassifications is relatively few. In other words, for a large gain in coverage the overall drop in accuracy obtained by the use of the modified classifier may be relatively minor. Thus, the relaxation conditions may permit a tradeoff between accuracy and coverage of the dominance based risk classifier. Where the relative accuracy is more important for a problem, the earlier version of the classifier may be used. On the other hand, if some problem requires that more applicants be assigned a risk category, then it may be more desirable to use the modified classifier. This imparts flexibility to the system on the whole since it can cater to varying requirements of accuracy and coverage from the automated system, which is an added advantage of the system.

4. Multivariate Adaptive Regression Splines

According to an embodiment of the invention, a network of multivariate adaptive regression splines ("MARS") based regression models may be used to automate decisions in business, commercial, or manufacturing process. Specifically, such a method and system may be used to automate the process of underwriting an application as applicable to the insurance business.

According to an embodiment of the invention, a MARS based system may be used as an alternative to a rules-based engine ("RBE"). U.S. patent application Ser. Nos. 10/173,000, filed on Jun. 18, 2002, and 10/171,575, filed on Jun. 17, 2002, titled "A Method/System of Insurance Underwriting Suitable for Use By An Automated System," the contents of which are incorporated herein by reference in their entirety, describe a fuzzy rule-based system. A MARS model may not be as transparent as other decision engines (e.g., "RBE"), but may achieve better accuracy. Therefore, MARS may be used as an alternative approach for a quality assurance tool to monitor the accuracy of the production decision engine, and flag possible borderline cases for auditing and quality assurance analysis. Further, a MARS module may be a regression-based decision system, which may provide the simplicity of implementation of the model since it is based on a mathematical equation that can be efficiently computed.

According to an embodiment of the invention, a MARS module may facilitate the automation of the "clean case" (e.g., those cases with no medical complications) underwriting decision process for insurance products. A MARS module may be used for other applications as well. A MARS module may be used to achieve a high degree of accuracy to minimize mismatches in rate class assignment between that of an expert human underwriter and the automated system. Further, the development of a parallel network of MARS models may use a set of MARS models as a classifier in a multi-class problem.

The MARS module is described in the context of a method and system for automating the decision-making process used in underwriting of insurance applications. However, it is understood that the method and system may be broadly applicable to diverse decision-making applications in business, commercial, and manufacturing processes. Specifically, a structured methodology based on a multi-model parallel network of MARS models may be used to identify the relevant set of variables and their parameters, and build a framework capable of providing automated decisions. The parameters of the MARS-based decision system are estimated from a database consisting of a set of applications with reference decisions against each application. Cross-validation and development/hold-out may be used in combination with re-sampling techniques to build a robust set of models that minimize the error between the automated system's decision and the expert human underwriter. Furthermore, this model building methodology may be used periodically to update and maintain the family of models, if required, to assure that the family of models is current.

Figure 42:
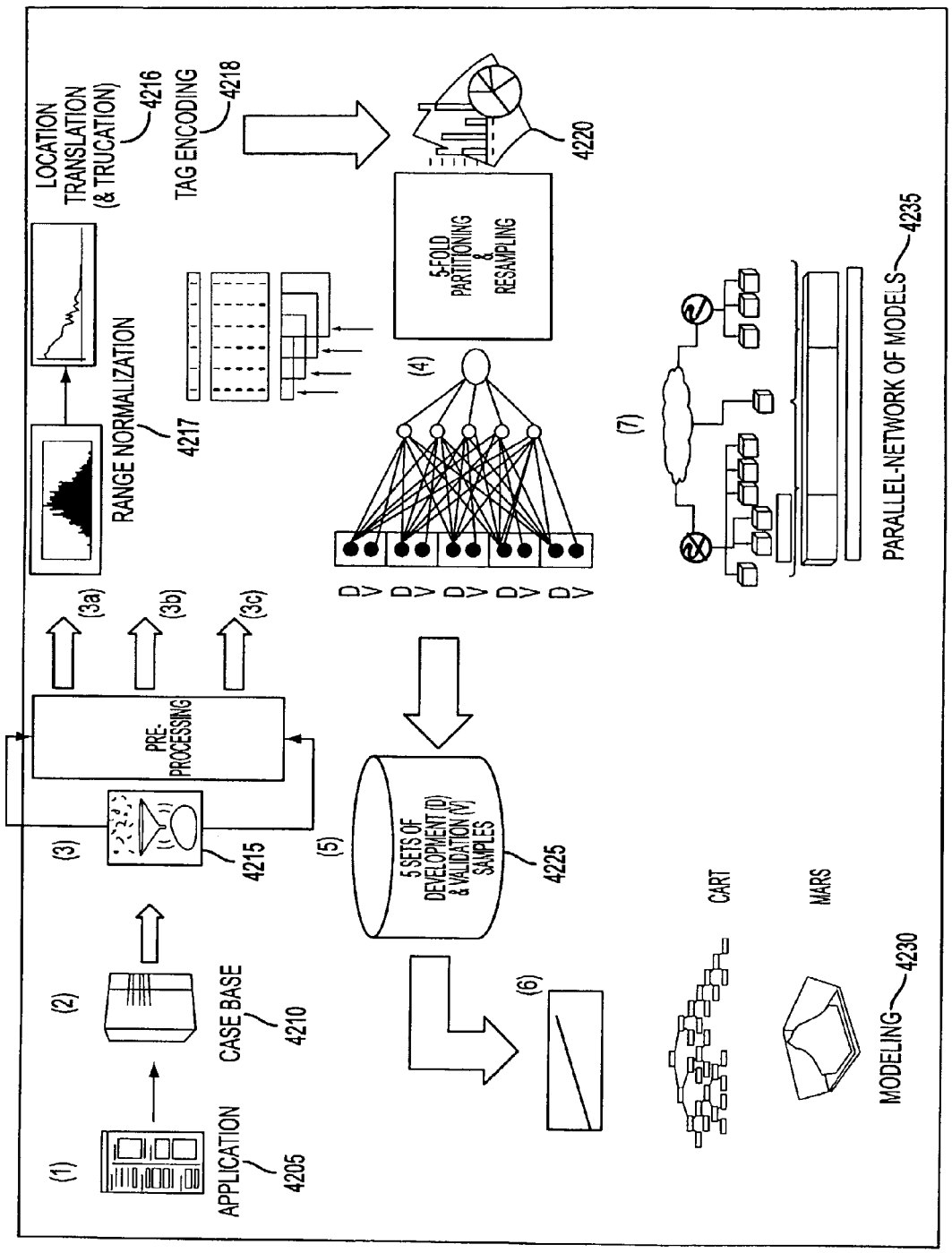
FIG. 42 is a flowchart that illustrates a multi-variate adaptive regression splines ("MARS") process according to an embodiment of the invention.

FIG. 42 is a flowchart illustrating a process for building a MARS module according to an embodiment of the invention. At step 4205, one or more applications (also referred to as cases) are digitized. Digitization may include assuring that the key application fields required by the model to make a decision are captured in digital form by data entry.

In step 4210, a case base is formed. Creating a case base may include assuring that the records corresponding to each application (e.g., case) are stored in a Case Base (CB) to be used for model construction, testing, and validation. In step 4215, preprocessing of cases occurs. Preprocessing may include one or more sub-steps. By way of example, preprocessing may involve location translation and truncation 4216, such as focusing on values of interest for each field. Further, preprocessing may involve range normalization 4217, such as normalizing values to allow for comparison along several fields. Preprocessing may also involve tag encoding 4218, where tag encoding includes augmenting a record with an indicator, which embodies domain-knowledge in the record by evaluating coarse constraints into the record itself.

In step 4220, partitioning and re-sampling occurs. According to an embodiment of the invention, five-fold partitioning may be used, with a stratified sampling within each rate class used to create five disjoint partitions in the CB. In step 4225, generation of a development and validation set occurs. Each partition may be used once as a validation set, with the remaining four used as training sets. This may occur five times to achieve reliable statistics on the model performance and robustness.

At step 4230, one or more model building experiments occur. Experiments with modeling may involve modeling techniques such as global regression and classification and regression trees ("CART") to determine rate classes from a case description. This may result with the selection of MARS as the modeling paradigm.

At step 4235, a parallel network of MARS models is implemented. According to an embodiment of the invention, implementation of networks of MARS models may be used to improve classification accuracy.

According to an embodiment of the invention, the MARS model(s) described may be used as an input to a fusion module. Fusion of multiple classifiers based on MARS, Case-based Reasoning, Neural Networks, etc., may be used to improve classification reliability, as described above. The steps of the process illustrated in FIG. 42 will now be described in greater detail.

At step 4205, cases are digitized and at step 4210, a case base is formed. According to an embodiment of the invention, a MARS model framework starts from a database of applications with the corresponding response variable (e.g., rate class decisions) provided for each. This may be done via cooperative case evaluation sessions with experienced underwriters, or may be accomplished via the reuse of previously certified cases. This database of applications is hereby referred to as a "Certified Case Base" or a "Case Base". According to an embodiment of the invention, it is assumed that the characteristics of the certified case base closely match those of incoming insurance applications received in a reasonable time window i.e., they form a "representative sample." The Case Base may form the basis of all MARS model development.

Figure 43:
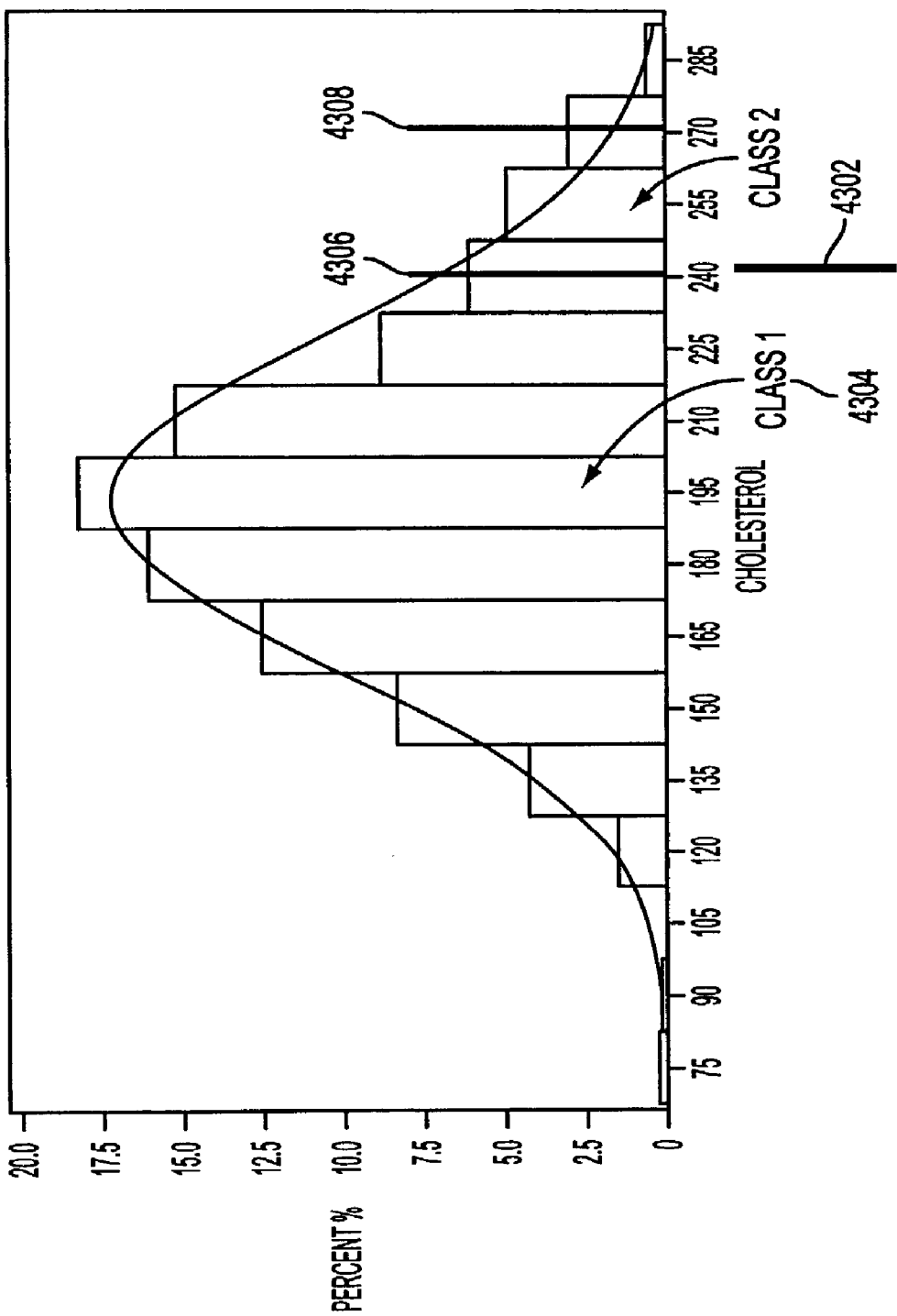
FIG. 43 is a histogram that illustrates decision boundaries according to an embodiment of the invention.

At step 4215, pre-processing occurs. According to an embodiment of the invention, one of the first steps in the model development process is to study the data and its various characteristics. This process may ensure that adequate attention is given to the understanding of the problem space. Later, appropriate pre-processing steps may be taken to extract the maximum information out of the available data via a choice of a set of explanatory variables that have the maximum discriminatory power. According to an embodiment of the invention, as illustrated in FIG. 43, one of the early findings was the fact that for most of the candidate variables that were chosen on the basis of experience and judgment of the human underwriting experts the decision boundary regions as indicated by the human experts start at the tail-end of the variable distribution.

As described above, the decision problem may be to classify each applicant into risk classes, which are typically increasing in risk. Thus, as an example, the attribute denoted by the level of cholesterol in the blood of an individual may be considered. It is a known fact that a cholesterol level below 220 can be treated as almost normal. This suggests that in cases where the cholesterol level is at a certain level, such as up to about 240 at demarcation 4302, the human expert does not perceive a significant risk due to this factor. Thus, all cases with a cholesterol reading below this threshold can be grouped into a single class, e.g., "Class 1," 4304 and the members in this class would not consequently impact the response variable (e.g., the rate class decision). As shown, a cholesterol level value of 240 is close to the 75$^{th}$ quantile 4306 of the distribution, while the value of 270 is in the 90$^{th}$ quantile range 4308.

One of the sub-steps may include location transformation and truncation 4216. A location transformation may be considered for all variables that exhibit the above property. Each variable may be transformed by subtracting out its normal value. This is realized by combining the knowledge of human experts as well, since for the majority of the attributes that are health related, there are well-documented and published normal thresholds.

According to an embodiment of the invention, it may not be desirable to differentiate among points within the normal ranges. Further, to focus the classifier on those in the abnormal range, the values of the variable may be saturated after a location transformation. In this case, the positive values may be considered, e.g.:

NewValue=Max(0,OldValue−ReferenceValue)

The above is not a limitation of the general pre-processing step as would be applicable in other problems, but is a step relevant to the problem domain. There were variables which had the decision boundaries distributed fairly evenly over the entire range and did not warrant this specific transformation.

Further, another sub-step may include range normalization 4217. If it is desirable to compute distances in a multi-dimensional space, e.g., to find the closest points to a given one, it may be necessary to normalize each dimension. Range normalization is typically the most common way to achieve this, e.g.:

$$NewValue\ \% = \frac{NewValue - \min_i(NewValue_i)}{\max_i(NewValue_i) - \min_i(NewValue_i)}$$

Another sub-step may involve "tag"-encoding 4218. According to an embodiment of the invention, a specialized set of variable encoding may also be used to extract the maximum information out of the decision space. This encoding may be referred to as the "tag." The tag is essentially an ordinal categorical variable developed from a collection of indicators for the various decision boundaries as defined by human experts. These indicators are evaluated for each relevant variable in the collection. The maximum of the individual indicators over the collection of variables results in the final "tag." For example, assume that there are four key variables (out of a larger number of fields in the case) that are highlighted by actuarial studies to determine mortality risk. Since the same studies indicate the critical thresholds that impact such risk, there is no reason to re-learn those thresholds. Therefore, they may be encoded in the indicator "tag." Table 5 below illustrates four variables: Nicotine History (NH), Body Mass Index (BMI), Cholesterol Ratio (Chol. Rat.), and Cholesterol Level (Chol. Lev.), and four groups of rules, one for each variable. According to this example, the value of the tag starts with a default of 1 and is modified by each applicable rule set. A running maximum of the tag value is returned at the end, as the final result of tag.

TABLE 5

| | | | | TAG |
|---|---|---|---|---|
| A) Initialize: | | | | 1 |
| B) Fire following rules | | | | |
| Rule # | | IF | | |
| 1 | NH | < | t1 | 2 |
| 2 | | < | t2 | 3 |
| 3 | | < | t3 | 4 |
| 4 | BMI | > | t4 | 2 |
| 5 | | > | t5 | 3 |
| 6 | | > | t6 | 4 |
| 7 | | > | t7 | 5 |
| 8 | | > | t8 | 6 |
| 9 | Chol. Rat. | > | t9 | 2 |
| 10 | | > | t10 | 3 |
| 11 | | > | t11 | 4 |
| 12 | | > | t12 | 5 |
| 13 | | > | t13 | 6 |
| 14 | Chol. Lev. | > | t14 | 2 |
| 15 | | > | t15 | 3 |
| 16 | | > | t16 | 4 |
| 17 | | > | t17 | 5 |
| 18 | | > | t18 | 6 |
| C) Tag is determined by the MAX of the values determined by each of the four rule sets | | | | |

Thus, a tag may provide a utilization of the available human expert knowledge to obtain a boost in accuracy. By way of example, the models were built with and without the inclusion of the specialized "tag" variable and found that inclusion of the tag results in an improvement n accuracy by about 1-2% on average.

At step 4220, five-fold partitioning and resampling occurs, while a development and validation set is generated at step 4225. According to an embodiment of the invention, a stratified sampling methodology may be used to partition the data set into five equal parts. The stratification was done along the various rate classes to ensure a consistent representation in each partitioned sample. Further, a simple re-sampling technique may be used based on reusing each partition by taking out one part (done five times without replacement) as a hold-out and recombining the remaining four and using it as a development sample to build a complete set of MARS models. This may be done five times, as mentioned earlier. By way of example, such a resampling and recombination was performed and the results were compared for consistency in accuracy, and also to note any fundamental shift in models. The accuracy measures were found to be closely grouped in the 94.5%-95.5% neighborhood and with model consistency throughout.

At step 4230, model-building experiments are performed. According to an embodiment of the invention, a variety of exploratory regression models may be built and trained on the CB development sets. Further, their classification accuracy may be tested and validated on the CB validation sets. According to an embodiment of the invention, a parallel-network of MARS models may evolve and develop from a global regression model and a classification and regression trees ("CART") model, and allows the use of MARS in the framework of a multi-class classification problem. The global regression model and the classification and regression trees ("CART") model will now be described in greater detail below.

Since this is a multi-class classification problem, by definition the response variable is a polychotomous categorical variable, i.e., a variable that can take values from a set of labels (e.g., "Preferred Best," "Preferred," "Select," "Standard Plus," "Standard"). However, since in this case the response is ordinal (the order of the categorical values reflects the corresponding increasing risk), a risk metric may be obtained such as from an actuarial department of the insurance company. This allows the mapping of the categorical values to numerical values (e.g., reflecting mortality risk) and treating the response variable as a continuous one in order to fit a global multivariate linear regression. Using this method, a moderate fit to the data is obtained. However, the maximum accuracy achieved was about 60%, far from the desired accuracy level of above 90%.

Additionally, a CART based model may be built using the data. To maintain robustness and to avoid the possibility of overfitting the model, it may be necessary to minimize the structural complexity of the CART model. This approach yielded a CART tree with about 30 terminal nodes. Its corresponding accuracy level was substantially better than the global regression and was about 85%. Increasing the accuracy for the training sets would have resulted in deeper, more complex trees, with larger number of terminal nodes. Such trees would exhibit overfitting tendencies and poor generalization capabilities, leading to low accuracy and robustness when evaluated on the validation sets.

From these experiments, it can be determined that a global regression model, which is essentially a main-effects fit, has moderate explanatory power, but a CART tree, which is a local non-parametric model, has a much better performance. Since CART is essentially a pure interaction-based model the motivation for a MARS based modeling schema was obvious, as MARS allows both main and interaction effects to be incorporated into the model, and being a piecewise-linear adaptive regression procedure, MARS can approximate very well any non-linear structure (if present). Since the original motivation of development of the MARS algorithm stemmed from the problem of discontinuity of CART terminal node estimates, the same benefits may apply here.

At step 4235, a parallel-network of MARS models is implemented. According to an embodiment of the invention, one issue involved the difficulty of global models to incorporate the jumps in decision boundaries of majority of the variables in an extremely small bounded range. In other words, since the decision boundaries begin only after the $75^{th}$ quantile value of the explanatory variable, the shift over all other decision variables usually occur by the $95^{th}$ quantile. This issue may be addressed in a number of ways. According to one approach, "tag" encoding as explained above helps the MARS search algorithm to find the "knots" in the right place.

According to another approach, a "parallel network" arrangement of models may be used. A parallel network arrangement is a collection of MARS models, each of which solves a binary, or two-class problem. This may take advantage of the fact that the response variable is ordinal e.g., the decision classes being risk categories are increasing in risk. The approaches to these issues should not be considered as limitations of the methodology presented here, but rather a property explored in order to achieve better results. In addition, the above case generalizes to handle problems where the response may not be ordinal.

Figure 44:
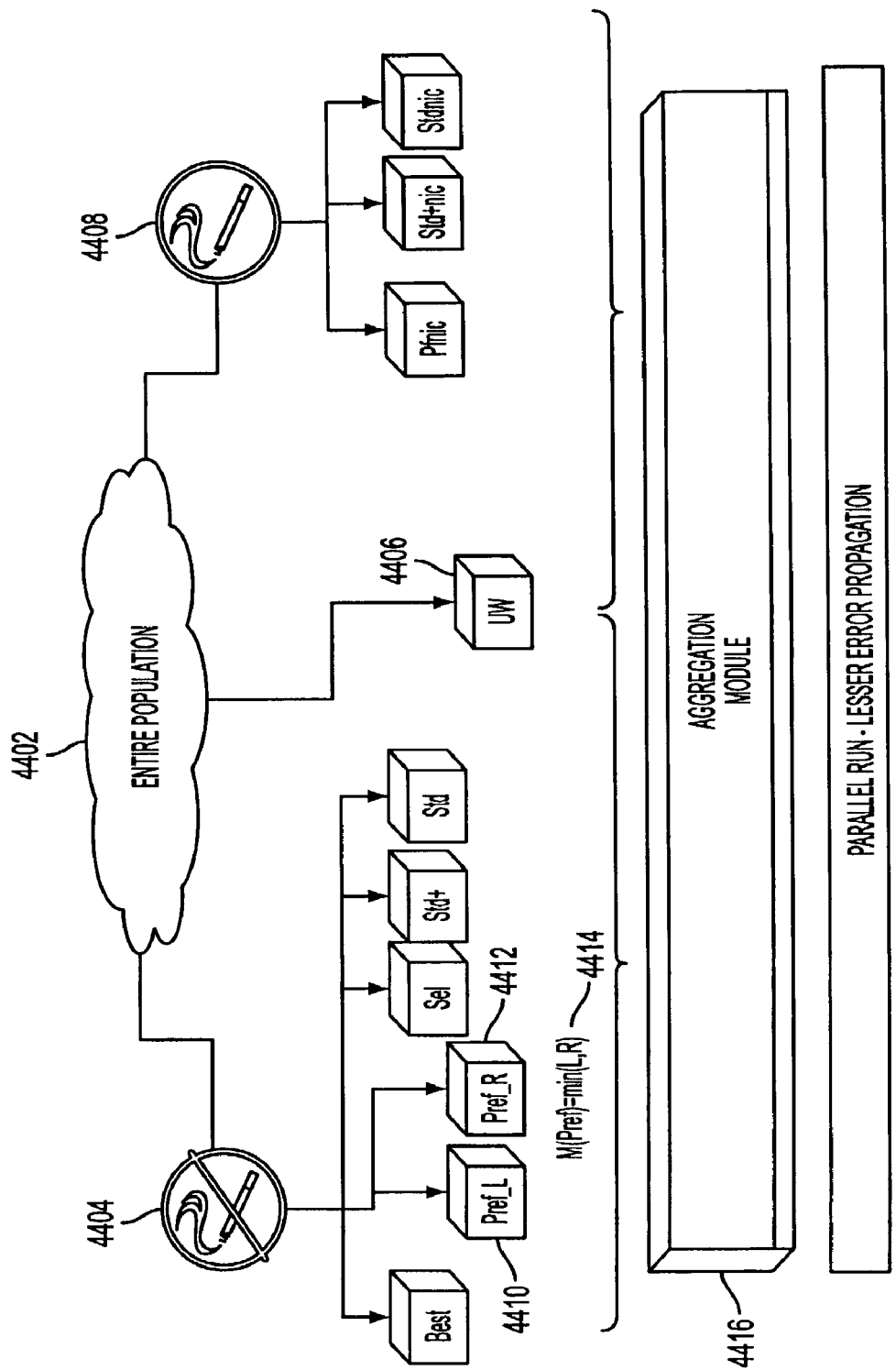
FIG. 44 illustrates a parallel network implementation according to an embodiment of the invention.

An advantage of the order of the response variable may be taken by building two models each for every rate class, except the boundary classes, with one model for each side. For easier reference, the two models may be referred to as the left model and the right model. FIG. 44 illustrates an example of such models. A population 4402 is divided into non-smoking applications 4404, non-underwritten applications 4406 and nicotine applications 4408. The "Preferred" class has been broken down into a "Preferred Left" model 4410 and "Preferred Right" model 4412. The minimum of the two models is selected, e.g., M(Pref)=min (L,R), 2814. The results are then input into the aggregation module 4416, which aggregates all results from the binary classifiers and selects the rate class that best fits a given application. For example, for the rate class "Preferred," two models are built which estimate class membership value. The "Left" model distinguishes all preferred cases from cases of classes, which are to the left of preferred while the "Right" model does the opposite. The final class membership value may be the minimum of these two membership values obtained. Further, in the general case where there is no known order amongst classes, the Left/Right models may collapse into a single model providing with one estimated membership value.

According to an embodiment of the invention, the MARS methodology may be adapted to handle logistic regression problems in the classical sense. Such an adaptation would need an adjustment of the lack-of-fit ("LOF") criteria to be changed from least squares to logistic. However, logistic regression procedure is in itself a likelihood maximization problem that is typically solved by using an iteratively re-weighted least squares ("IRLS") algorithm or its counterparts. The viability of MARS may depend on the fast update criteria of the least squares LOF function, which an IRLS logistic estimation would generally prohibit.

According to an embodiment of the invention, an approximation may be made to use the final set of MARS variables back into a SAS logistic routine and refit. As said before, this is an approximation because if one could ideally use logistic LOF function, then one could have derived the optimal set of logistic candidate variable transforms. However, a re-fit process may still achieve the same degree of fit and provide model parsimony in some of the subset models built. Also, since the logistic function is a (0,1) map, this gives class membership values that can be treated as probabilities.

According to an embodiment of the invention, a MARS module may be implemented with software code in SAS and using MARS, where the code has been trained and tested using the five-fold partitions method described above. By way of example of the results of such an implementation, FIG. 45 illustrates a comparison matrix 4500 (with a dimensionality of k×k), whose k columns contain the set of possible decisions available to the classifier, and whose k rows contain the correct corresponding standard reference decision, can describe a classifier's performance on a given data set, is illustrated in FIG. 45.

In this example, agreement between the classifier and the standard reference decision occurs when the case results on the main diagonal of matrix 4500 while any other cell above or below the main diagonal contains misclassified cases. In the illustrative example depicted in FIG. 45, for the second row of 4502, labeled "Preferred," 360 out of total of 374 cases were correctly assigned to that rate class, while 1 was assigned to "P Best," 11 to "Select", 1 to "Standard" and 1 to "Send to Underwriter."

Figure 46:
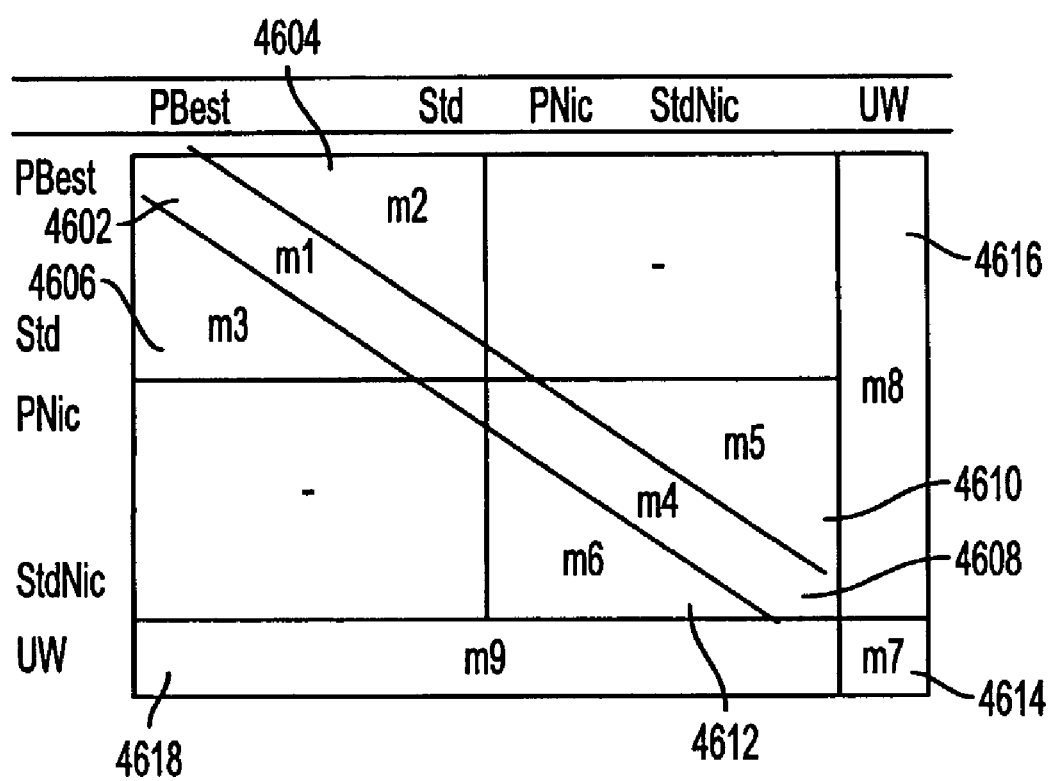
FIG. 46 illustrates an annotated comparison matrix according to an embodiment of the invention.

As shown in FIG. 46, 4602 refers to the total number of agreements between the classifier and the standard reference decisions for non-smokers, while 4608 refers to the total number of agreements between the classifier and the standard reference decisions for smokers. The notations 4604 and 4606 refer to the total number of disagreements between the classifier and the standard reference decisions for non-smokers, while 4610 and 4612 refer to the total number of disagreements between the classifier and the standard reference decisions for smokers. 4614 refers to the total number of agreements not to make a decision and send the case to UW (e.g., underwriter) and notations 4616 and 4618 refer to the total number of disagreements not to make a decision and send to UW.

Further, the matrix depicted in FIG. 46 may be used to illustrate the performance measures used in the evaluation of the classifiers. Let N be the total number of cases considered (in this example, N=2,920). According to the annotation in FIG. 46, N=m1+m2+m3+m4+m5+m6+m7+m8+m9. In this example, N2=182, which is the sum of all cases that should have been sent to the human underwriter (i.e., m9+m7 in FIG. 46), and therefore N1=(2,920−182)=2,738. Three measures of performance for the classifier may be used, where M(i,j) is a cell in the matrix shown in FIG. 45:

Coverage: the total number of decisions made by the classifier as a percentage of the total number of cases considered, i.e.:

$$\text{Coverage} = \sum_{i=1}^{k}\sum_{j=1}^{k-1} M(i, j)/N$$

Using the annotations defined in FIG. 46, coverage may be redefined as:

$$\text{Coverage} = \frac{(m1 + m2 + m3) + (m4 + m5 + m6) + m9}{(m1 + m2 + m3) + (m4 + m5 + m6) + (m7 + m8 + m9)}$$

Thus, in the example depicted in FIG. 45 the coverage is: (2,920−242)/2,920=91.71%. An addition performance measure may include:

Relative Accuracy: the total number of correct decisions made by the classifier as a percentage of the total number of decisions made, i.e.:

$$\text{Relative Accuracy} = \sum_{i=1}^{k-1} M(i, i) \Big/ \sum_{i=1}^{k}\sum_{j=1}^{k-1} M(i, j)$$

Using the annotations defined in FIG. 46, the relative accuracy may be redefined as:

$$RelativeAccuracy = \frac{m1 + m4}{(m1 + m2 + m3) + (m4 + m5 + m6) + m9}$$

In the example depicted in FIG. 45 the relative accuracy is: (2,558)/(2,920−242)=95.52%. An further performance measure may include:

Global Accuracy: the total number of correct decisions made by the classifier as a percentage of the total number of cases considered, i.e.:

$$\text{Global Accuracy} = \sum_{i=1}^{k} M(i, i) \Big/ \sum_{i=1}^{k}\sum_{j=1}^{k} M(i, j)$$

Again, using the annotations defined in FIG. 46, the global accuracy may be redefined as:

$$GlobalAccuracy = \frac{m1 + m4 + m7}{(m1 + m2 + m3) + (m4 + m5 + m6) + (m7 + m8 + m9)}$$

In the example depicted in FIG. 45 the global accuracy is: 2,734/2,920=93.63%. Coverage and relative accuracy may be competing objectives. By establishing a confidence metric for the classifier output, one could adjust a confidence threshold to achieve various tradeoffs between accuracy and coverage. At one extreme, one could have a very low tradeoff, accepting any output (this would yield 100% coverage but very low accuracy). At the other extreme, one could have very high confidence thresholds. This would drastically reduce coverage but increase relative accuracy.

The results of networks of MARS (or Neural Networks, as described below) models could also be post-processed to establish an alternative confidence metric that could be used to achieve other tradeoffs between accuracy and coverage. The tables set forth in FIG. 47 describe the performance of the network of MARS models on each of the five partitions. For each partition, the global and relative accuracy is listed, with the corresponding coverage. The results are shown with and without post-processing.

Each of these partitions (e.g., Partition 1, 4710, Partition 2, 4720, Partition 3, 4730, Partition 4, 4740 and Partition 5, 4750) shows the performance results of the network of MARS models applied to 80% of the data used to build the model (training set 4760) and 20% of the data that was withheld from the model construction (validation set 4770). The tables in FIG. 48 summarize the minimum 4810, maximum 4820, and average 4830 results of applying the network of MARS models to the five partitions.

These tables illustrate that the average performance of a network of MARS models, applied to the five partitions, was very accurate. In particular a relative accuracy of 95% on the validation set 4840 of FIG. 48, with coverage of about 90% may be extremely good and useful for quality assurance. An analysis of the minimum and maximum achieved may also show a high level of robustness, exemplified by the relatively tight range of performance values.

The technical considerations that go into a MARS model are well known and can be found in Friedman's original paper in the *Annals of Statistics*, the contents of which are incorporated herein by reference. However, to better illustrate the present invention, it is useful to describe a few basic points adopted in the MARS tuning as well as some additional steps that may be necessary to ensure a robust model building process.

General MARS parameters may include overfit and cost-complexity pruning, cross-validation, and multi-collinearity. According to an embodiment of the invention, MARS is essentially a recursive-partitioning procedure. The partitioning is done at points of the various explanatory variables defined as "knots" and overall optimization is achieved by performing knot optimization over the lack-of-fit criteria. Moreover, to achieve continuity across partitions MARS employs a two-sided power basis function of the form:

$$b_q^{\pm}(\chi - t) = [\pm(\chi - t)]_+^q.$$

However, in this case, a linear-piecewise basis q=1 is used. Here 't' is the knot around which the basis is formed. It may be important to use an optimal number of basis functions to guard against possible overfit. By way of example, an experiment may be performed with one dataset by starting from a small number of maximal basis functions and building it up to a medium size number and use the cost-complexity notion developed in CART methodology and deployed in MARS to prune back and find a balance in terms of optimality which provides an adequate fit. In this example, the use of cost-complexity pruning revealed that 25-30 basis functions were sufficient.

Another important criteria which affects the pruning is the estimated degrees of freedom allowed. This may be done by using ten-fold cross validation from the data set for each model.

In addition, there is no explicit way by which MARS can handle multi-collinearity. However, MARS does provide a parameter that penalizes the separate choice of correlated variables in a downstream partition. MARS then works with the original parent instead of choosing other alternates. According to an embodiment of the invention, a medium penalty may be used to take care of this problem.

Further, optimization of cut-offs using evolutionary algorithms ("EA") may be used. When a new case comes in, it is evaluated by the complete set of models and a class membership distribution is obtained for every incoming case. Next in line comes the problem of assigning rate-classes to the incoming case. One alternative may be to use hand-tuned cut-offs computed through simple tools like Microsoft Excel based solver. These results may be compared to an EA based optimized cut-off set. By way of example, an evolutionary algorithm may provide a boost in accuracy by about 1% as compared to the hand-tuned cut-offs.

5. Neural Network Classifier

Another aspect of the present invention may provide a method and system to implement a neural network classifier with multiple classes for automated insurance underwriting and its quality assurance. Neural networks may be advantageous, as they can approximate any complex nonlinear function with arbitrary accuracy (e.g., they are universal functional approximators). Neural networks are generally non-parametric and data-driven. That is, they approximate the underlying nonlinear relationship through learning from examples with few a priori assumptions about the model. In addition, neural networks are able to provide estimates of posterior probabilities. Such posterior probability values may be useful for obtaining the highest possible decision accuracy in the classifier fusion or other decision-making processes.

There are a variety of types of neural networks. However, neural networks can be broadly categorized into two main classes, i.e., feed-forward and recurrent (also called feed back) neural networks. Among all these types, multiple-layer feed-forward neural networks are often used for classification. Neural networks can be directly applied to solve both dichotomous and polychotomous classification problems. However, it is generally more accurate and efficient when neural networks are used for two-class (e.g., dichotomous) classification problems. As the number of classes increases, direct use of multi-class neural networks may encounter difficulties in training and in achieving the desired performance.

Figure 49:
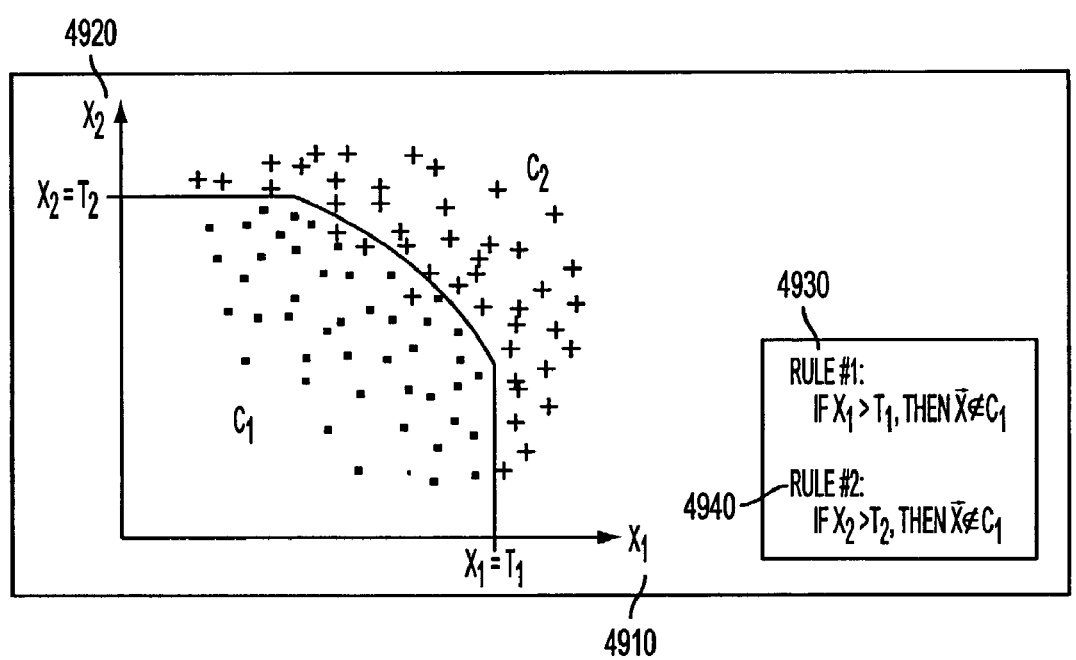
FIG. 49 illustrates a piecewise-continuous classification boundary in a feature space according to an embodiment of the invention.

As previously described, insurance underwriting problems may often involve the use of large numbers of features in the decision-making process. The features typically include the physical conditions, medical information, and family history of the applicant. Further, insurance underwriting frequently has a large number of risk categories (e.g., rate classes). The risk category of an application is traditionally determined by using a number of rules/standards, which often have the form of "if the value of feature x exceeds a, then the application can't be rate class C, i.e., has to be lower than C". These types of decision rules, 4930 and 4940 in FIG. 49, "clip" the decision surface. Decision rules interpreted and used by a human underwriter may form an overall piecewise-continuous decision boundary, as shown in the graph of FIG. 49.

To design a neural network classifier to achieve a comparable performance (e.g., accuracy and coverage) as rule-based classifiers for insurance underwriting, various issues may need to be addressed. First, a neural network may need to deal with a large number of features and target classes. The large number of features and high number of target classes call for a high degree of complexity of neural network ("NN") structure (e.g., more nodes and more parameters to learn, i.e. higher Degrees of Freedom (DOF). Such complex NN structures may require more training data for properly training the network and achieving reasonable generality (performance). However, sufficient data may be difficult to obtain. Even with sufficient data, the complex neural network structure requires enormous training time and computational resources. More importantly, complex NN structures (high DOF) tend to have more local minima, and thus, training is prone to fall into local minima and fails to achieve global minimization. As a result, it usually difficult to achieve a desired performance for a neural network with complex structure.

Another issue to be addressed involves incorporating domain knowledge into the neural network classification process. As discussed before, the discrete rules that human underwriters use for risk category assignment form an overall piecewise-continuous decision boundary in the feature space and neural networks may have difficulty learning the decision boundary due to the insufficient data points being available. One way to alleviate the difficulty and improve the performance of the neural network may be to directly incorporate the rules into the neural network model and use these rules as additional information to "guide" network learning.

One aspect of the present invention is related to a method and system of improving the performance of neural network classifiers, so that the neural network classifier can perform automated insurance underwriting and its quality assurance with a level of accuracy and reliability that is comparable to the rule-based production decision engine. Specifically, this invention improves the performance of classifiers by decomposing a multi-class classification problem into a series of binary classification problems. Each of the binary classifiers may classify one individual class from the other classes and the final class assignment for an unknown input will be decided based on the outputs of all of the individual binary classifiers.

Additionally, as another way to improve the classifier performance, this invention incorporates the domain knowledge of the human underwriter into a neural network design. The domain knowledge, represented by a number of rules, may be integrated into a classifier by using an auxiliary feature, the value of which is determined by the rules. Moreover, to further improve the classifier performance, this invention may also analyze the outputs of the individual binary classifiers to identify the difficult cases for which the classifier cannot make a solid decision. To reduce misclassification rate, these difficult cases may then be sent to a human underwriter for further analysis.

Figure 50:
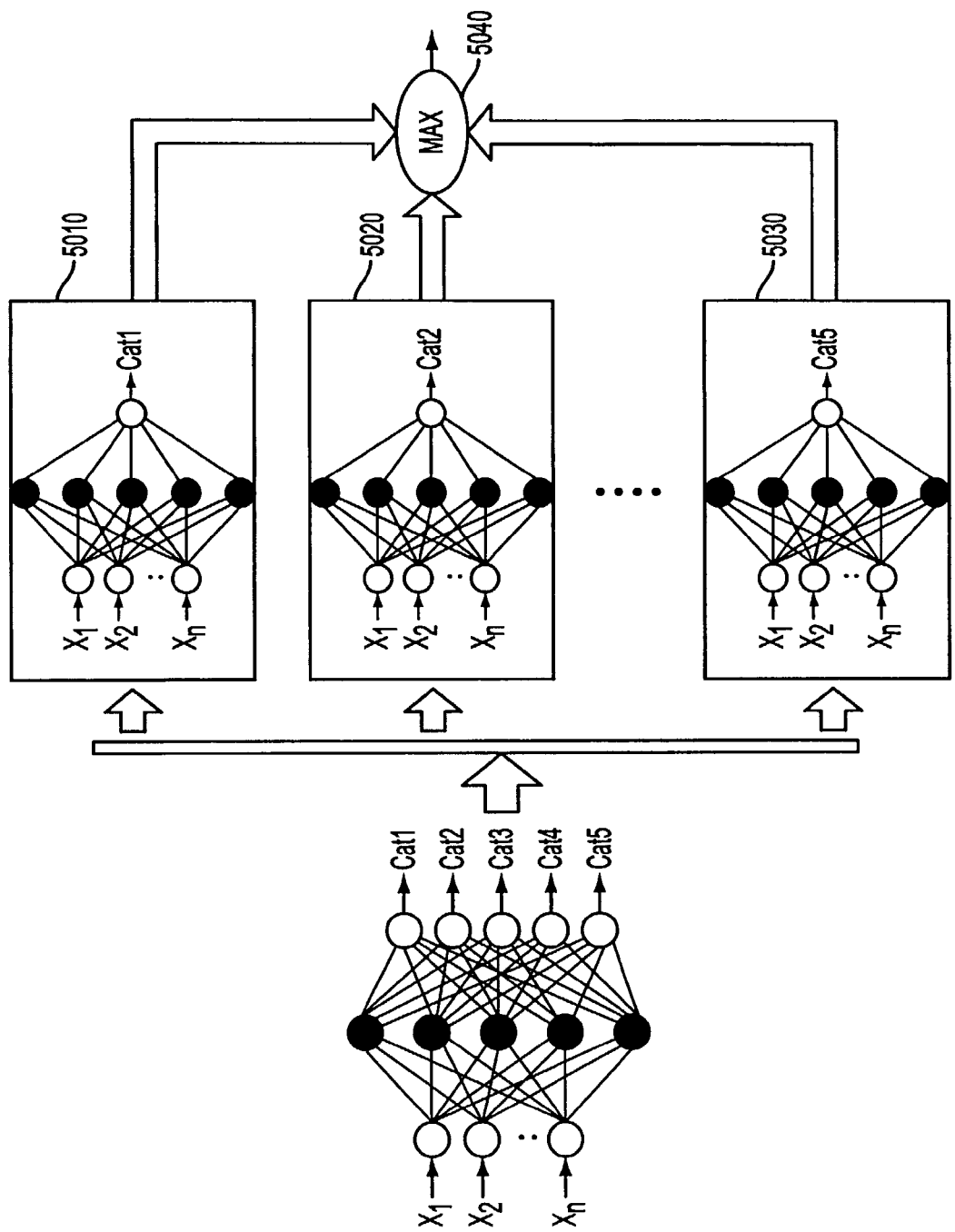
FIG. 50 illustrates a multi-class neural network decomposed into multiple binary classifiers according to an embodiment of the invention.

In the conventional design of multi-class neural network classifiers a single neural network contains multiple output nodes. According to an embodiment of the invention, decomposing the multi-class classifier into multiple binary classifiers may solve a multi-class classification problem. For the purposes of illustration, assume that a hypothetical life insurance company has risk categories "Cat1", "Cat2", "Cat3", "Cat4", and "Cat5". A rating of "Cat1" is the best risk, while "Cat5" is the worst. Then, the concept of the multi-class classifier decomposition used in this invention can be illustrated in the example of FIG. 50. Each binary classifier (5010, 5020, 5030) is for one class and is trained to classify the specific class (the "class") and the rest of the classes combined (the "others"). Before training each of the binary classifiers, the training set is relabeled "1" for the data points in the "class" group and "0" for the data points in the "others" group. When performing classification for a new input case, each of the binary classifiers determines the probability that the new case belongs to the class for which the binary classifier is responsible. Therefore, the output of the neural network is a number in the [0,1] interval. The final class for the new input case is assigned by the MAX decision rule 5040. For example, an application may receive a "0.6 and a 1" in the Cat3 and Cat4 categories, respectively, and a "0" in the Cat1, Cat2, and Cat5 risk categories. The MAX decision rule 5040 may then select the Cat4 risk category.

According to an embodiment of the invention, for each of the binary classifiers designed in the current invention, the neural network is multiple-layer feed-forward in type and has one hidden layer. However, for other applications, using different neural network types with more than one hidden layer may be explored for obtaining better performance. It is therefore to be understood that the current invention is not limited to one hidden layer feed-forward neural networks. Instead, the method may work equally well for multiple numbers of hidden layers.

According to an embodiment of the invention, domain knowledge may be integrated into neural network learning by representing the knowledge with an auxiliary feature. The domain knowledge may be first represented by a series of rules. A typical rule has the following format (once again using the afore-mentioned five hypothetical rate classes): "If the applicant's cholesterol level exceeds 252, he does not qualify for rate class C1, i.e., the best rate class for him is C2". Formally, this rule can be expressed in a general IF-THEN rule as follows.

IF $x_i > t_{i,j}$, THEN the best available rate class is $C_j$ where $x_i$ is the $i^{th}$ feature, $t_{i,j}$ is the $j^{th}$ threshold of the $i^{th}$ feature, and $C_j$ is the $j^{th}$ rate class. The incorporation of domain knowledge is further described below.

According to an embodiment of the invention, the classifier design process for a neural network classifier may comprise data preprocessing, classifier design and optimization, and post-processing. These three aspects are described in greater detail below.

Data preprocessing may include range normalization and feature extraction and selection. According to an embodiment of the invention, range normalization is a process of mapping data from the original range to a new range. Normalization may be generally problem specific. However, it is often done either for convenience or for satisfying the input requirements of the algorithm(s) under consideration. For pattern classification problems, one purpose of normalization is to scale all features the classifier is using to a common range so that effects due to arbitrary feature representation (e.g., different units) can be eliminated. In addition, some classifiers, such as neural networks, require a range of input to be normalized.

One way to normalize data is range normalization. To normalize the data by range, the feature value is divided by its range, i.e., the difference between the maximum and the minimum of the feature value. Let $x_{i,j}$ be value of the $i^{th}$ data point of the $j^{th}$ feature.

Then the normalized value $y_{i,j}$ is:

$$y_{i,j} = \frac{x_{i,j} - \min(x_{,j})}{\max(x_{,j}) - \min(x_{,j})} \quad (1)$$

The normalized values $y_{i,j}$ will be in the range of [0, 1]. The range normalization requires knowing the minimum and the maximum values of the data. The greatest advantage of this normalization is that it introduces no distortion to the variable distribution, as the instance values and their corresponding normalized values have a linear relationship. That is, given two instance values with the first being twice the second, when they are normalized the first normalized value will still be twice the second normalized value. This is why range normalization is also called linear scaling or linear transformation.

Another type of data preprocessing may involve feature extraction/selection. For example, raw data is placed within a 20-column spreadsheet. The first column is the applicant ID number and the second column is the rate class. Columns 3 through 20 are the attributes/variables/features for the applicant. Instead of directly using the 18 original features, two new features are derived. The first derived feature is the body mass index ("BMI"). Underwriter experience has shown that the BMI has more discriminating power in classification. The second derived feature, tag, is used to represent the domain knowledge in neural network training. The two derived features are further described below.

As described above, BMI is defined as ratio of weight in kilogram and the height squared in meters. Let wt be the weight in pounds and Ht be the height in inches. BMI can be expressed as:

$$BMI = \frac{wt \times 2.2046}{[Ht \times 0.0254]^2} \quad (2)$$

One approach for incorporating domain knowledge into the neural network modeling involves training by hints, as described by Abu-Mostafa (1993), where almost any type of prior knowledge can be incorporated into a neural network through constructing the hints. Although the technique is flexible, it may be of a limited application in neural networks. According to an embodiment of the invention, domain knowledge is incorporated into the neural network classifier by using an artificial feature, such as tag. The tag feature may take different values based on a set of rules that represent the domain knowledge.

IF (age_sib_card_canc_diag ≦ 60)
  OR (age_moth_card_canc_diag ≦ 60)
  OR (age_fath_card_canc_diag ≦ 60),
THEN $FH_1$ is 1.
Otherwise, $FH_1$ is 0.
IF (age_moth_card_death ≦ 60) OR (age_fath_card_death ≦ 60),
THEN $FH_2$=1.
IF (age_moth_card_death ≦ 60) AND (age_fath_card_death ≦ 60),
THEN $FH_2$=2.
Otherwise, $FH_2$=0.

Examples of rules that may be used to compute TAG are listed below in Table 6.

TABLE 6

Rate Class Name: PB P Sel St + Std UW
Rate Class Number: 1 2 3 4 5 6
A) Initialize:
B) Fire following rules    V = [1 1 1 1 1 1]

| Variable # | Rule # | IF | | THEN | | Threshold # | Initial values |
|---|---|---|---|---|---|---|---|
| 1 | A | FH1 | = | 1 | V= V & [0 1 1 1 1 1] | t3,2 | 4.0 |
| 2 | B | FH2 | = | 1 | V= V & [0 0 1 1 1 1] | t3,3 | 2.5 |
| 2 | C | FH2 | = | 2 | V= V & [0 0 0 0 1 1] | t3,4 | 1.5 |
| 3 | 1 | NH | < | t3,2 | V= V & [0 1 1 1 1 1] | | |
| 3 | 2 | NH | < | t3,3 | V= V & [0 0 1 1 1 1] | | |
| 3 | 3 | NH | < | t3,4 | V= V & [0 0 0 1 1 1] | | |
| 4 | 4 | BMI | > | t4,2 | V= V & [0 1 1 1 1 1] | t4,2 | 28.81 |
| 4 | 5 | BMI | > | t4,3 | V= V & [0 0 1 1 1 1] | t4,3 | 30.90 |
| 4 | 6 | BMI | > | t4,4 | V= V & [0 0 0 1 1 1] | t4,4 | 32.60 |
| 4 | 7 | BMI | > | t4,5 | V= V & [0 0 0 0 1 1] | t4,5 | 35.05 |
| 4 | 8 | BMI | > | t4,6 | V= V & [0 0 0 0 0 1] | t4,6 | 37.55 |
| 5 | 9 | Chol. Rat. | > | t5,2 | V= V & [0 1 1 1 1 1] | t5,2 | 5.4 |
| 5 | 10 | Chol. Rat. | > | t5,3 | V= V & [0 0 1 1 1 1] | t5,3 | 6.3 |
| 5 | 11 | Chol. Rat. | > | t5,4 | V= V & [0 0 0 1 1 1] | t5,4 | 7.3 |
| 5 | 12 | Chol. Rat. | > | t5,5 | V= V & [0 0 0 0 1 1] | t5,5 | 8.3 |
| 5 | 13 | Chol. Rat. | > | t5,6 | V= V & [0 0 0 0 0 1] | t5,6 | 10 |
| 6 | 14 | Chol. Lev. | > | t6,2 | V= V & [0 1 1 1 1 1] | t6,2 | 252 |
| 6 | 15 | Chol. Lev. | > | t6,3 | V= V & [0 0 1 1 1 1] | t6,3 | 275 |
| 6 | 16 | Chol. Lev. | > | t6,4 | V= V & [0 0 0 1 1 1] | t6,4 | 288 |
| 6 | 17 | Chol. Lev. | > | t6,5 | V= V & [0 0 0 0 1 1] | t6,5 | 303 |
| 6 | 18 | Chol. Lev. | > | t6,6 | V= V & [0 0 0 0 0 1] | t6,6 | 400 |

By way of example, the five family history features, such as from columns 3-7, are condensed and represented by two features, FH1 and FH2. While the FH1 feature has the binary values of 0 or 1, FH2 has the triple values of 0,1, and 2. The values of FH1 and FH2 are determined by the following rules, where the terms age_sib_card_canc_diag, age_moth_card_canc_diag, age_fath_card_canc_diag, age_noth_card_death, age_fath_card_death respectively correspond to the age when a sibling of the applicant was diagnosed with a cardiac or cancer disease, the age when the mother of the applicant was diagnosed with a cardiac or cancer disease, the age when the father of the applicant was diagnosed with a cardiac or cancer disease, the age when the mother of the applicant died due to a cardiac disease, and the age when the father of the applicant died due to a cardiac disease. For a given applicant, one or more of these terms may be not applicable.

As indicated earlier, domain knowledge may be represented by a set of rules. A typical rul may have the following format (once again using the afore-mentioned five hypothetical rate classes): "If the applicant's cholesterol level exceeds 252, he does not qualify for rate class C1, i.e., the best rate class for him is C2". For example, this rule can be expressed in a general IF-THEN rule as follows:

IF $x_i > t_{i,j}$, THEN the best available rate class is $C_j$
Where, $x_i$ is the $j^{th}$ feature, $t_{i,j}$ is the $j^{th}$ threshold of the $i^{th}$ feature, and $C_j$ is the $j^{th}$ rate class.

A vector with binary number "0" or "1" may be used to represent the consequent part of the IF-THEN rule. For example, [0, 1, 1, 1, 1, 1] means the best rate class of $C_2$ while [0, 0, 0, 1, 1] means the best rate class of $C_4$.

For each data point in the training data set, all rules that "fire" are checked and the intersection (e.g., the Boolean logic minimum) of the vector of the firing rule is calculated, as well as the vector that has initial value of all ones. The value of the auxiliary feature may then be determined by counting the number of ones in the final vector. As can be seen, the auxiliary feature takes integer numbers ranging from one to

```
FOR each of the data points in the training set
    Initialize vector V=[1, 1, 1, 1, 1]
    FOR each of the rules
        IF the i<sup>th</sup> rule is fired, THEN V=V & Vi ("&" is logic AND)
    END of all rules
    The value of the auxiliary feature = the number
    of ones in the vector V.
END of all data points
``` the number of rate classes. The pseudo-code shown summarizes the procedure of determining the value of the auxiliary feature.

After obtaining the value of the auxiliary feature for each data point, the auxiliary feature may be treated as a regular feature and included into the final feature set. The neural network may then be trained and tested with the final feature set. Because of the additional information provided by the auxiliary feature, the neural network may be "guided" during learning to more quickly find the piecewise continuous decision boundary, which not only reduces the training time and efforts, but may also improve the classification performance of neural network classifier.

Additional features that may be used for neural network classifier design include, but are not limited to, tag, BMI, diastolic and/or systolic blood pressure readings, cholesterol level, cholesterol ratio, various liver enzymes, such as SGOT (Serum Glutamic Oxaloacetic Transaminase), SGPT (Serum Glutamic Pyruvic Transaminase), GGT (Galactan Galactosyl Transferase), nicotine use history, and various aspects of family history.

Figure 51:
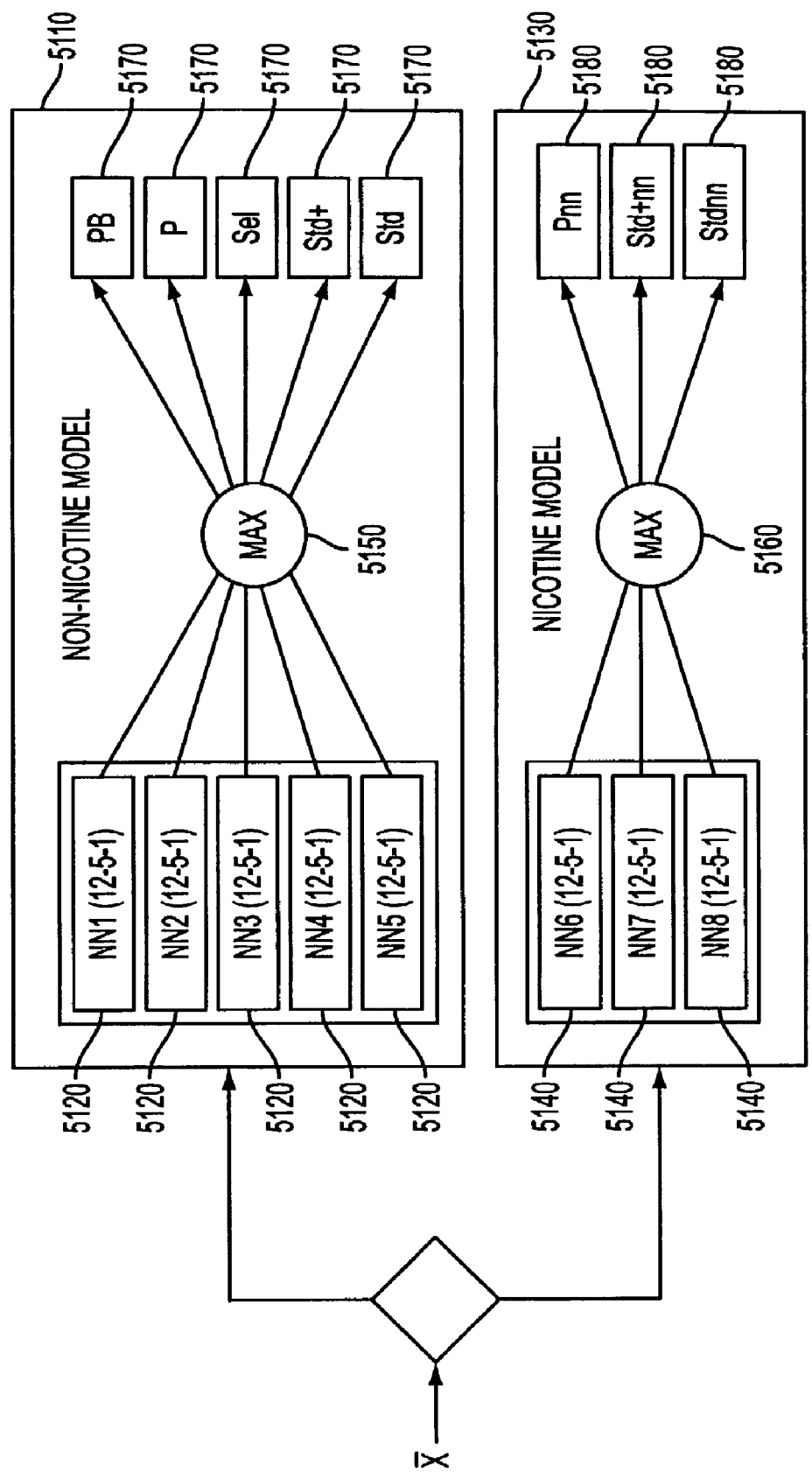
FIG. 51 illustrates an architecture for a neural network classifier according to an embodiment of the invention.

There are a number of types of neural networks. According to an embodiment of the invention, a three-layer feed-forward neural network with back propagation learning may be used. Two separate models may be used for nicotine and non-nicotine cases, respectively. By way of example, for nicotine cases, there may be three rate classes, e.g., "Preferred_nic," "Standardplus_nic," and Standard_nic, while non-nicotine cases may have five rate classes, e.g., "Best," "Preferred," "Select," "Standardplus," and "Standard." Both models are multiple-class classifiers. A neural network with multiple output nodes may be a typical design for multiple-class classifiers where each of the neutral network output nodes corresponds to each class. However, neural networks with multiple output nodes may have a large number of weights and biases, and thus require a large training data set and more training time for properly training the network. If the data size is relatively small compared to the number of features and the number of classes, multiple binary neural networks may be used to perform the multiple-class classification. Using multiple binary-networks may reduce the complexity of the network, thus reducing the training time, but also may improve the classification performance. An example of the architecture of a neural network classifier is illustrated in FIG. 51. The non-nicotine model 5110 has five binary classifiers 5120 while the nicotine model 5130 has three binary classifiers 5140. Each model 5110, 5130 has a MAX function 5150 and 5160. Applications in the non-nicotine model 5110 are then assigned to the appropriate rate class 5170, while applications in the nicotine model 5130 are assigned to the appropriate rate class 5180.

In the example of FIG. 51, each binary network has the structure of 12-5-1, e.g., twelve input nodes, five hidden neurons, and one output node. Activation functions for both hidden and output neurons may be logistic sigmoidal functions. According to an embodiment of the invention, the range of target values may scaled to [0.1 0.9] to prevent saturation during training process. The Levenberg-Marquardt numerical optimization technique may be used as the backpropagation-learning algorithm to achieve second-order training speed.

Each binary network represents an individual rate class and is trained with the targets of one-vs-other. During classification for an unknown case, each network provides the probability of the unknown case belonging to the class it represents. The final rate class of the unknown case is determined by the MAX decision rule, e.g., given a vector whose entry values are in the interval [0,1], the MAX rule will return the value of the position of the largest entry.

To further improve the classification performance, it may be advantageous to apply some post-processing techniques to the outputs of the individual networks, prior to the MAX decision making process. Instead of assigning rate class to an unknown case just based on the maximum outputs of the individual networks, the distribution of the outputs is characterized. If the distribution of the outputs does not meet certain pre-defined criteria, no decision needs to be made by the classifier. Rather, the case will be sent to human underwriter for evaluation. The rationale here is that if a correct decision cannot be made, it would be preferable that the classifier makes no decision rather than the wrong decision. Considering the neutral network outputs as discrete membership grade for all rate classes, the four features that characterize the membership grades may be the same as those set forth above with respect to the fusion module discussed above, i.e., cardinality, entropy, the difference between the highest and the second high values of outputs, and the separation between rank orders of the highest and the second highest values of outputs.

Again, with the features defined for characterizing the network outputs, the following two-step criteria may be used for "rejecting" the cases:

Step 1: $C<\tau_1$ OR $C>\tau_2$ OR $E>\tau_3$

Step 2: $D<\tau_4$ AND $S\leq 1$

Where $\tau_1, \tau_2, \tau_3,$ and $\tau_4$ are the thresholds. The value of the thresholds is typically data set dependent. In this embodiment, the value of the thresholds are first empirically estimated and then fine-tuned by evolutionary algorithms (EA). The final numbers for all five-fold data sets are illustrated in Table 7 below:

TABLE 7

| | Run#1 | Run #2 | Run#3 | Run#4 | Run#5 |
|---|---|---|---|---|---|
| | | Non-nicotine model | | | |
| $\tau_1$ | 0.5 | 0.5 | 0.5 | 0.5 | 0.5 |
| $\tau_2$ | 2.0 | 2.0 | 2.0 | 2.0 | 2.0 |
| $\tau_3$ | 0.9 | 0.9 | 0.9 | 0.93 | 0.98 |
| $\tau_4$ | 0.1 | 0.15 | 0.1 | 0.1 | 0.07 |
| | | Nicotine model | | | |
| $\tau_1$ | 0.3 | 0.3 | 0.3 | 0.3 | 0.3 |
| $\tau_2$ | 1.75 | 1.75 | 1.75 | 1.75 | 1.75 |
| $\tau_3$ | 0.85 | 0.85 | 0.8 | 0.85 | 0.85 |
| $\tau_4$ | 0.2 | 0.25 | 0.2 | 0.2 | 0.2 |

According to an embodiment of the invention, a neural network classifier may be implemented using software code, and tested against a case base. By way of example, a software implementation of a neural network may use a case base of 2,879 cases. After removal of 173 UW cases, the remaining 2,706 cases were used for training and testing the neural network classifier. Five-fold cross-validation was used to estimate the performance of the classifier.

The combined confusion matrices of the five-fold runs are illustrated in FIG. 52. For comparison, the combined confusion matrices for the five-fold runs after post-processing are illustrated in FIG. 53. The performance for this example before post-processing is provided in FIG. 54, while the performance for this example after post-processing is provided in FIG. 55.

According to an embodiment of the invention, the systems and processes described in this invention may be implemented on any general purpose computational device, either as a standalone application or applications, or even across several general purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of an insurance underwriting application, it will be appreciated that variations and modifications can be effected by a person of ordinary skill in the art without departing from the scope of the invention. For example, one of ordinary skill in the art will recognize that certain classifiers can be applied to any other transaction-oriented process in which underlying risk estimation is required to determine the price structure (e.g., premium, price, commission, etc.) of an offered product, such as insurance, re-insurance, annuities, etc. Furthermore, one of ordinary skill in the art will recognize that such decision engines do not need to be restricted to insurance underwriting applications.

What is claimed is:

1. A process performed by a computing device for preparing an insurance application for underwriting based on a plurality of previous insurance application underwriting decisions, the process comprising:

receiving, by the computing device, a request to underwrite the insurance application;

assigning, by the computing device, a risk classification to the insurance application;

defining, by the computing device, a set comprising at least one of the plurality of previous insurance application underwriting decisions;

comparing, by the computing device, the insurance application to the set; and designating, by the computing device, the insurance application based at least in part on the comparison between the insurance application and the set and the risk classification assigned to the insurance application, where the designating includes:

designating the insurance application as an outlier insurance application; and where the at least one insurance application in the set includes a classification assignment; and where designating the insurance application as an outlier insurance application is based on determining an occurrence that a dominance relationship between the insurance application and one of the at least one insurance application in the set is inconsistent with a relationship of classification assignments between the insurance application and the one of the at least one insurance application in the set; and the designating the insurance application as an outlier insurance application comprising determining the dominance relationship, the determining the dominance relationship including:

defining, by the computing device, a first set comprising at least one of the plurality of previous insurance application underwriting decisions that is not dominated by any other of the plurality of previous insurance application underwriting decisions, such that the first set constitutes a Pareto-best subset;

defining, by the computing device, a second set comprising at least one of the plurality of previous insurance application underwriting decisions that does not dominate any of the other of the plurality of previous insurance application underwriting decisions, such that the second set constitutes a Pareto-worst subset, the first set and the second set being constituted by different previous insurance application underwriting decisions;

the first set and the second set associated with respective prior applications; and comparing, by the computing device, the insurance application to the first set and the second set; and wherein the insurance application comprises a plurality of features; and where the comparing the insurance application to the first set and the second set further comprises:

comparing the at least one feature to a corresponding feature in the at least one of the plurality of previous insurance application underwriting decisions in the first set; and comparing the at least one feature to a corresponding feature in the at least one of the plurality of previous insurance application underwriting decisions in the second set; and where:

comparing the at least one feature to a corresponding feature in the first set further comprises determining if the at least one feature in the insurance application is dominated by the corresponding feature in the first set to generate a first dominated determination; and comparing the at least one feature to a corresponding feature in the second set further comprises determining if the at least one feature in the insurance application is dominated by the corresponding feature in the second set to generate a second dominated determination;

each of the comparings including determining whether each of said feature in the insurance application represents greater or less risk than the corresponding feature in the first set or second set, respectively;

the process further including, based on the first and second dominated determinations, assessing, by the computing device, whether all the features of the application are dominated by all the corresponding features of the first set, and including assessing whether all the features of the application are dominated by all the corresponding features of the second set.

2. A process performed by a computing device for preparing an insurance application for underwriting based on a plurality of previous insurance application underwriting decisions, the process comprising:

receiving, by the computing device, a request to underwrite the insurance application, wherein the insurance application comprises at least one feature;

assigning, by the computing device, a risk classification to the insurance application;

defining, by the computing device, a set comprising at least one of the plurality of previous insurance application underwriting decisions;

comparing, by the computing device, the insurance application to the set;

designating, by the computing device, the insurance application based at least in part on the comparison between the insurance application and the set and the risk classification assigned to the insurance application, where the designating includes;

designating the insurance application as an outlier insurance application; and where the at least one insurance application in the set includes a classification assignment; and where designating the insurance application as an outlier insurance application is based on determining an occurrence that a dominance relationship between the insurance application and one of the at least one insurance application in the set is inconsistent with a relationship of classification assignments between the insurance application and the one of the at least one insurance application in the set; and the designating the insurance application as an outlier insurance application comprising determining the dominance relationship, the determining the dominance relationship including:

defining, by the computing device, a first set comprising at least one of the plurality of previous insurance application underwriting decisions that is not dominated by any other of the plurality of previous insurance application underwriting decisions, such that the first set constitutes a Pareto-best subset;

defining, by the computing device, a second set comprising at least one of the plurality of Previous insurance application underwriting decisions that does not dominate any of the other of the plurality of previous insurance application underwriting decisions, such that the second set constitutes a Pareto-worst subset, the first set and the second set being constituted by different previous insurance application underwriting decisions;

the first set and the second set associated with respective prior applications; and comparing, by the computing device, the insurance application to the first set and the second set; and wherein the insurance application comprises a plurality of features; and where the comparing the insurance application to the first set and the second set further comprises:

comparing the at least one feature to a corresponding feature in the at least one of the plurality of previous insurance application underwriting decisions in the first set; and comparing the at least one feature to a corresponding feature in the at least one of the plurality of previous insurance application underwriting decisions in the second set; and where:

comparing the at least one feature to a corresponding feature in the first set further comprises determining if the at least one feature in the insurance application is dominated by the corresponding feature in the first set to generate a first dominated determination; and comparing the at least one feature to a corresponding feature in the second set further comprises determining if the at least one feature in the insurance application is dominated by the corresponding feature in the second set to generate a second dominated determination;

each of the comparings including determining whether each of said feature in the insurance application represents greater or less risk than the corresponding feature in the first set or second set, respectively;

the process further including, based on the first and second dominated determinations, assessing, by the computing device, whether all the features of the application are dominated by all the corresponding features of the first set, and including assessing whether all the features of the application are dominated by all the corresponding features of the second set.

3. A computer readable medium having code for causing a processor to prepare an insurance application for underwriting based on a plurality of previous insurance application underwriting decisions, where the plurality of previous insurance application underwriting decisions includes identifiable individual insurance applications, and the insurance application and plurality of previous applications have similar attributes including corresponding data fields, features and parameters, the medium comprising:

code that receives a request to underwrite the insurance application;

code that assigns a risk classification to the insurance application;

code that defines a set comprising at least one of the plurality of previous insurance application underwriting decisions;

code that compares the insurance application to the set; and code designating the insurance application based at least in part on the comparison between the insurance application and the set and the risk classification assigned to the insurance application, where the designating includes:

designating the insurance application as an outlier insurance application; and where the at least one insurance application in the set includes a classification assignment; and where designating the insurance application as an outlier insurance application is based on determining an occurrence that a dominance relationship between the insurance application and one of the at least one insurance application in the set is inconsistent with a relationship of classification assignments between the insurance application and the one of the at least one insurance application in the set; and the designating the insurance application as an outlier insurance application comprising determining the dominance relationship, the determining the dominance relationship including:

code that defines a first set comprising at least one of the plurality of previous insurance application underwriting decisions that is not dominated by any other of the plurality of previous insurance application underwriting decisions, such that the first set constitutes a Pareto-best subset;

code that defines a second set comprising at least one of the plurality of previous insurance application underwriting decisions that does not dominate any of the other of the plurality of previous insurance application underwriting decisions, such that the second set constitutes a Pareto-worst subset, the first set and the second set being constituted by different previous insurance application underwriting decisions;

the first set and the second set associated with respective prior applications; and comparing, by the computing device, the insurance application to the first set and the second set; and wherein the insurance application comprises a plurality of features; and where the comparing the insurance application to the first set and the second set further comprises:

comparing the at least one feature to a corresponding feature in the at least one of the plurality of Previous insurance application underwriting decisions in the first set; and comparing the at least one feature to a corresponding feature in the at least one of the plurality of previous insurance application underwriting decisions in the second set; and where:

comparing the at least one feature to a corresponding feature in the first set further comprises determining if the at least one feature in the insurance application is dominated by the corresponding feature in the first set to generate a first dominated determination; and comparing the at least one feature to a corresponding feature in the second set further comprises determining if the at least one feature in the insurance application is dominated by the corresponding feature in the second set to generate a second dominated determination;

each of the comparings including determining whether each of said feature in the insurance application represents greater or less risk than the corresponding feature in the first set or second set, respectively;

the computer readable medium further including code that, based on the first and second dominated determinations, assesses whether all the features of the application are dominated by all the corresponding features of the first set, and including assessing whether all the features of the application are dominated by all the corresponding features of the second set.

4. A tangibly embodied system to prepare an insurance application for underwriting based on a plurality of previous insurance application underwriting decisions, the system comprising:

a receiver that receives a request to underwrite the insurance application;

a classifier module that assigns a risk classification to the insurance application;

a definition module that defines a set comprising at least one of the plurality of previous insurance application underwriting decisions; and a comparison module that compares the insurance application to the set; and a designation module designating the insurance application based at least in part on the comparison between the insurance application and the set and the risk classification assigned to the insurance application, where the designating includes:

designating the insurance application as an outlier insurance application; and where the at least one insurance application in the set includes a classification assignment; and where designating the insurance application as an outlier insurance application is based on determining an occurrence that a dominance relationship between the insurance application and one of the at least one insurance application in the set is inconsistent with a relationship of classification assignments between the insurance application and the one of the at least one insurance application in the set; and the designating the insurance application as an outlier insurance application comprising determining the dominance relationship, the determining the dominance relationship including:

defining, by the system, a first set comprising at least one of the plurality of previous insurance application underwriting decisions that is not dominated by any other of the plurality of previous insurance application underwriting decisions, such that the first set constitutes a Pareto-best subset;

defining, by the system, a second set comprising at least one of the plurality of previous insurance application underwriting decisions that does not dominate any of the other of the plurality of previous insurance application underwriting decisions, such that the second set constitutes a Pareto-worst subset, the first set and the second set being constituted by different previous insurance application underwriting decisions:

the first set and the second set associated with respective prior applications; and comparing, by the system, the insurance application to the first set and the second and wherein the insurance application comprises a plurality of features; and where the comparing the insurance application to the first set and the second set further comprises:

comparing the at least one feature to a corresponding feature in the at least one of the plurality of previous insurance application underwriting decisions in the first set; and comparing the at least one feature to a corresponding feature in the at least one of the plurality of previous insurance application underwriting decisions in the second set; and where:

comparing the at least one feature to a corresponding feature in the first set further comprises determining if the at least one feature in the insurance application is dominated by the corresponding feature in the first set to generate a first dominated determination; and comparing the at least one feature to a corresponding feature in the second set further comprises determining if the at least one feature in the insurance application is dominated by the corresponding feature in the second set to generate a second dominated determination;

each of the comparings including determining whether each of said feature in the insurance application represents greater or less risk than the corresponding feature in the first set or second set, respectively;

the system assessing, based on the first and second dominated determinations, whether all the features of the application are dominated by all the corresponding features of the first set, and including assessing whether all the features of the application are dominated by all the corresponding features of the second set.

5. A system for preparing an insurance application for underwriting based on a plurality of previous insurance application underwriting decisions, the system in the form of a computing device, the system comprising:

a receiver that receives a request to underwrite the insurance application, wherein the insurance application comprises at least one feature;

a classifier module that assigns a risk classification to the insurance application;

a definition module that defines a set comprising at least one of the plurality of previous insurance application underwriting decisions; and a comparison module that:

a) comparing the insurance application to the to the set;

b) comparing at least one feature of the insurance application to a corresponding feature in the at least one of the plurality of previous insurance application underwriting decisions in the set; and c) comparing the classification assignment of the insurance application to the classification assignment of the at least one of the plurality of previous insurance application underwriting decisions in the set; and a designation module designating the insurance application based at least in part on the comparison between the insurance application and the set and the risk classification assigned to the insurance application, where the designating includes:

designating the insurance application as an outlier insurance application; and where the at least one insurance application in the set includes a classification assignment; and where designating the insurance application as an outlier insurance application is based on determining an occurrence that a dominance relationship between the insurance application and one of the at least one insurance application in the set is inconsistent with a relationship of classification assignments between the insurance application and the one of the at least one insurance application in the set; and the designating the insurance application as an outlier insurance application comprising determining the dominance relationship, the determining the dominance relationship including:

defining, by the system, a first set comprising at least one of the plurality of previous insurance application underwriting decisions that is not dominated by any other of the plurality of previous insurance application underwriting decisions, such that the first set constitutes a Pareto-best subset;

defining, by the system, a second set comprising at least one of the plurality of previous insurance application underwriting decisions that does not dominate any of the other of the plurality of previous insurance application underwriting decisions, such that the second set constitutes a Pareto-worst subset, the first set and the second set being constituted by different previous insurance application underwriting decisions;

the first set and the second set associated with respective prior applications; and comparing, by the system, the insurance application to the first set and the second set; and wherein the insurance application comprises a plurality of features; and where the comparing the insurance application to the first set and the second set further comprises:

comparing the at least one feature to a corresponding feature in the at least one of the plurality of previous insurance application underwriting decisions in the first set; and comparing the at least one feature to a corresponding feature in the at least one of the plurality of previous insurance application underwriting decisions in the second set; and where:

comparing the at least one feature to a corresponding feature in the first set further comprises determining if the at least one feature in the insurance application is dominated by the corresponding feature in the first set to generate a first dominated determination; and comparing the at least one feature to a corresponding feature in the second set further comprises determining if the at least one feature in the insurance application is dominated by the corresponding feature in the second set to generate a second dominated determination;

each of the comparings including determining whether each of said feature in the insurance application represents greater or less risk than the corresponding feature in the first set or second set, respectively;

the system assessing, based on the first and second dominated determinations, whether all the features of the application are dominated by all the corresponding features of the first set, and including assessing whether all the features of the application are dominated by all the corresponding features of the second set.

6. The process according to claim 1, where the plurality of previous insurance application underwriting decisions includes identifiable individual insurance applications, and the insurance application and plurality of previous applications have similar attributes including corresponding data fields, features and parameters, wherein designating the insurance application as an outlier insurance application indicates that the insurance application violates a dominance principle in relation to at least one insurance application in the set and indicates that the insurance application is potentially assigned to an incorrect risk classification.

* * * * *